US008264557B2

(12) United States Patent
Gocho

(10) Patent No.: US 8,264,557 B2
(45) Date of Patent: Sep. 11, 2012

(54) IMAGE ACQUISITION SYSTEM AND METHOD OF AUTHENTICATING IMAGE ACQUISITION DEVICE IN THE IMAGE ACQUISITION SYSTEM

(75) Inventor: Nagahiro Gocho, Hachioji (JP)

(73) Assignee: Olympus Corporation, Tokyo (JP)

(*) Notice: Subject to any disclaimer, the term of this patent is extended or adjusted under 35 U.S.C. 154(b) by 409 days.

(21) Appl. No.: 12/510,883

(22) Filed: Jul. 28, 2009

(65) Prior Publication Data

US 2009/0290030 A1 Nov. 26, 2009

Related U.S. Application Data

(63) Continuation of application No. PCT/JP2008/050915, filed on Jan. 23, 2008.

(30) Foreign Application Priority Data

Jan. 29, 2007 (JP) .................................. 2007-018471

(51) Int. Cl.
*H04N 5/232* (2006.01)
*H04N 5/225* (2006.01)
*G03B 17/00* (2006.01)

(52) U.S. Cl. .................. 348/211.2; 348/211.5; 348/375; 396/57

(58) Field of Classification Search .. 348/211.99–211.2, 348/211.4, 211.5, 373, 375, 376; 396/56–59
See application file for complete search history.

(56) References Cited

U.S. PATENT DOCUMENTS

| 4,937,604 | A * | 6/1990 | Yoshida et al. | 396/59 |
| 5,317,354 | A * | 5/1994 | Kosako | 396/59 |
| 5,721,970 | A * | 2/1998 | Ikeda | 396/56 |
| 6,141,043 | A * | 10/2000 | Suzuki et al. | 348/211.2 |
| 6,256,060 | B1 * | 7/2001 | Wakui | 348/211.2 |
| 8,169,493 | B2 * | 5/2012 | Gocho | 348/211.99 |
| 2005/0001024 | A1 | 1/2005 | Kusaka et al. | |
| 2009/0256673 | A1 * | 10/2009 | Gocho | 340/5.2 |
| 2009/0315671 | A1 * | 12/2009 | Gocho | 340/5.8 |

FOREIGN PATENT DOCUMENTS

| EP | 1 003 069 A2 | 5/2000 |
| JP | 2-1630 A | 1/1990 |
| JP | 3-91331 A | 4/1991 |
| JP | 7-15772 A | 1/1995 |
| JP | 10-210576 A | 8/1998 |
| JP | 2005-42398 A | 2/2005 |
| JP | 2005-332117 A | 12/2005 |
| JP | 2006-180140 A | 7/2006 |

OTHER PUBLICATIONS

Japanese Office Action dated Sep. 6, 2011 (and English translation thereof) in counterpart Japanese Application No. 2007-018471.

(Continued)

*Primary Examiner* — Daniel M Pasiewicz

(74) *Attorney, Agent, or Firm* — Holtz, Holtz, Goodman & Chick, PC

(57) ABSTRACT

An image acquisition system includes a camera as an image acquisition device and a commanding device configured as a member separate from the camera to transmit a command for controlling the camera to the camera so that the camera can perform the operation corresponding to the command. The ability to transmit/receive the command between the commanding device and the image acquisition device is switchable.

36 Claims, 31 Drawing Sheets

OTHER PUBLICATIONS

International Preliminary Report on Patentability and Written Opinion of the International Searching Authority dated Aug. 13, 2009 (5 pages), issued in counterpart International application No. PCT/JP2008/050915.

English Language International Search Report dated Apr. 1, 2008 issued in parent Appln. No. PCT/JP2008/050915.

* cited by examiner

| Type | | Authentication mode switch | Image acquisition and other operation | How to use |
|---|---|---|---|---|
| Common remote controller (without authentication information) | | No function | Command containing no authentication information | Permit mode or limit mode |
| Authentication mode switching remote controller (with authentication information) | Only authentication mode switching command has authentication information | Command with authentication information | Command containing no authentication information (used by switching to permit mode or limit mode) | Can be set to permit or limit mode for image acquisition, etc. and to prohibit mode for carrying or holding devices |
| Authentication command remote controller (with authentication information) | All commands have authentication information | Command with authentication information | Command with authentication information | Usable also in prohibit mode |

F I G. 4

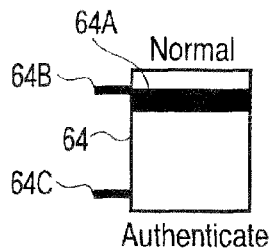

F I G. 5A

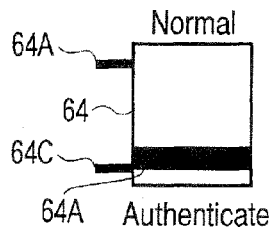

F I G. 5B

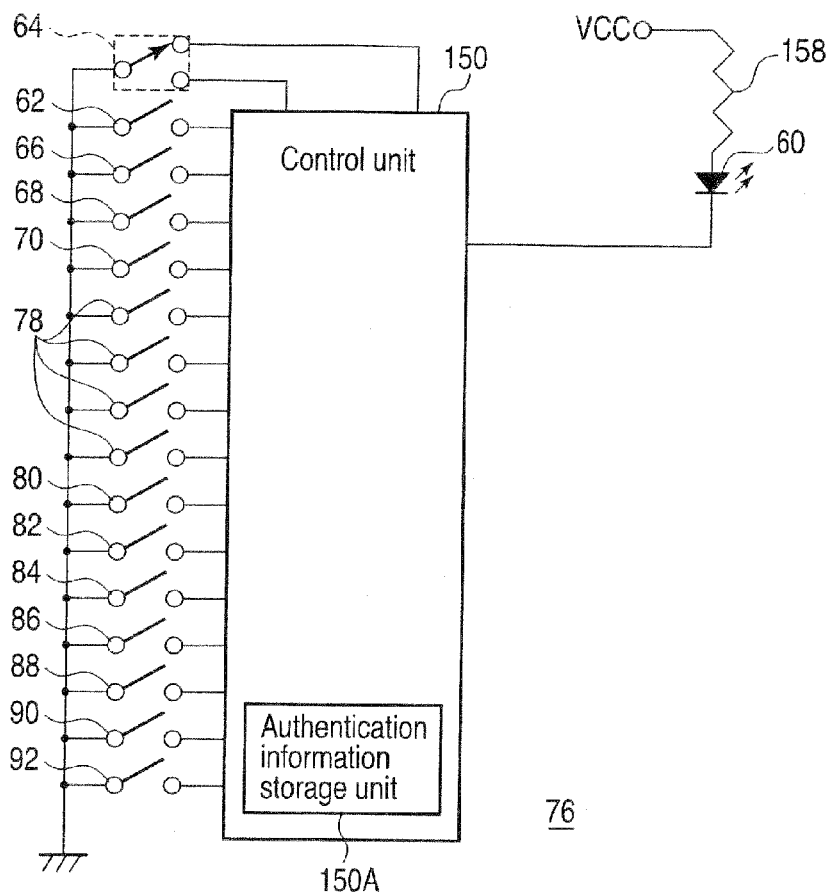
F I G. 15
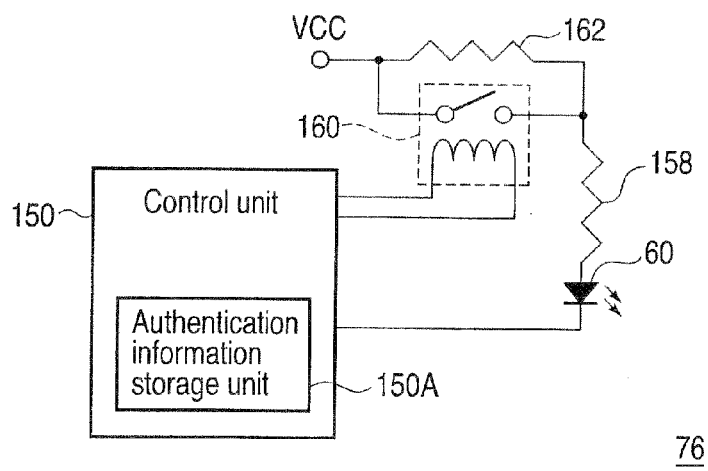
F I G. 16

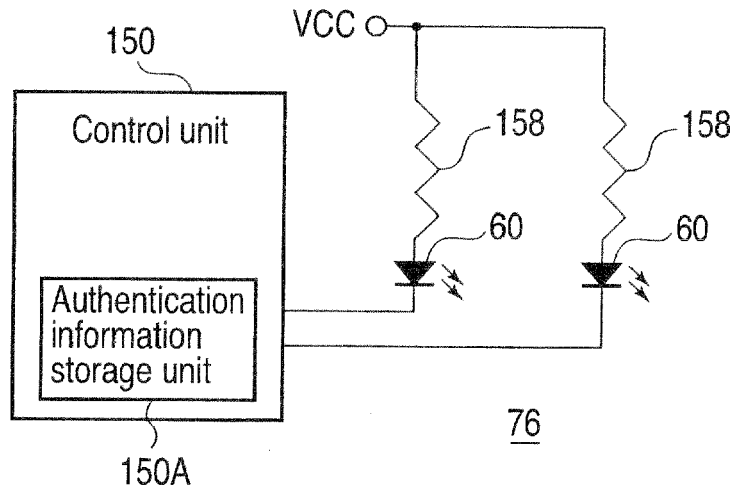
F I G. 17
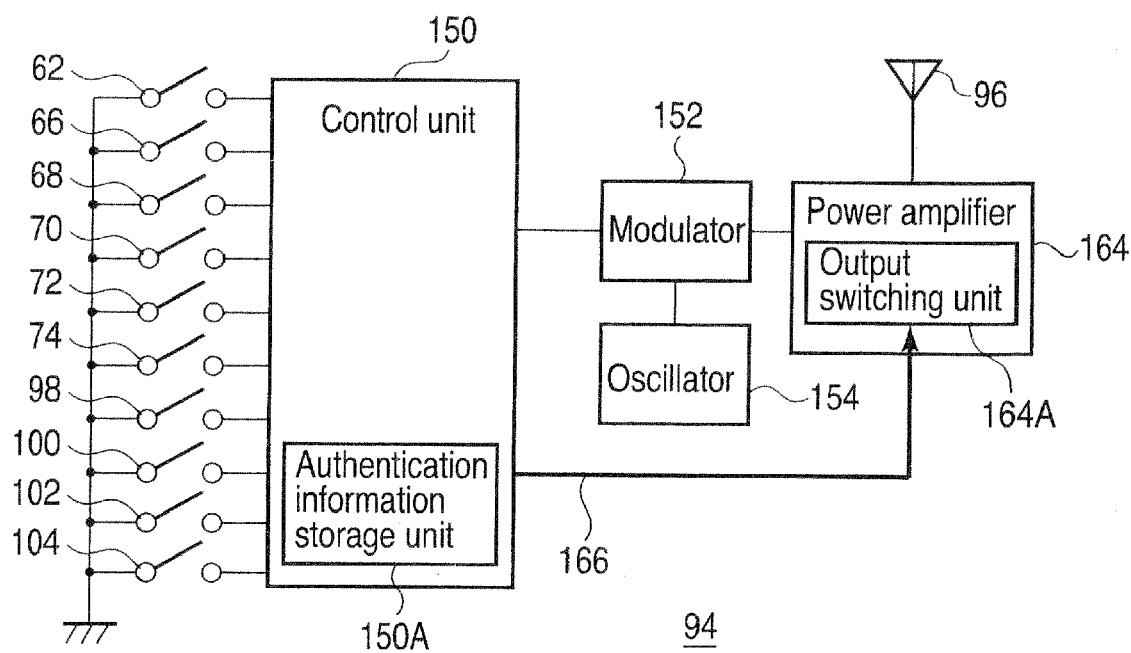
F I G. 18

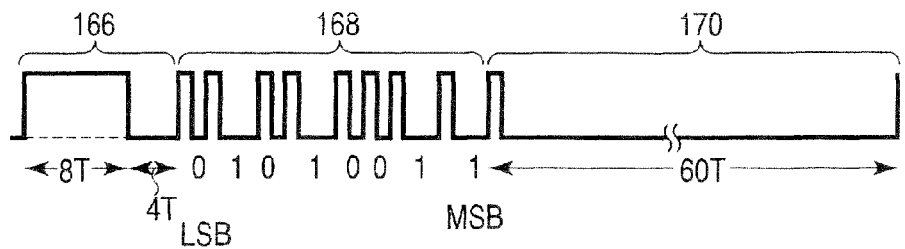
F I G. 19
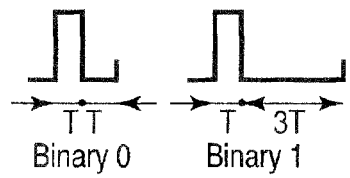
F I G. 20
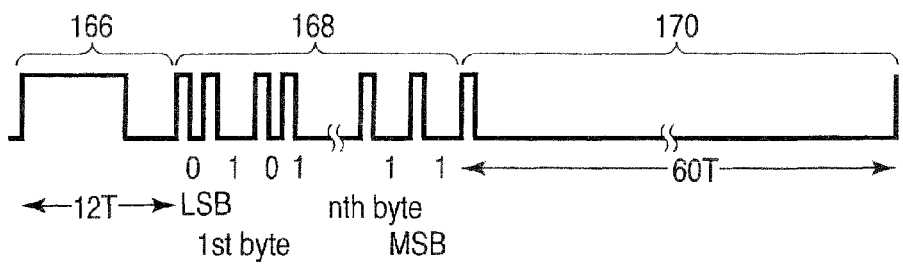
F I G. 21
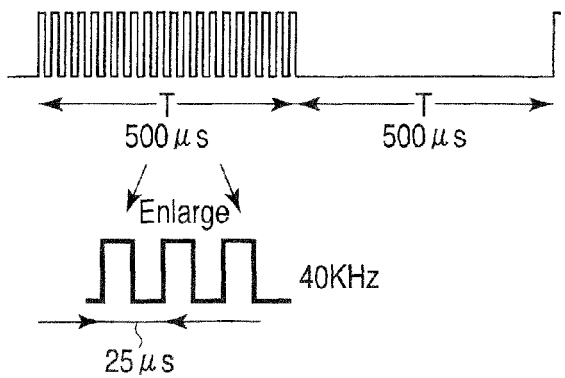
F I G. 22

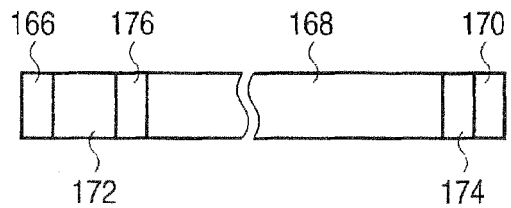

FIG. 24C

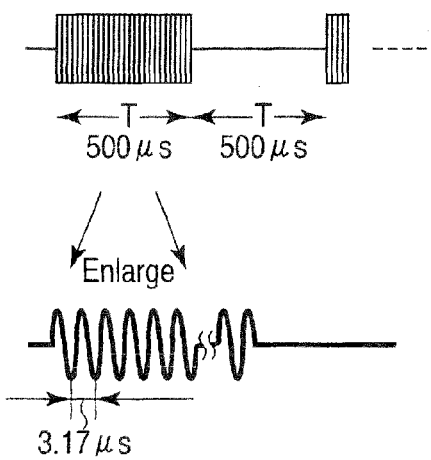

FIG. 25

| Authentication mode | State of camera proper | Application |
|---|---|---|
| Prohibit mode | Unusable by other than remote controller | Safety assured when carried and not used, when stored (held separately from remote controller) or when out |
| Limit mode | Limit use of function | When lent |
| Setting mode | Set/change limit function | |
| Permit mode | Normally usable | When lent or used by owner in low-risk situation |

FIG. 26

| Power on | Setting |
|---|---|
| Prohibit mode | Forcibly set to prohibit mode regardless of mode memory |
| Mode memory storage mode | Set to mode stored in mode memory |

FIG. 27

| Function | | Limit flag | Purpose of limitation |
|---|---|---|---|
| Image acquisition | | 1: Possible, 0: Impossible | Image hiding, privacy protection |
| Play | | 1: Possible, 0: Impossible | In case of only image visible (album, etc.) |
| | Erase | 1: Possible, 0: Impossible | Image protection (willfully or negligently) |
| | Transfer | 1: Possible, 0: Impossible | Image distribution or theft prevention |
| | Print | 1: Possible, 0: Impossible | Image distribution or theft prevention |
| | Edit | 1: Possible, 0: Impossible | Image alteration prevention |
| Menu | | 1: Possible, 0: Impossible | Optimum condition change prevention |

FIG. 28

| Switch, button | Corresponding operation |
|---|---|
| Power switch | Initialize by turning on; end operation by turning off |
| Select switch | Change operation when switching |
| Shutter switch | Switch operation flag set |
| Menu button | Start, set, change and end menu |
| Zoom switch T, W | T, W switch operation flag set, operation command |
| Arrow switch/left, right, up, down | Each switch operation flag set |
| OK button | Switch operation flag set |
| Erase button | Display erase check menu, corresponding operation |
| Print button | Display print menu, corresponding operation |
| Sensitivity switching button | Switch operation flag on, sensitivity switch |

FIG. 29

| Button | Corresponding operation |
|---|---|
| Remote controller image acquisition command button | Shutter operation, OK button function |
| Remote controller wide-angle button, telephoto button | Wide-angle button, telephoto button operation flag set, operation command |
| Remote controller (+) button, (-) button | Each switch operation flag set |
| Remote controller arrow switch/left, right, up, down | Each switch operation flag set |
| Remote controller OK button | Switch operation flag set |
| Remote controller information button | Information button operation flag set |
| Remote controller print button | Display print menu, corresponding operation |
| Remote controller menu button | Start, set, change and end menu |
| Remote controller erase button | Display erase check menu, corresponding operation |
| Remote controller protection button | Protection button operation flag set |
| Remote controller rotation button | Rotation button operation flag set |
| Remote controller limit button | Switch to limit mode |
| Remote controller prohibit button | Switch to prohibit mode |
| Remote controller setting button | Switch to setting mode |
| Remote controller permit button | Switch to permit mode |
| Remote controller sensitivity switching button | Switching of reception sensitivity |

FIG. 30

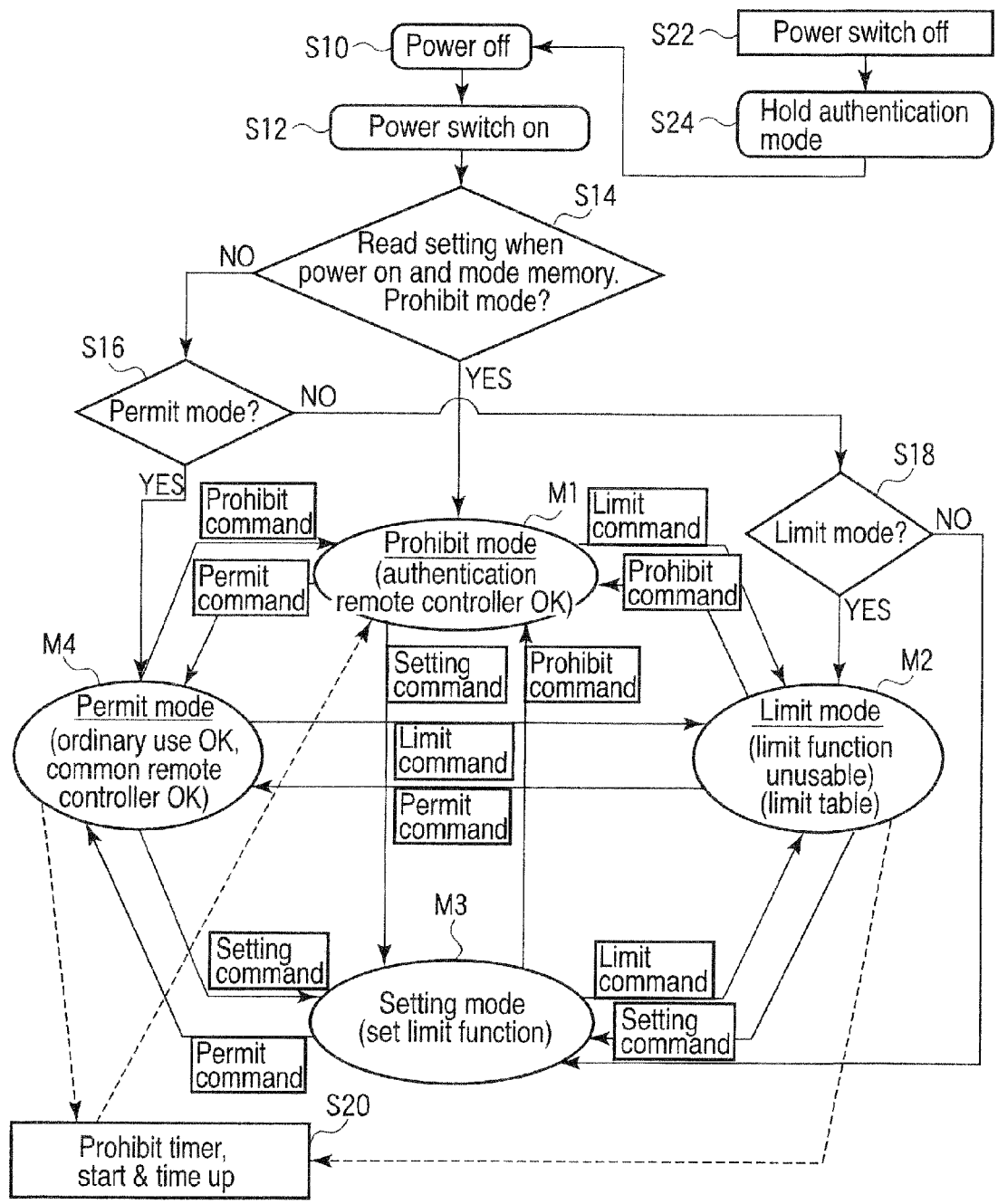
F I G. 31

| Command transmission/reception ability | Commanding device output | Image acquisition device reception sensitivity |
|---|---|---|
| High | High | High |
| Middle | High | Low |
| Middle | Low | High |
| Low | Low | Low |

FIG. 34

| Command | Command transmission/reception ability |
|---|---|
| Authentication mode switching command | Low or middle |
| Other authentication commands | Middle or low |
| General command | High or middle |

FIG. 35

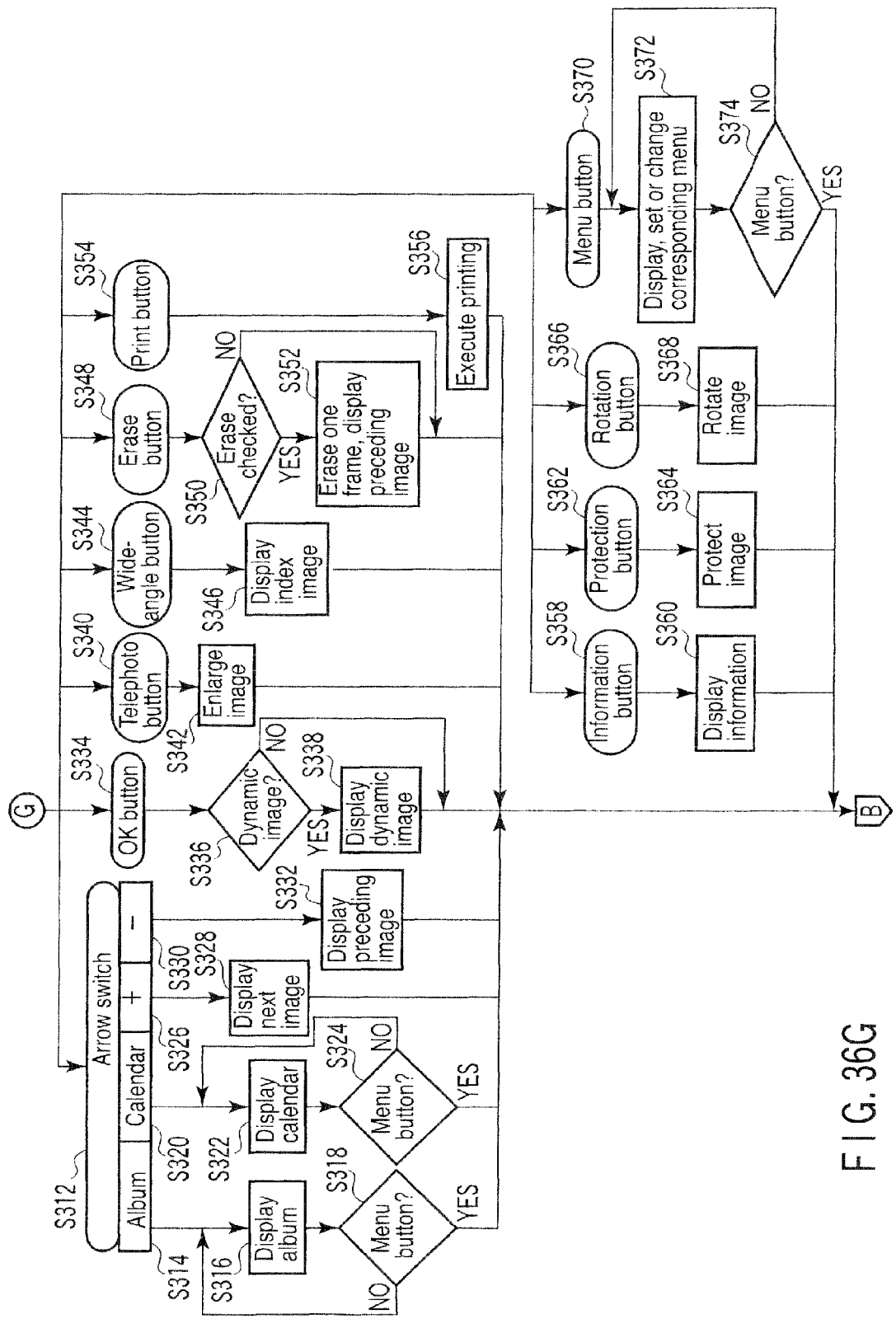
F I G. 36G

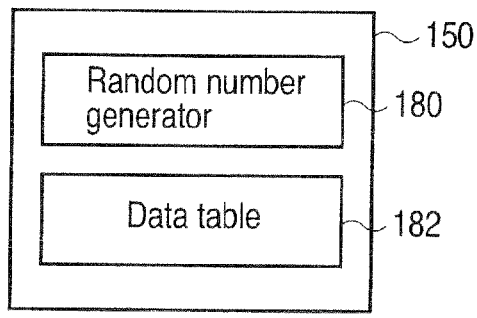
F I G. 37
| 50 | 36 | 62 | 04 | 38 | 52 | 41 | 90 | 91 | 39 |
|----|----|----|----|----|----|----|----|----|----|
| 27 | 82 | 39 | 83 | 73 | 20 | 63 | 49 | 73 | 15 |
| 60 | 32 | 46 | 07 | 87 | 80 | 97 | 61 | 42 | 51 |
| 11 | 47 | 87 | 73 | 62 | 76 | 21 | 00 | 39 | 09 |
| 25 | 08 | 69 | 04 | 08 | 64 | 43 | 64 | 24 | 90 |
| 46 | 89 | 66 | 60 | 48 | 30 | 22 | 50 | 68 | 20 |
| 16 | 38 | 03 | 26 | 50 | 72 | 21 | 14 | 16 | 04 |
| 05 | 76 | 93 | 88 | 88 | 92 | 43 | 99 | 29 | 76 |
| 72 | 38 | 76 | 72 | 19 | 56 | 09 | 71 | 67 | 03 |
| 78 | 64 | 19 | 15 | 01 | 30 | 48 | 46 | 16 | 21 |
F I G. 38
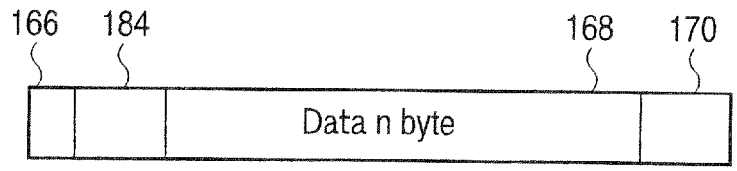
F I G. 39A

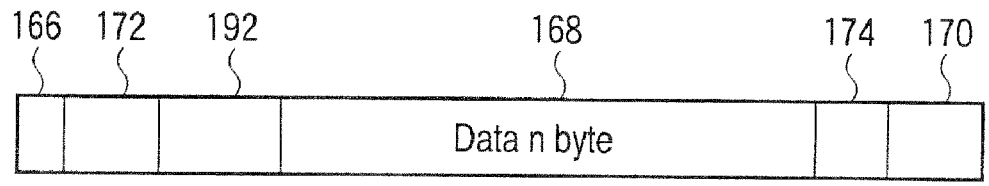
F I G. 47C
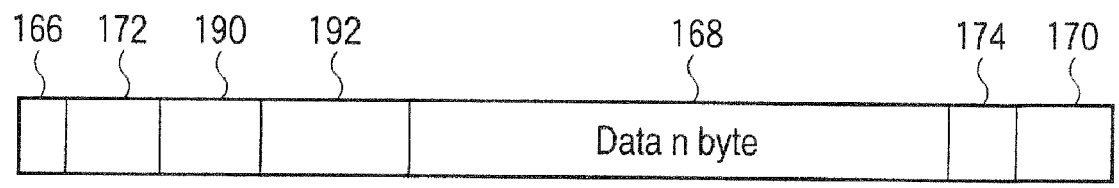
F I G. 47D
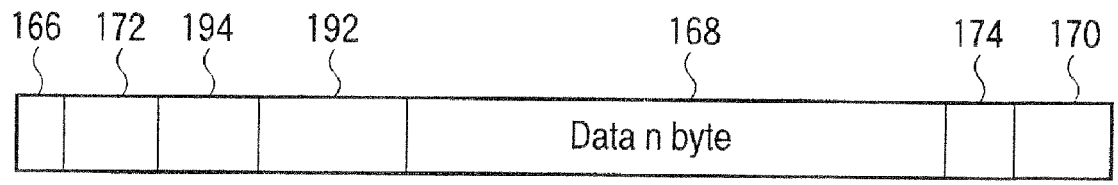
F I G. 47E

IMAGE ACQUISITION SYSTEM AND METHOD OF AUTHENTICATING IMAGE ACQUISITION DEVICE IN THE IMAGE ACQUISITION SYSTEM

CROSS REFERENCE TO RELATED APPLICATIONS

This is a Continuation Application of PCT Application No. PCT/JP2008/050915, filed Jan. 23, 2008, which was published under PCT Article 21(2) in Japanese.

This application is based upon and claims the benefit of priority from prior Japanese Patent Application No. 2007-018471, fried Jan. 29, 2007, the entire contents of which are incorporated herein by reference.

BACKGROUND OF THE INVENTION

1. Field of the Invention

The present invention relates to an image acquisition system including an image acquisition device and a commanding device configured as a unit separate from the image acquisition device proper and a method of authenticating the image acquisition device in the image acquisition system.

2. Description of the Related Art

In recent years, concern about the protection of personal information and information security has become so high that, from the viewpoint of protection of personal information and privacy, even an image acquired by oneself must be carefully handled in an increased number of cases depending on the image contents, especially in the case where an image of another person is included.

In a conventional 35-mm film camera, the number of frames is 24 to 36, and should a camera loaded with a film of 36 frames imaged be lost or stolen, at most 36 images lost, this being a relatively small number compared with a digital camera. Depending on the contents, the loss would of course be great and so would be the risk of the information leakage.

With the advent of the age of the digital camera, on the other hand, the acquired images are recorded in the internal memory of the camera as digital information. The images thus recorded can be easily copied on the one hand, and even if they are copied without permission of the owner, the original images remain as they are, and therefore, the owner may not be aware that the images have been copied on the other hand.

Recently, the storage capacity of the storage medium of the digital camera has been so increased that the memory card of even 4 gigabytes is now placed on the market. In the semiconductor market, Moor's Law is known, according to which the design rule is decreased from 90 to 65 mm and further to as small as 45 mm. In the future, the storage capacity of the semiconductor memory continues to be in upward tendency. The capacity of the compact hard disk is also on the increase, and even the hard disk in the size of a Compact Flash (registered trademark) card has reached several gigabytes in capacity. This tendency is expected to continue in the future.

In the case where the storage capacity per frame of image is one megabyte on the average, for example, 2000 frames of images can be recorded in the memory card of 2 gigabytes, and 6000 frames of images in the hard disk of 6 gigabytes. Under the circumstances, an enormous amount of personal information beyond comparison with the storage capacity for the film camera is now carried with each camera.

The image is recorded in the digital camera with the image acquisition date, etc. Some cameras can record even positional information by GPS. In other words, privacy information such as the behavior and the relationships of individual persons are stored in a great amount as images and data. If the camera is lost, a similar camera can be repurchased at several ten to several hundred thousand yen, but the lost images and information may invite the risk of a greater loss.

The image recording format of the digital camera is standardized, and by removing a removable memory card or a card-type hard disk from the camera and inserting it into the memory slot of the card reader or the personal computer (hereinafter sometimes referred to simply as PC), the images and the accompanying information can be easily viewed or copied.

With the increased memory capacity and the decreased price as a background, even a camera with a nonreplicable built-in memory of about 16 megabytes has appeared, with which images can still be recorded even if the removable memory is full or not installed. In view of this situation, a method has been realized to improve the security by increasing the capacity of the built-in memory and preventing the reproduction of the images from the built-in memory without meeting specified conditions, while at the same time making the conventional removable memory compatible with other cameras.

A considerable number of methods have so far been proposed to improve the security by prohibiting the use of the camera by other than the owner and thus preventing the information leakage and the illegal use.

According to EP 1003069 A2, for example, the ID information of the user is registered, and by reading and collating in advance, the use is permitted only in the case where the ID is coincident. Specifically, the function of verifying the retina pattern, the fingerprint or the voiceprint has been proposed. Also, a method has been proposed in which the ID information is input in the memory card in advance and required to be read. In still another method proposed, a keyboard is provided as an ID input unit to input the ID number.

On the other hand, US 2005/0001024 A1 proposes that a first electronic device held by the user and having stored the personal information of the user communicates with a second electronic device by radio, and the second electronic device is customized in accordance with the user by automatically reading the personal information of the particular user.

Further, Jpn. Pat. Appln. KOKAI Publication No. 2005-42398 proposes a car garage shutter system in which the identification data is stored in a remote controller. The use of a private key as the authentication information or the encrypted information has been proposed. The authentication of voice, iris or fingerprints has also been proposed.

To maintain the security of the information, devices and system, on the other hand, an electronic certificate based on a public key and the one-time password utilizing an authentication server and a network also find practical application as a method high in security.

BRIEF SUMMARY OF THE INVENTION

According to a first aspect of the present invention, there is provided an image acquisition system comprising:

an image acquisition device having an image acquisition unit;

a commanding device configured as a member separate from the image acquisition device to transmit a command for controlling the image acquisition device to the image acquisition device so that the image acquisition device can perform an operation corresponding to the particular command; and an ability switching unit configured to switch an ability to transmit/receive the command between the commanding device and the image acquisition device.

According to a second aspect of the present invention, there is provided an image acquisition device authenticating method for carrying out authentication between an image acquisition device having an image acquisition unit and a commanding device configured as a member separate from the image acquisition device to transmit a command for controlling the image acquisition device to the image acquisition device so that the image acquisition device can perform an operation corresponding to the command, the method comprising:

in at least one of the commanding device and the image acquisition device, providing an ability switching unit configured to switch an ability for command transmission/reception between the commanding device and the image acquisition device; and switching the command transmission/reception ability by the ability switching unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing the types of the remote controller as a commanding device.

FIG. 5A is an enlarged view showing the state of the remote controller of FIG. 1 with an authentication setting switch at the normal position.

FIG. 5B is an enlarged view of an authentication setting switch at the authentication position.

FIG. 15 is a block diagram showing an example of the electrical configuration of the remote controller of FIG. 6.

FIG. 16 is a block diagram showing another example of the electrical configuration of the remote controller of FIG. 6.

FIG. 17 is a block diagram showing a further example of the electrical configuration of the remote controller of FIG. 6.

FIG. 18 is a block diagram showing an example of the electrical configuration of the remote controller of FIG. 7.

FIG. 19 is a diagram showing the fundamentals of a transmission data signal produced by the optical remote controller.

FIG. 20 is a diagram showing the structure of one bit of the data signal.

FIG. 21 is a diagram showing a case in which n bytes of data are transmitted.

FIG. 22 is a diagram showing the output waveform of a modulator of the optical remote controller.

FIG. 24C is a diagram showing a further example of the data format of the authentication command.

FIG. 25 is a diagram showing the signal produced by the radio remote controller.

FIG. 26 is a diagram showing the authentication mode of the camera proper.

FIG. 27 is a diagram for explaining the selection as to the designation of the authentication mode setting at the time of switching on the power of the camera proper.

FIG. 28 is a diagram for explaining the functions available in the limiting mode.

FIG. 29 is a diagram showing the outline of the operation in the case where the switches or the buttons of the camera proper are depressed.

FIG. 30 is a diagram showing the outline of the corresponding operation of the camera proper in the case where the switches or the buttons of the camera proper are depressed.

FIG. 31 is a diagram for explaining the transition of the authentication mode.

FIG. 34 is a diagram showing the combinations of the command transmission/reception ability setting.

FIG. 35 is a diagram showing an example of the combinations of the command type and the command transmission/reception ability.

FIG. 36G is a diagram showing a seventh part of a series of flowcharts for explaining the process and the status transition in the image acquisition device.

FIG. 37 is a diagram showing the configuration of the control unit, of the remote controller according to a third embodiment of the invention.

FIG. 38 is a diagram showing an example of the data table.

FIG. 39A is a diagram showing an example of the data format of the transmission data signal from the remote controller with variable remote controller identification information.

FIG. 47C is a diagram showing a further example of the data format of the transmission data signal from the remote controller.

FIG. 47D is a diagram showing another example of the data format of the transmission data signal from the remote controller.

FIG. 47E is a diagram showing a further example of the data format of the transmission data signal from the remote controller.

DETAILED DESCRIPTION OF THE INVENTION

The best mode for carrying out the invention will be explained below with reference to the drawings.

First Embodiment

Figure 1:
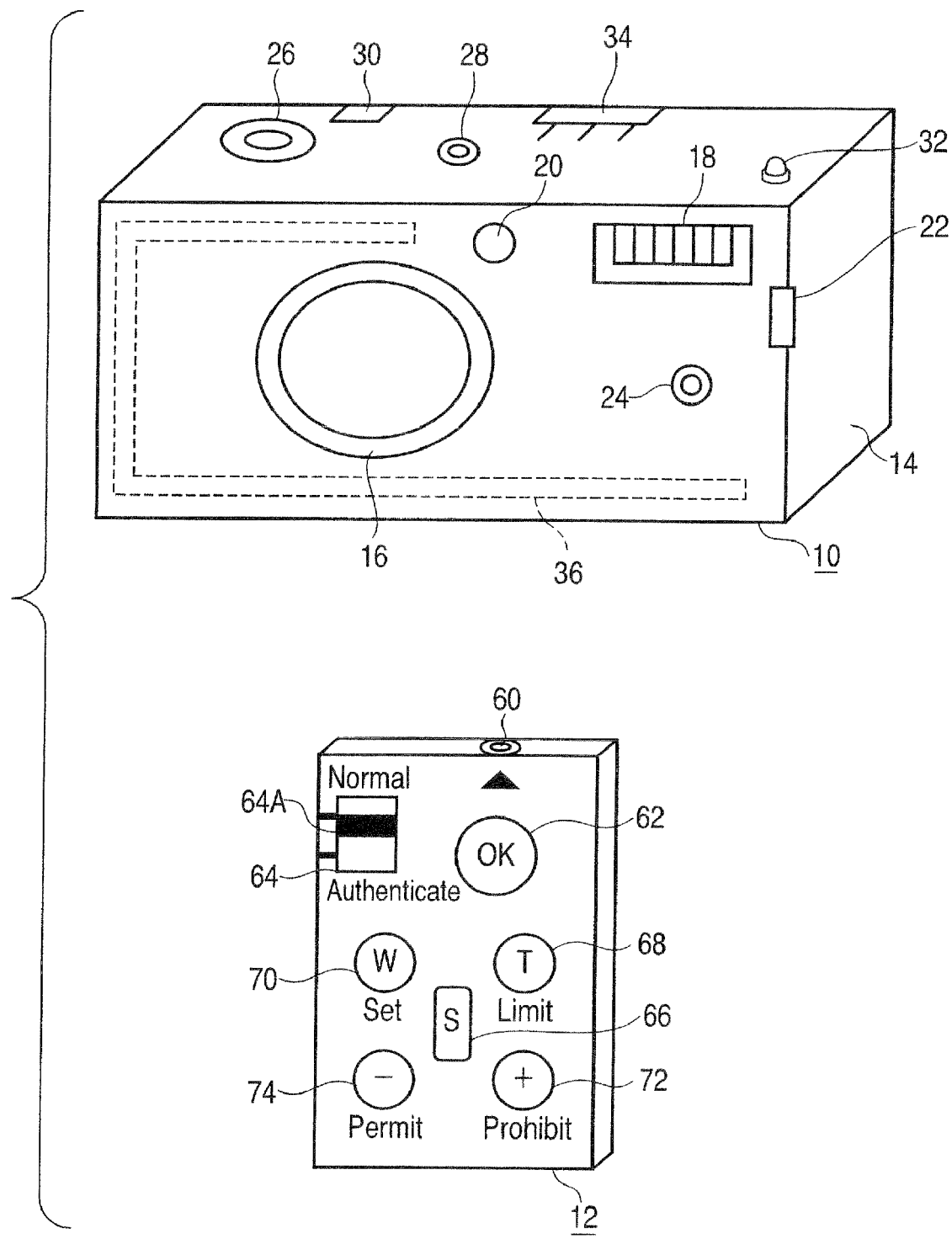
FIG. 1 is a perspective view showing the appearance of the configuration of a digital camera as an example of an image acquisition device and an optical remote controller as an example of a commanding device of an image acquisition system according to a first embodiment of the invention.

The image acquisition system according to the first embodiment of the invention, as shown in FIG. 1, includes an image acquisition device such as a digital camera 10 and a commanding device such as an optical remote controller 12 configured as a separate member from the proper of the image acquisition device in such a manner that the image acquisition device can operate in response to a command by transmitting the command to the proper of the image acquisition device.

On the front surface of a camera proper 14 of the digital camera 10, there are arranged an image acquisition lens unit 16, a flash 18 for emitting an auxiliary image acquisition light, a photodetector element 20 for receiving the optical signal from a commanding device such as the optical remote controller 12, a light-emitting element 22 for giving an advance notice of the image acquisition operation with the timer or confirming the command from the remote controller, and a microphone 24 used for sound recording during the image acquisition operation or adding a voice message after the image acquisition operation.

Also, a shutter switch 26 is arranged on the upper surface of the camera proper 14. This shutter switch 26, which is a two-stage motion switch in still image acquisition mode, can focus the image by half push and snap the shutter by full push. In dynamic image acquisition mode, on the other hand, the image acquisition operation is started by a first push and stopped by a second push. On the upper surface of the camera proper 14, there are also arranged a power switch 28 for switching on/off the power supply, a power lamp 30 that lights when the power is on, a sensitivity display lamp 32 which displays the state of the command reception sensitivity of the image acquisition device, and a select switch 34 which is three-way slide switch for selecting the still image acquisition mode, the dynamic image acquisition mode and the image play mode.

An antenna 36 for receiving the signal from, for example, a radio remote controller (not shown in FIG. 1) commanding device is arranged in the camera proper 14. Incidentally, one of the photodetector element 20 and the antenna 36 is used in accordance with whether the remote controller constituting a commanding device for the digital camera 10 is of the optical type or radio type, respectively. Both of them are of course required, however, in the case where the remote controller is of dual type.

Figure 2:
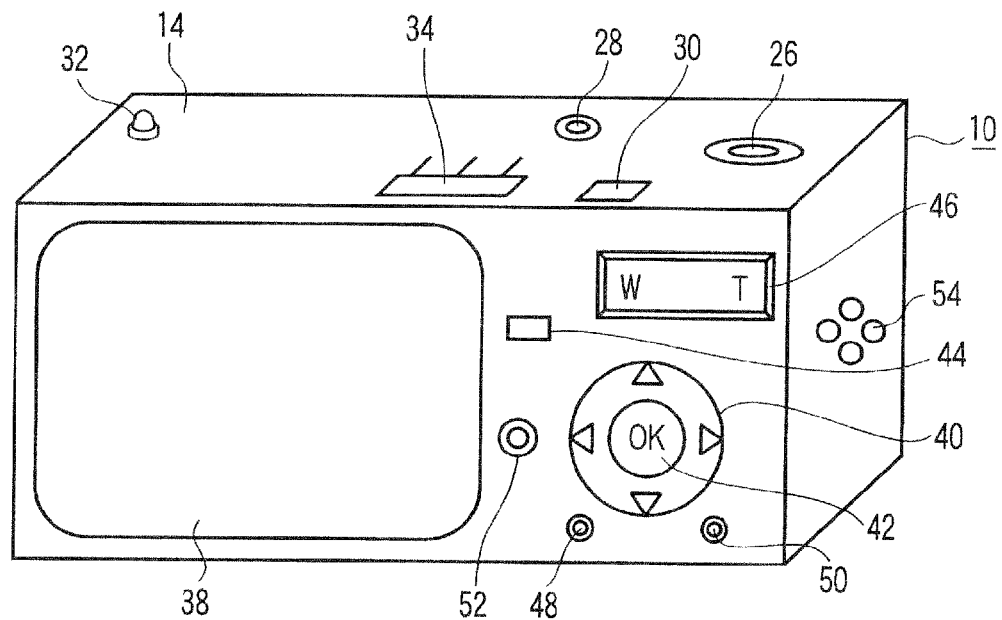
FIG. 2 is a perspective view showing the rear outer configuration of the digital camera of FIG. 1.

As shown in FIG. 2, on the other hand, a monitor 38 is arranged on the back of the camera proper 14. This monitor 38 is formed of a liquid crystal display unit 1.8 to more than 3 inches in size and having 110 to more than 230 thousand pixels. The fields of application of the monitor 38 include the image confirmation at the time of the image acquisition operation, the image display after the image acquisition operation, the display examples of acquired images for selecting the image acquisition scene, and the display of the setting menu such as the image acquisition conditions, the number of frames of acquired images and the residual capacity of the battery.

Further, an arrow switch 40, an OK button 42, a menu button 44, a zoom switch 46, an erase button 48, a print button 30, a sensitivity switching button 52, etc., are arranged on the back of the camera proper 14. The arrow switch 40 is four-way seesaw switch adapted for depression in four directions, up, down, left and right and used to move the selection items up, down, left or right at the time of selecting a plurality of items displayed on the monitor 38 or to feed the frames of the reproduced images longitudinally. The OK button 42 is a switch to determine the selection items on the monitor 38 at the time of setting conditions, and the menu button 44 is a switch for causing the various menus to be displayed for setting conditions. The zoom switch 46 is a left-right, two-way seesaw switch in which the depression of T side moves the zoom lens of the lens unit 16 toward the telephoto side, while the depression of the W side drives the zoom lens to wide-angle side. Also, in play mode, the zoom switch 46 is used also to enlarge or reduce the image or to control the multiscreen display. When the erase button 48 is depressed in play mode, the erase execution confirmation is displayed on the monitor 38, and upon depression of the OK button 42 by selecting the erase by the arrow switch 40, the image being displayed is erased. Also, assuming that the print button 50 is depressed in play mode, the print menu is displayed on the monitor 38, and as long as the digital camera 10 and the printer (not shown) are connected to each other, the image in the digital camera 10 can be printed.

The sensitivity switching button 52 is a change-over switch of the command reception sensitivity of the camera proper 14, and each time of depression thereof, switches to a high sensitivity or a low sensitivity. The state of the reception sensitivity thus switched can be confirmed by the sensitivity display lamp 32. In other words, the sensitivity display lamp 32 switches the display thereof when the command reception sensitivity of the camera proper 14 is switched in response to the sensitivity switching command from the commanding device or by the sensitivity switching button 52. Specifically, the sensitivity display lamp 32 may use one LED to turn off with high sensitivity and turn on with low sensitivity, or a two-color LED to turn red with high sensitivity and green with low sensitivity, or two LEDs to switch the lighting state.

Incidentally, instead of providing the sensitivity switching button 52 independently, a reception sensitivity switching menu may be provided as one of the menus described later, so that the reception sensitivity may be switched by selection in the menu. Also, instead of providing the sensitivity display lamp 32 independently, a sensitivity display mark such as H or L may be displayed on the monitor 38.

Also, a speaker 54 for producing the alarm sound or the confirmation sound or reproducing the recorded sounds in play mode is arranged on the side surface of the camera proper 14.

Figure 3:
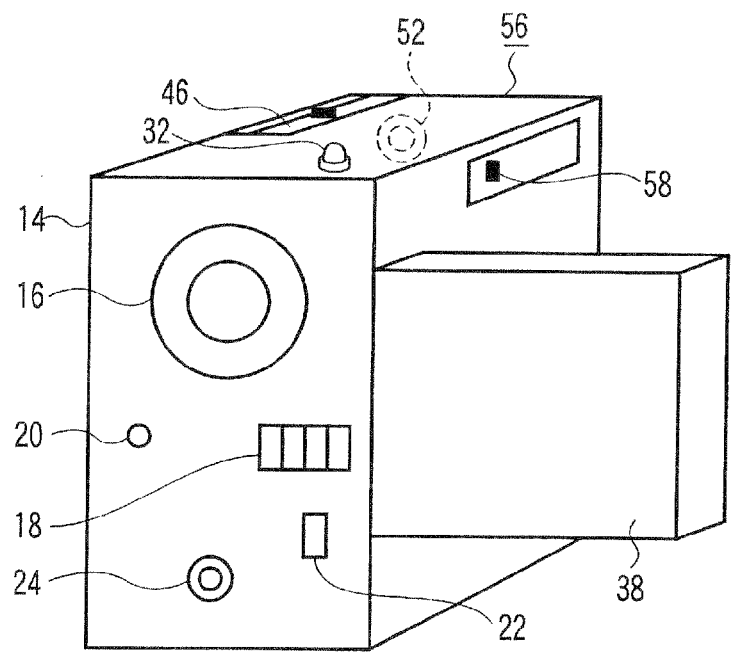
FIG. 3 is a perspective view showing the appearance of the configuration of a digital movie camera as another example of the image acquisition device according to the first embodiment.

The image acquisition device in the image acquisition system according to the first embodiment may be a digital movie camera 56 as shown in FIG. 3. In FIG. 3, the functional members similar to those of the digital camera 10 are designated by the same reference numerals, respectively. Specifically, in this digital movie camera 56, the front surface of the camera proper 14 has arranged thereon a lens unit 16, an auxiliary image acquisition light-emitting flash 18, a photodetector element 20 for receiving the signal light from the commanding device, a light-emitting element 22 for giving an advance notice of the image acquisition operation performed with timer or confirming the command from the commanding device, and a microphone 24 used to record the sound during image acquisition or add a voice message after image acquisition.

Also, the side surface of the camera proper 14 has a monitor 38 rotatably mounted thereon to display the image being acquired or the reproduced image after image acquisition operation. The monitor 38, when out of use, can be closely accommodated in the camera proper 14. Further, the side surface of the camera proper 14 has arranged thereon a power mode switch 58 adapted to turn on/off the power supply or switch the image acquisition mode and the play mode.

A zoom switch 46 is arranged on the upper surface of the camera proper 14. The zoom switch 46 is a left-right two-way seesaw switch in which the depression on T side moves the zoom lens toward telephoto side, while the depression on W side drives the zoom Jens to wide-angle side. Also, in play mode, the zoom switch 46 is used also to enlarge or reduce the image or to control the multiscreen display on the monitor 38.

In addition, though not specifically shown, various connectors, menu button and shutter button are arranged on the side and back surfaces of the camera proper 14.

FIG. 4 is a diagram showing the types of the remote controller as a commanding device. The remote controller is classified into two types; a remote controller with the authentication information for transmitting the command with the authentication information (hereinafter referred to as the authentication command) containing the authentication information to enable the camera proper 14 to authenticate the remote controller, and a remote controller without the authentication information (hereinafter referred to as the common remote controller) for transmitting the command without the authentication information (general command). The authentication command includes an image acquisition command (for image acquisition, reproduction, etc.) with the authentication information and an authentication mode switching command. The general command is an image acquisition command for image acquisition, reproduction, etc. not containing the authentication information. The general command from the general commanding device can be issued for all the functions in a permit mode as described later, and for the unlimited functions in a limit mode. The authentication information, in addition to the fixed remote controller identification information described later, can use variable remote controller identification information (random number and count value), ID information and function range information.

The common remote controller, which has neither the authentication information nor the authentication mode switching function, contains no authentication information in the command, and is used in permit mode or limit mode. The common remote controller is used with a high ability to transmit/receive all the commands, i.e. with a high command transmission output and/or a high reception sensitivity of the camera proper 14. The distance for command transmission/reception between the common remote controller and the camera proper 14, therefore, is longer than that for transmission/reception of the authentication command. This common remote controller is suitably used within the home or in a limited space where the camera proper 14 is rarely likely to be stolen or forgotten.

The remote controller with the authentication information, on the other hand, is further classified into two types; an authentication mode switching remote controller and an authentication command remote controller.

The authentication mode switching remote controller transmits the authentication mode switching command with the authentication information, or other commands such as the image acquisition command without authentication information. In the case where the authentication mode is switched with the authentication command, the authentication mode switching remote controller is used with a low ability to transmit/receive the authentication mode switching command, i.e. with a low command transmission output and/or a low reception sensitivity of the camera proper 14. Therefore, the distance for transmission/reception of the authentication mode switching command between the authentication mode switching remote controller and the camera proper 14 is shorter than that for transmission/reception of the general command without the authentication information. As a result, the chance of the authentication information being wiretapped is reduced on the one hand, and the confirmation as to whether a suspicious person exists nearby or not is facilitated on the other hand, thereby reducing the risk which otherwise might be encountered when switching the authentication mode. This authentication mode switching remote controller is suitable for the following applications. Specifically, it is used to acquire an image with a general command as a remote controller command arriving from a comparatively remote place in permit mode or limit mode. As long as the image acquisition operation is suspended, on the other hand, the authentication mode is switched to the prohibit mode, described later, in preparation to be stolen or forgot. Whenever the image acquisition operation is desired again, the image acquisition mode is switched from prohibit mode to permit mode or limit mode again.

The authentication command remote controller transmits till the commands, including the image acquisition command, with the authentication information. The authentication command is transmitted/received with a low command transmission/reception ability, i.e. a low command transmission output and/or a low reception sensitivity of the camera proper 14. The distance for transmission/reception of the authentication command between the authentication command remote controller and the camera proper 14 is shorter than that for the transmission/reception of the general command without the authentication information. As a result, the chance of the authentication information being wiretapped is reduced on the one hand, and the confirmation as to the presence of a suspicious person nearby is facilitated on the other hand, thereby making it possible to reduce the risk at the time of command transmission/reception. This authentication command remote controller is suitably used during travel or in a congested place with a high chance of the image acquisition device being stolen or forgotten. Specifically, the camera proper 14 is set in prohibit mode, and the remote controller is operated in the vicinity of the camera proper 14 while transmitting all the commands as an authentication command. As a result, the risk of both the information leaking out when the camera proper 14 is stolen or forgotten and the authentication information being wiretapped can be reduced.

The optical remote controller 12 in the image acquisition system according to the first embodiment has, on the end surface thereof, a light-emitting unit 60 for command transmission, as shown in FIG. 1, as an example of the authentication mode switching remote controller. From the light-emitting unit 60, the general command such as an image acquisition or an authentication mode switching command is transmitted to the digital camera 10 or the digital movie camera 56 making up the image acquisition device.

Also, the upper surface of the optical remote controller 12 has arranged thereon an image acquisition command button 62, an authentication setting switch 64, a sensitivity switching button 66, a telephoto button 68, a wide-angle button 70, a plus button 72, a minus button 74, etc. The optical remote controller 12 transmits, to the camera proper 14, an image acquisition execution command as an image acquisition command in the form of the general command at the time when the image acquisition command button 62 is depressed. The authentication setting switch 64 switches between the normal position and the authentication position in accordance with the position of an operating unit 64A thereof, and the functions of other switches 68 to 74 are switched by the position thereof. Also, upon depression of the sensitivity switching button 66 described above, the sensitivity switching command for switching the command reception sensitivity of the camera proper 14 is transmitted in the form of an authentication command, and the command reception sensitivity of the camera proper 14 is switched as described in detail later.

The authentication setting switch 64 is a two-position change-over switch. The normal position is assumed when the operating unit 64A is located at a normal position 64B above in FIG. 5A, and the authentication position is assumed when the operating unit 64A is located at the lower authentication position 60C as shown in FIG. 5B. Incidentally, as long as the operating unit 64A of the authentication setting switch 64 is at an authentication position 64C, the command transmission output is transmitted from the optical remote controller 12 at low output by the output switching method described in detail later.

Specifically, as long as the operating unit 64A is at normal position 64B with the telephoto button 68 depressed, the T button command for driving the lens unit 16 to the telescopic side is transmitted to the camera proper 14 by the optical remote controller 12 as an image acquisition command in the form of the general command. In the case where the operating unit 64A is at authentication position 64C, on the other hand, the command (limit command) for switching the camera proper 14 to the limit mode is transmitted as the authentication mode switching command in the form of the authentication command.

Upon depression of the wide-angle button 70 with the operating unit 64A at normal position 64B, the W button command for driving the lens unit 16 to the wide angle side is transmitted to the camera proper 14 as an image acquisition command in the form of the general command. At the authentication position 64C of the operating unit 64A, on the other hand, a command for switching the camera proper 14 to the setting mode (setting command) is transmitted as an authentication mode switching command in the form of the authentication command.

Upon depression of the plus button 72 with the operating unit 64A at normal position 64B, the frame feed command for reproduction or the select item move command for menu selection is transmitted as an image acquisition command in the form of the general command. In the case where the plus button 72 is depressed with the operating unit 64A at the authentication position 64C, on the other hand, the command for switching the camera proper 14 to the prohibit mode (prohibit command) is transmitted as an authentication mode switching command in the form of the authentication command.

Upon depression of the minus button 74 with the operating unit 64A at normal position 64B, the frame feed command for reproduction or the select item move command for menu selection is transmitted as an image acquisition command in the form of the general command. In the case where the minus button 74 is depressed with the operating unit 64A at the authentication position 64C, on the other hand, a command for switching the camera proper 14 to the permit mode (permit command) is transmitted as an authentication mode switching command in the form of the authentication command.

Incidentally, each mode of the camera proper 14 will be explained in detail later.

Figure 6:
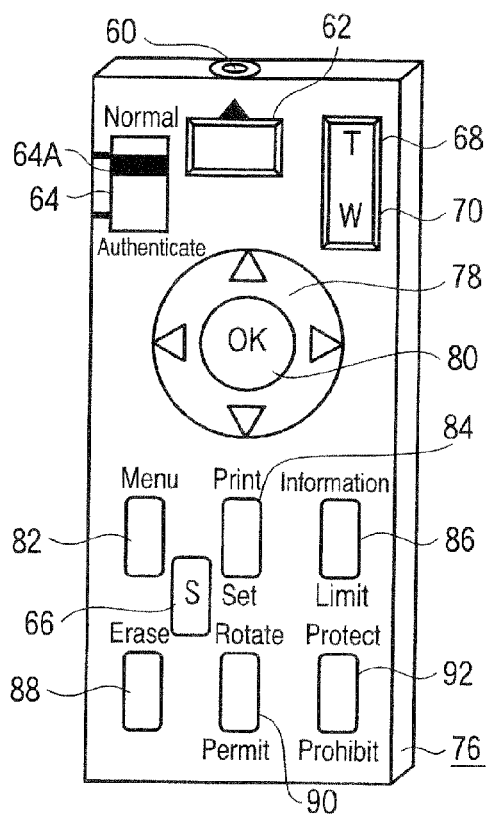
FIG. 6 is a perspective view showing the appearance of the configuration of another optical remote controller as another example of the commanding device according to the first embodiment.

FIG. 6 is a perspective view showing the outer appearance of an optical remote controller 76 for the camera as another example of the authentication mode switching remote controller. In this drawing, the functional members similar to those of the optical remote controller 12 described above are designated by the same reference numerals, respectively.

Specifically, also in the optical remote controller 76, the light-emitting unit 60 for command transmission is arranged on the end surface thereof, and from this light-emitting unit 60, the general command or the authentication mode switching command is transmitted to the image acquisition device as the command. On the upper surface of the optical remote controller 76, on the other hand, there are arranged an image acquisition command button 62, an authentication setting switch 64, a sensitivity switching button 66, a telephoto button 68, a wide-angle button 70, an arrow switch 78, an OK button 80, a menu button 82, a print button 84, an information button 86, an erase button 88, a rotation button 90, a protection button 92, etc.

The optical remote controller 76, upon depression of the image acquisition command button 62, transmits the image acquisition execution command as an image acquisition command to the camera proper 14 in the form of the general command. Also, the telephoto button 68 and the wide-angle button 70 make up a seesaw switch. Upon depression of the telephoto button 68, the T button command is transmitted as an image acquisition command in the form of the general command. In the camera proper 14 that has received this command, the lens unit 16 is driven to telescopic side in image acquisition mode, while the image on the monitor 38 is enlarged or the multiscreen is displayed and controlled in play mode. In a similar fashion, upon depression of the wide-angle button 70, the W button command is transmitted as an image acquisition command in the form of the general command. In the camera proper 14 that has received this command, the lens unit 16 is driven to wide angle side in image acquisition mode, while the image on the monitor 38 is reduced or the multiscreen is displayed and controlled in play mode.

The cross switch 78 is a four-way seesaw switch adapted for depression in four directions, i.e. up, down, left and right, and the operation command corresponding to the direction of depression is transmitted as an image acquisition command in the form of the general command. This switch is used for designating the select item located up, down, left or right for selection of a plurality of items displayed on the monitor 38 of the camera proper 14 or feeding the frame of the reproduction image forward or backward. The OK button 80 is a switch for determining the select item on the monitor 38 at the time of setting conditions, and upon depression of this switch, the OK command is transmitted as an image acquisition command in the form of the general command. The menu button 82 is a switch for displaying various menus for setting conditions on the monitor 38, and upon depression of this switch, the menu command is transmitted as an image acquisition command in the form of the general command.

Also, upon depression of the erase button 88, the erase command is transmitted as an image acquisition command in the form of the general command. In the camera proper 14 that has received this command, unless the erase function is limited in play mode, the confirmation of executing the erase operation is displayed on the monitor 38. Then, upon depression of the OK button 80 with the erasure selected by the cross button 78, the image on display is erased.

Upon depression of the sensitivity switching button 66, the sensitivity switching command for switching the command reception sensitivity of the camera proper 14 is transmitted in the form of the authentication command, and the command reception sensitivity of the camera proper 14 is switched as explained in detail later.

The authentication setting switch 64, like in FIGS. 5A and 5B, is for switching between the normal position 64B and the authentication position 64C according to the position of the operating unit 64A, and adapted to switch the functions of other buttons 84 to 92 according to the position of the particular switch 64. Incidentally, in the case where the operating unit 64A of the authentication setting switch 64 is at the authentication position 64C, the command is transmitted from the optical remote controller 76 at a low transmission output according to the output switching method described in detail later.

Specifically, upon depression of the print button 84 with the operating unit 64A at normal position 643, the print command is transmitted as an image acquisition command in the form of the general command. In the camera proper 14 that has received the command, the print menu is displayed on the monitor 38, and if the camera proper 14 and the printer are connected to each other, the image in the camera proper 14 can be printed. Upon depression of the print button 84 with the operating unit 64A at the authentication position 64C, on the other hand, the setting command is transmitted as an authentication mode switching command in the form of the authentication command. In response to the reception of this command, the camera proper 14 is switched to the setting mode.

Also, upon depression of the information button 86 with the operating unit 64A at normal position 64B, the information display command is transmitted as an image acquisition command in the form of the general command. In the camera proper 14 that has received this command, the information on the display image is displayed on the monitor 38. Upon depression of the information button 86 with the operating unit 64A at the authentication position 64C, on the other hand, the limit command is transmitted as an authentication mode switching command in the form of the authentication command. In response to the reception of this command, the camera proper 14 is switched to the limit mode.

Upon depression of the rotation button 90 with the operating unit 64A at normal position 64B, the rotation command is transmitted as an image acquisition command in the form of the general command. In the camera proper 14 that has received this command, the display image on the monitor 38 is rotated by 90 degrees. Upon depression of the rotation button 90 with the operating unit 64A at the authentication position 64C, on the other hand, the permit command is transmitted as an authentication mode switching command in the form of the authentication command. In response to the reception of this command, the camera proper 14 is switched to the permit mode.

Upon depression of the protection button 92 with the operating unit 64A at normal position 64B, the protection command is transmitted as an image acquisition command in the form of the general command. In the camera proper 14 that has received this command, the protection flag is set on the display image on the monitor 38 thereby to protect the image from erasure. Incidentally, the protection flag can be canceled by the menu with the operation of the menu button 82. Upon depression of the protection button 92 with the operating unit 64A at the authentication position 64C, on the other hand, the prohibit command is transmitted as an authentication mode switching command in the form of the authentication command. In response to the reception of this command, the camera proper 14 is switched to the prohibit mode.

Figure 7:
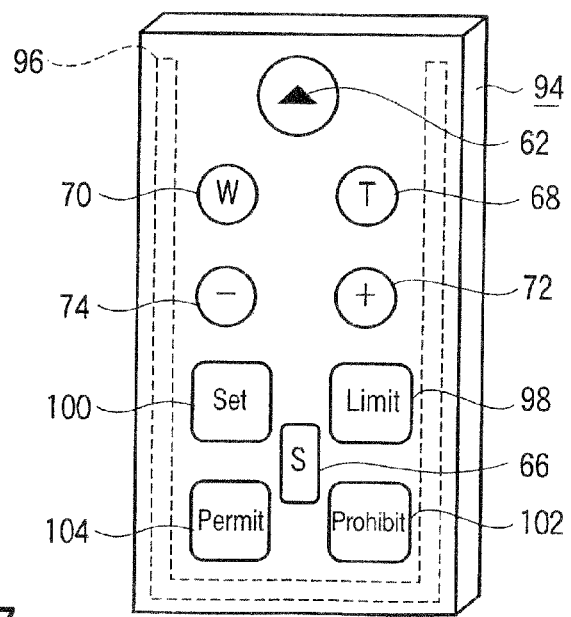
FIG. 7 is a perspective view showing the appearance of the configuration of a radio remote controller as another example of the commanding device according to the first embodiment of the invention.

FIG. 7 is a perspective view showing the external appearance of a radio remote controller 94 for the camera as another example of the authentication mode switching remote controller. In this drawing, the functional members similar to those of the optical remote controller 12 described above are designated by the same reference numerals, respectively. Specifically, the radio remote controller 94 has a built-in antenna 96 for transmitting a command radio signal, and the command is transmitted to the image acquisition device through the antenna 96.

The upper surface of the radio remote controller 94 has arranged thereon an image acquisition command button 62, a sensitivity switching button 66, a telephoto button 68, a wide-angle button 70, a plus button 72, a minus button 74, a limiting button 98, a setting button 100, a prohibit button 102, a permit button 104, etc. The radio remote controller 94 transmits an image acquisition execution command to the camera proper 14 as an image acquisition command when the image acquisition command button 62 is depressed. Also, upon depression of the telephoto button 68, a T button command is issued to the camera proper 14 as the image acquisition command to drive the lens unit 16 to the telephoto side. When the wide-angle button 70 is depressed, on the other hand, a W button command is issued to the camera proper 14 as an image acquisition command to drive the lens unit 16 to the wide-angle side. Upon depression of the plus button 72, a command to feed the frames in play mode or move the selection items at the time of menu selection is issued as an image acquisition command. Upon depression of the minus button 74, a command to feed the frames in play mode or move the selection items at the time of menu selection is issued as an image acquisition command.

The commands described above are transmitted at high output as a general command. The authentication mode switching commands described below, on the other hand, are transmitted at low output as an authentication command.

Specifically, when the limiting button 98 is depressed, a limit command is issued as an authentication mode switching command, and in accordance with the receipt thereof, the camera proper 14 switches to the limiting mode. Also, upon depression of the setting button 100, a setting command is issued as an authentication mode switching command and in accordance with the reception thereof, the camera proper 14 switches to the setting mode. Further, upon depression of the prohibit button 102, a prohibit command is issued as an authentication mode switching command, and in accordance with the reception thereof, the camera proper 14 switches to the prohibit mode. Furthermore, upon depression of the permit button 104, a permit command is issued as an authentication mode switching command, and in accordance with the reception thereof, the camera proper 14 switches to the permit mode.

Also, upon depression of the sensitivity switching button 66, the sensitivity switching command for switching the command reception sensitivity of the camera proper 14 is transmitted, thereby to switch the command reception sensitivity of the camera proper 14 as described in detail later.

As described above, in the radio remote controller 94, unlike in the optical remote controller 12 or 76, the authentication setting switch is omitted, and buttons for the image acquisition command and buttons for the authentication mode switching are arranged independently of each other. Incidentally, the operation of switching the authentication mode is so important that a configuration may be employed in which the switching command to switch to the corresponding authentication mode is transmitted upon simultaneous depression of any one of the buttons 98 to 104 and the image acquisition command button 62 in order to prevent a malfunction which otherwise might be caused by accidental operation or the like.

Incidentally, as another example of the configuration of the radio remote controller 94 having the aforementioned button arrangement, an authentication command remote controller may be implemented in which all the commands are transmitted as an authentication command with the authentication information.

Also, the authentication command remote controller can be implemented by the optical remote controller having such a button arrangement.

Figure 8:
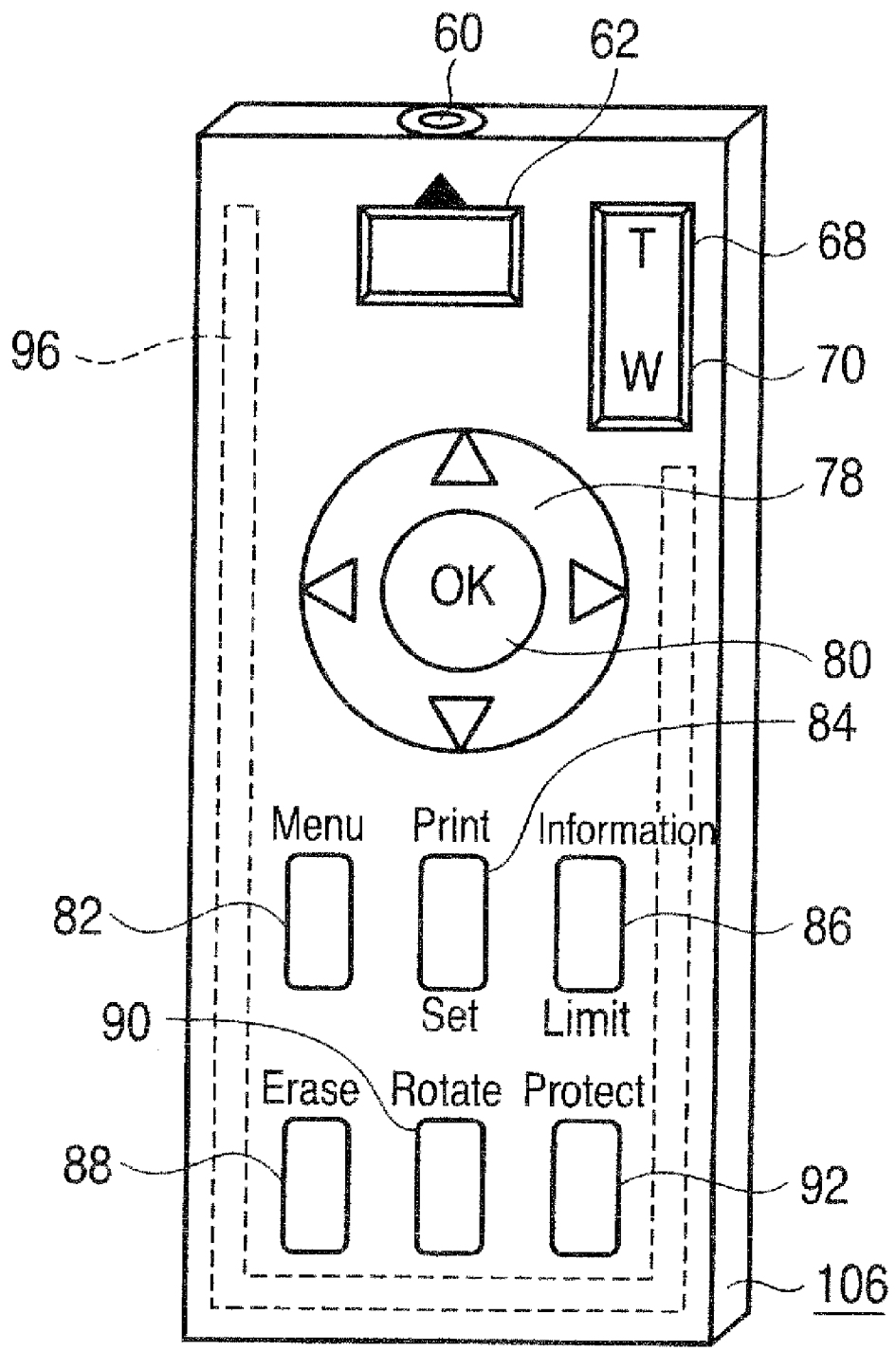
FIG. 8 is a perspective view showing the outer configuration of another optical remote controller as another example of the commanding device according to the first embodiment.

FIG. 8 is a perspective view showing the external appearance of a optical remote controller 106 for the camera as an example of the common remote controller. In this drawing, the functional members similar to those of the optical remote controllers 12, 76 and the radio remote controller 94 described above are designated by the same reference numerals, respectively. The optical remote controller 106 without this authentication function can transmit only the general command and has no authentication setting switch 64. As described later, therefore, the commands for the functions permitted as permit mode or limit mode of the camera proper 14 can be transmitted.

Specifically, on the end surface of this optical remote controller 106, a light-emitting unit 60 for command transmission is arranged so that the command from the light-emitting unit 60 is transmitted to the camera proper 14 in the form of the general command. On the upper surface of the optical remote controller 106, on the other hand, there are arranged an image acquisition command button 62, a telephoto button 68, a wide-angle button 70, a cross switch 78, an OK button 80, a menu button 82, a print button 84, an information button 86, an erase button 88, a rotation button 90, a protection button 92, etc.

Incidentally, a radio remote controller having a button arrangement similar to the optical remote controller 106 can also be configured. In such a case, the light-emitting unit 60 is replaced by a built-in antenna 96 for transmitting the command radio signal, as indicated by dashed line in FIG. 8, and the command is transmitted to the camera proper 14 in the form of the general command by the antenna 96. Naturally, the remote controller having both functions of optical and radio remote controllers can also be configured. Such a remote controller has both the light-emitting unit 60 and the antenna 96, each with corresponding circuits.

The optical remote controller 106, upon depression of the image acquisition command button 62, transmits the image acquisition execution command as an image acquisition command to the camera proper 14 in the form of the general command. Upon depression of the telephoto button 68, on the other hand, the T button command is transmitted as an image acquisition command in the form of the general command, while upon depression of the wide-angle button 70, the W button command is transmitted as an image acquisition command in the form of the general command. The cross switch 78 is a four-way seesaw switch adapted to be depressed up, down, left or right, and transmits the operation command corresponding to the direction of depression as an image acquisition command in the form of the general command. Upon depression of the OK button 80, the OK command is transmitted as an image acquisition command in the form of the general command. Upon depression of the menu button 82, the menu command is transmitted as an image acquisition command in the form of the general command. Also, upon depression of the erase button 88, the erase command is transmitted as an image acquisition command in the form of the general command.

Also, upon depression of the print button 84, the print command is transmitted as an image acquisition command in the form of the general command. Upon depression of the information button 86, the information display command is transmitted as an image acquisition command in the form of the general command. Upon depression of the rotation button 90, the rotation command is transmitted as an image acquisition command in the form of the general command. Upon depression of the protection button 92, the protection command is transmitted as an image acquisition command in the form of the general command.

The remote controllers 12, 76, 94 and 106 described above are each an example of the commanding device, and the invention is not of course limited to the above-mentioned configuration. For example, a radio remote controller having the switches and the buttons of the remote controller 12 or 76 or an optical remote controller having the switches and buttons of the remote controller 94 may be employed. Further, switches and buttons may be added.

Figure 9:
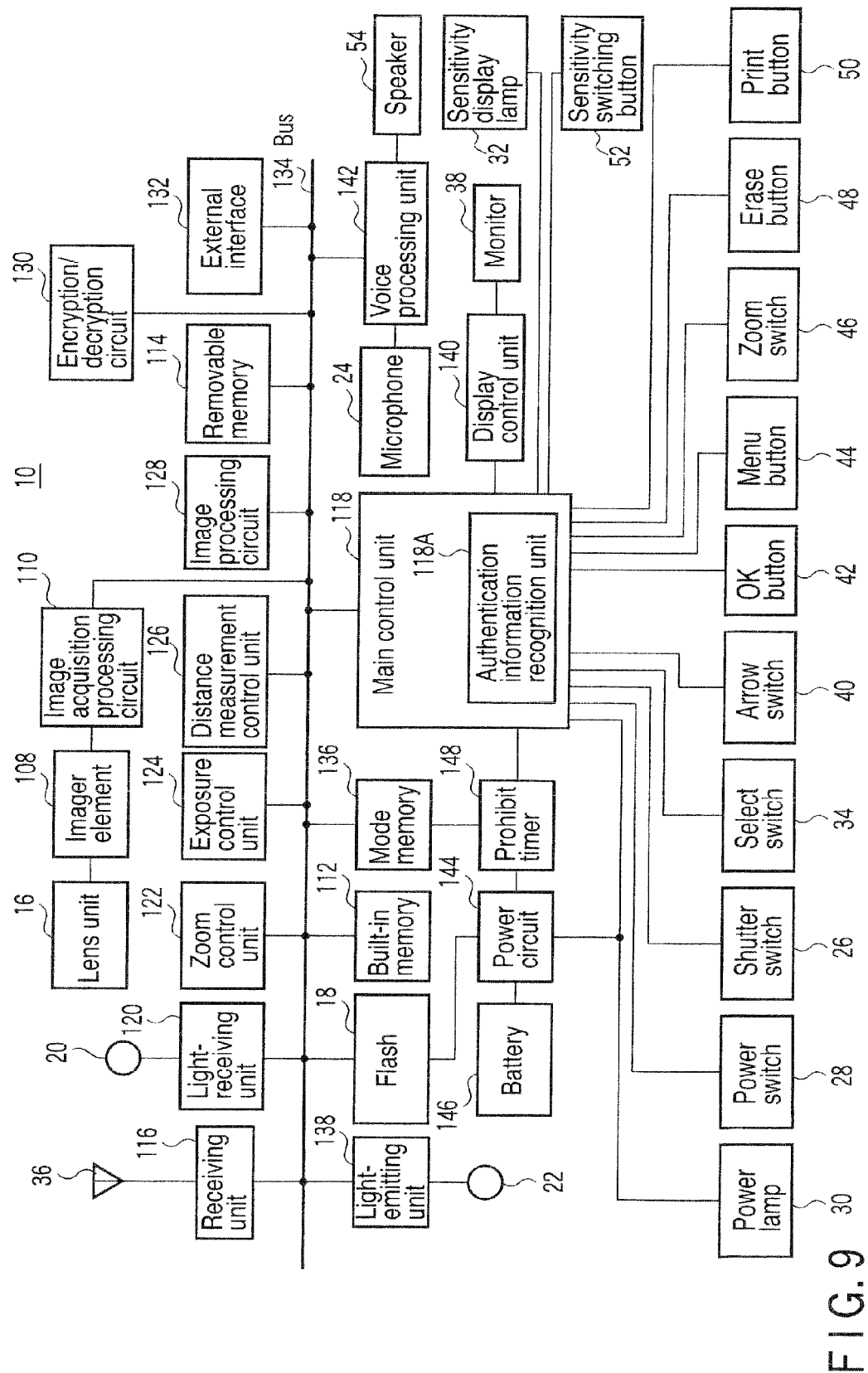
FIG. 9 is a block diagram showing an electronic configuration of the digital camera shown in FIG. 1.

Next, the electronic configuration of the digital camera 10 described above will be explained. As shown in FIG. 9, the digital camera 10 includes an imager element 103 for converting the image of an object focused thereon by the lens unit 16 into an electrical signal. The lens unit 16 focuses the image of the object on the imager element 108. The lens unit 16, depending on the type of the image acquisition device, has the shutter function of single-lens reflex camera type or lens shutter type on the one hand, and the zoom function, the auto focus function and the brightness reduction function on the other hand. As the imager element 108, the CCD or CMOS sensor having pixels on the order of one million or more than ten million is used. An image acquisition processing circuit 110 processes the signal from the imager element 108, and by analog-to-digital conversion, records it in a built-in memory 112 or a removable memory 114 in a predetermined format set in the menu or the like. As such a format, the RAW data format with the image not compressed, the JPEG format based on the standard compression scheme, or in the case of dynamic images, the motion JPEG format, the MPEG2 or MPEG4 format is used.

In a receiving unit 116, the signal received through the antenna 36 as a command radio signal from a radio remote controller such as the radio remote controller 94 is amplified, demodulated, and in collaboration with a main control unit 118, decoded and converted into command data. As described in detail later, the receiving unit 116 can switch the reception ability thereof. Specifically, in collaboration with the main control unit 118, the reception sensitivity is switched by switching the amplification factor of an amplifier or by reducing the reception sensitivity using an attenuator. By receiving the authentication command with a reduced reception sensitivity, the range in which the authentication command is accepted can be limited as compared with the general command, so that the command is received from the range intended by the operator, thereby improving the security of transmission/reception of the authentication command.

In a light-receiving unit 120, the command light from the optical remote controller 12, 76 or 106 described above is converted into an electrical signal by a photodetector element 20, amplified, demodulated, and in collaboration with the main control unit 118, decoded and converted into command data. As described in detail later, the light-receiving unit 120 can switch the light reception ability thereof. Specifically, in accordance with the switching command from the main control unit 118, the light reception sensitivity is switched by switching the amplification factor of an amplifier or by reducing the reception sensitivity using an attenuator. By receiving the light of the authentication command by reducing the light reception sensitivity, the range in which the authentication command is accepted can be limited as compared with the light reception range of the general command. Thus, the command light is received from the range intended by the operator, thereby improving the security of authentication command transmission/reception.

Incidentally, in the case where only one of the optical type remote controller and the radio remote controller is used, the corresponding parts including the antenna 36 and the receiving unit 116 or, as the case may be, the photodetector element 20 and the light-receiving unit 120 are of course included to serve the purpose.

In the case where a still image or a dynamic image can be acquired, a zoom control unit 122 drives the lens unit 16 by operating the zoom switch 46 of the camera proper 14 or the telephoto button 68 or the wide-angle button 70 of the remote controller 12, 76, 94 or 106. An exposure control unit 124, in accordance with the image acquisition conditions set in the digital camera 10, controls the diaphragm or the imager element 108 in accordance with the brightness of the object. A distance measurement control unit 126 controls the operation of driving the lens unit 16 and the detection of the focal point using the signal from the imager element 108.

An image processing circuit 128, in collaboration with the program and the CPU of the main control unit 118, executes such processes as the enlargement/reduction, compression/expansion, distortion correction, color correction, noise removal, synthesis and rotation of the image. The removable memory 114 for recording the image is configured of a semiconductor memory card and a hard disk drive, and can be mounted on or demounted from the connector (not shown) of the camera proper 14. This removable memory 114 has the capacity of several tens of megabytes to several gigabytes to record the image and the attribute information thereof. An encryption/decryption circuit 130 is used to encrypt the image recorded and to decrypt the encrypted image in the removable memory 114. This process can be omitted, however, and can alternatively be executed according to a program by the CPU of the main control unit 118. An external interface 132 includes the signal conversion function and the connector for connecting the digital camera 10 to the printer or the personal computer, the external storage device such as the hard disk or the TV receiver (hereinafter referred to simply as TV). The connection with the printer can use the Picto-Bridge, while the personal computer or the external storage device can be connected using USB, and with the TV using the video cable or the like.

A bus 134 is a group of common signal lines connecting the units, and includes the data bus, the address bus and the control bus. The main control unit 118, though not specifically illustrated, is a microcomputer system including CPU, ROM, RAM, register, counter, timer and the rewritable non-volatile memory to take charge of control, display and the data processing of the digital camera 10 as a whole. The nonvolatile memory in the main control unit 118 has recorded therein fixed remote controller identification information for identifying the authentication mode switching remote controller and the authentication command remote controller corresponding to the digital camera 10. This main control unit 118 has an authentication information recognition unit 118A for recognizing the authentication information from the remote controller 12, 76 or 94 using the fixed remote controller identification information as authentication information. In this way, according to the first, embodiment, the fixed remote controller identification information is used as the authentication information. Incidentally, the fixed remote controller identification information is recorded preferably before the factory shipment or sales of the digital camera 10. Further, the fixed remote controller identification information is desirably encrypted to prevent illegal use.

The built-in memory 112, which cannot be removed from, the digital camera 10, can record the image in the case where the recording of the acquired image only in the built-in memory 112 is selected. Further, this built-in memory 112 can record the image acquired in prohibit mode, or record the image in the case where the removable memory 114 is at full capacity in limit mode or permit mode. A suitable built-in memory 112 is a semiconductor memory of several tens of megabytes to several gigabytes or a miniature hard disk of the order of several hundred megabytes to ten gigabytes.

A mode memory 136 is configured of a nonvolatile memory and can store and hold the authentication mode. The stored data is held even when power is off. As a result, even in the case where the battery is removed willfully or negligently in prohibit mode, the particular prohibit mode setting is maintained when power is switched on in the next session.

The flash 18 emits the flash light in accordance with the flash mode set by the menu at the time of acquiring a still image. The flash mode includes the mode in which the light is emitted automatically in a dark environment or in rear light, the soft light emission mode in which light is emitted weakly, the red-eye reduction mode in which the light is emitted preliminarily several times before the main light emission, the forced light emission mode in which the light is forcibly emitted, the light emission prohibit mode in which no light is emitted, etc. A light-emitting unit 138 controls the lighting of the light-emitting element 22. A display control unit 140 controls the display of the acquired image, reproduced image, the menu, the information or the alarm characters or symbols on the monitor 38. A voice processing unit 142 processes and records the sound acquired by the microphone 24 during the image acquisition operation, reproduces and supplies the recorded sound to the speaker 54 during the play mode, or supplies the alarm sound or the like to the speaker 54.

In a power circuit 144, the power from a battery 146 or an external power supply (not shown) is converted into a required voltage and supplied to each part. The battery 146 is replaceable and includes a lithium ion rechargeable battery dry cell.

A prohibit timer 148, upon the lapse of a preset time after starting, times out and sets the authentication mode of the mode memory 136 to the prohibit mode. In collaboration with the battery 146 and the power circuit 144, the prohibit timer 148 is kept supplied with power and continues the counting operation even in the case where the power of the camera proper 14 is in the off state. Upon the lapse of a preset time, the time runs out and the authentication mode of the mode memory 136 is turned to the prohibit mode. In the process, the prohibit mode may be set according to a program after power is supplied to the main control unit 118 and the mode memory 136 for a short time. As an alternative, the mode memory 136 may be set to the prohibit mode by generating the prohibit mode setting address or the prohibit mode data and driving the control bus for a short time in such a manner that the prohibit mode of the mode memory 136 can be set by the prohibit timer 148 without the intermediary of the main control unit 118. Also, the power circuit 144 may be assigned the voltage monitor function to set the prohibit mode before the voltage reaches an insufficient level for the circuit operation. In the case where the battery 146 is pulled off, the prohibit mode may be forcibly set upon lapse of a preset time taking the presence or absence of the backup battery or capacitor into consideration.

By employing this method, the situation can be prevented in which the battery 146 is pulled off willfully or negligently or left consumed up while the backup battery or capacitor is consumed to such an extent that the prohibit, timer 148 cannot perform the counting operation with the result that, the prohibit mode cannot be set upon lapse of the preset time, thereby making it possible to use the digital camera 10.

The power switch 28 turns on/off the power of the camera proper 14, and as long as the power is on, the power lamp 30 is turned on. The shutter switch 26, the sensitivity display lamp 32, the select switch 34, the cross switch 40, the OK button 42, the menu button 44, the zoom switch 46, the erase button 48, the print button 50 and the sensitivity switching button 52 are already explained with reference to FIGS. 1 and 2. Each switch and button are connected to the interrupt line and/or the input/output port of the CPU of the main control unit 118.

The digital movie camera 56 is formed to have the appearance in the shape taking the operability for the protracted dynamic image acquisition operation into consideration. The basic functional configuration, however, is similar to that of the digital camera 10 shown in FIG. 9.

Figure 10:
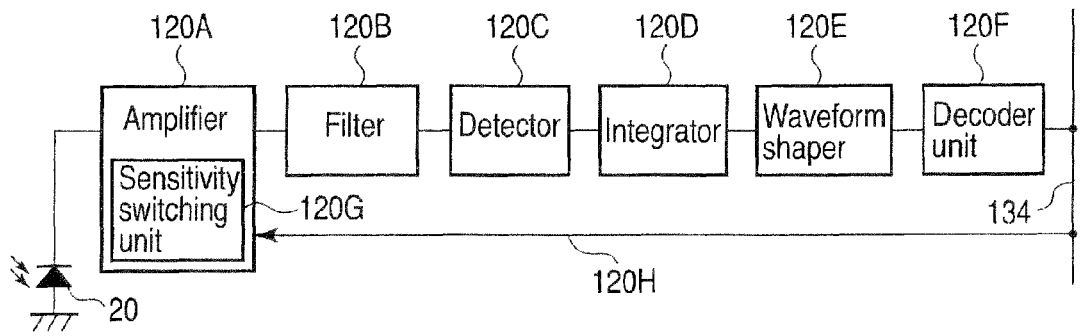
FIG. 10 is a block diagram showing the configuration of a light-receiving unit of the digital camera.

Next, the configuration of the light-receiving unit 120 in the digital camera 10 will be explained with reference to FIG. 10. The photodetector element 20 converts the light from the optical remote controller 12, 76 or 106 into an electric current. Incidentally, the photodetector element 20 preferably has, on the front surface thereof, an optical filter (not shown) for passing the light conforming with the wavelength involved thereby to remove the effect of the external light disturbance. The current converted by the photodetector element 20 is amplified by an amplifier 120A and, after the band conforming to the carrier frequency is passed by a filter 120B, detected by a detector 120C. Thus, the carrier frequency component is removed by an integrator 120D thereby to reproduce the signal component. The signal component thus reproduced is shaped in a waveform shaper 120E and converted into the information corresponding to the command by a decoder unit 120F.

Also, the amplifier 120A is provided with a sensitivity switching unit 120G. The sensitivity switching unit 120G is supplied with a sensitivity switching signal 120H from the main control unit 118 upon depression of the sensitivity switching button 52 of the camera proper 14 or in the case where the information converted by the decoder unit 120F is the sensitivity switching command from the optical remote controller 12 or 76. In accordance with the sensitivity switching signal 120H, the sensitivity switching unit 120G switches the reception sensitivity of the command light by switching the amplification factor of the amplifier 120A or reducing the light reception sensitivity using an attenuator. Especially, at the time of receiving the authentication command, the security of the authentication command transmission/reception can be improved by reducing the light reception sensitivity and limiting the range of authentication command acceptance as compared with the reception of the general command light thereby to receive the command light in the range intended by the operator.

Figure 11:
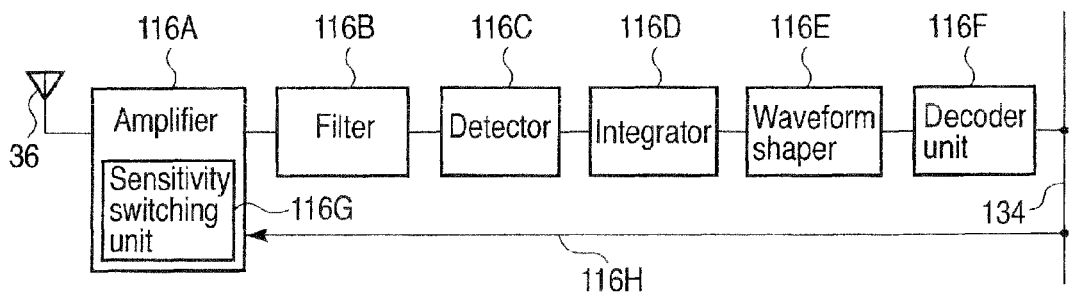
FIG. 11 is a block diagram showing the configuration of a receiving unit of the digital camera.

Next, the configuration of the receiving unit 116 in the digital camera 10 will be explained with reference to FIG. 11. The antenna 36 converts the radio signal from the radio remote controller 94 into an electric current. The current thus converted by the antenna 36 is amplified by an amplifier 116A, and after the band conforming with the carrier frequency is passed through a filter 116B, detected by a detector 116C, after which the carrier frequency component is removed by an integrator 116D thereby to reproduce the signal component. The signal component thus reproduced is shaped by a waveform shaper 116E and converted into the information corresponding to the command by a decoder unit 116F.

Also, the amplifier 116A is provided with a sensitivity switching unit 116G. The sensitivity switching unit 116G is supplied with a sensitivity switching signal 116H from the main control unit 118 upon depression of the sensitivity switching button 52 of the camera proper 14 or in the case where the information converted by the decoder unit 116F is the sensitivity switching command from the radio remote controller 94. In accordance with the sensitivity switching signal 116H, the sensitivity switching unit 116G switches the reception sensitivity of the command light by switching the amplification factor of the amplifier 116A or reducing the light reception sensitivity using an attenuator. Especially, at the time of receiving the authentication command, the security of the authentication command transmission/reception can be improved by reducing the light reception sensitivity and limiting the range of authentication command acceptance as compared with the reception of the general command light thereby to receive the command light in the range intended by the operator.

Next, with reference to FIG. 12, an example of the electronic configuration of the optical remote controller 12 will be explained. A control unit 150 reads the state of the authentication setting switch 64 when any of the buttons 62, 66 to 74 is turned on and produces a command signal corresponding to the particular state. Also, the control unit 150 has an authentication information storage unit 150A with a nonvolatile memory for recording the fixed remote controller identification information as the authentication information to identify the remote controller with the authentication information corresponding to the image acquisition device. The fixed remote controller identification information is recorded in the authentication information storage unit 150A desirably before factory shipment or distribution. Further, the fixed remote controller identification information is desirably encrypted to prevent illegal use.

The control unit 150 produces the signal as long as the button is kept depressed for a preset length of time. In a modulator 152, the carrier wave produced by an oscillator 154 is modulated by the signal from the control unit 150 thereby to drive a transistor 156 and blink the light-emitting unit 60. The resistor 158 is for limiting the current. A light-emitting unit 60 is constituted of the infrared light-emitting diode having the wavelength of 900 to 950 nm in many cases. Nevertheless, the light of other wavelength or visible light may be used.

Also, the modulator 152 includes an output switching unit 152A for switching the signal output from the light-emitting unit 60 under the control of the control unit 150. As a method of switching the signal output by this output switching unit 152A, the modulation degree of the modulator 152 for the carrier signal is switched, thereby to control the signal level reproduced at the receiving end. Specifically, by increasing the modulation degree, the signal level reproduced at the receiving end is increased, and vice versa.

Incidentally, the common remote controller can be configured by removing the authentication setting switch 64, the sensitivity switching button 66, the authentication information storage unit 150A and the output switching unit 152A from the optical remote controller 12 described above. In this common remote controller, the general command corresponding to each button is transmitted from the light-emitting unit 60 at normal output.

Figure 12:
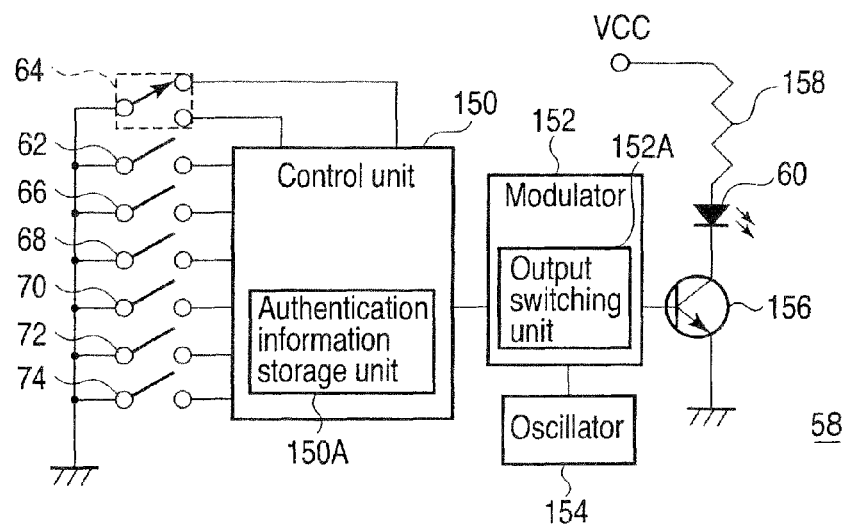
FIG. 12 is a block diagram showing an example of the electrical configuration of the remote controller of FIG. 1.
Figure 13:
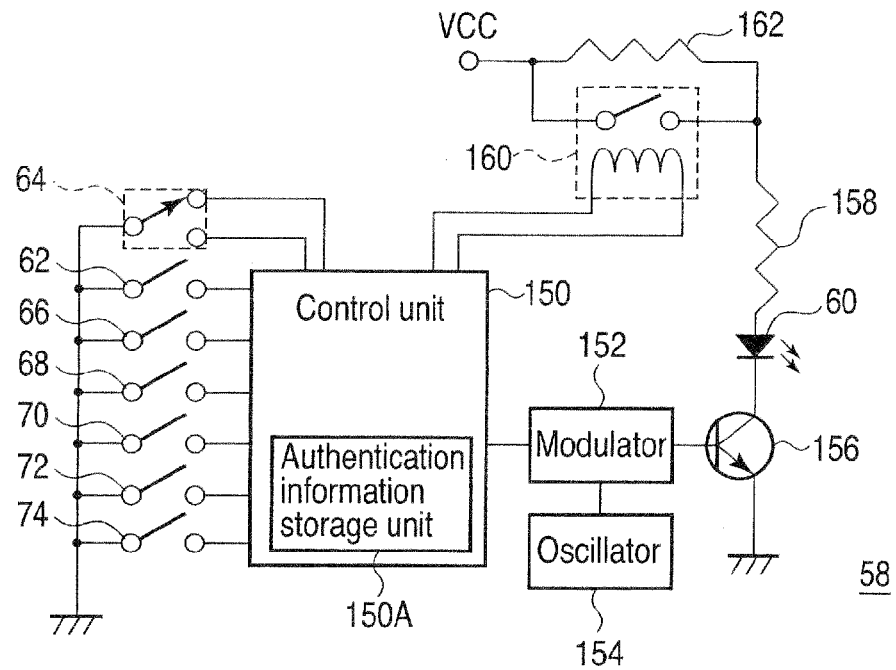
FIG. 13 is a block diagram showing another example of the electrical configuration of the remote controller of FIG. 1.

Also, the optical remote controller 12 may be electrically configured as shown in FIG. 13. Specifically, the control unit 150, the buttons 62, 66 to 74, the authentication setting switch 64, the authentication information storage unit 150A, the modulator 152, the oscillator 154, the light-emitting unit 60 and the resistor 158 are similar to the corresponding parts, respectively, of the configuration example shown in FIG. 12. In the present configuration example, on the other hand, the modulator 152 lacks the output switching unit 152A, and in its place, includes a resistor 162 and a change-over switch 160 for switching the signal output from the light-emitting unit 60 by limiting the current flowing in the light-emitting unit 60 under the control of the control unit 150. In this configuration, only the resistor 158 is connected between the light-emitting unit 60 and the power supply VCC and therefore the output increases when the changeover switch 160 is on. When the changeover switch 160 is off, on the other hand, the insertion of the resistor 162 in series with the resistor 158 reduces the current flowing in the light-emitting unit 60 to lower the output.

Incidentally, in the common remote controller with the authentication setting switch 64, the sensitivity switching button 66, the authentication information storage unit 150A, the changeover switch 160 and the resistor 162 removed from the optical remote controller 12 having the aforementioned configuration, the general command corresponding to each button is transmitted at normal output from the light-emitting unit 60.

Figure 14:
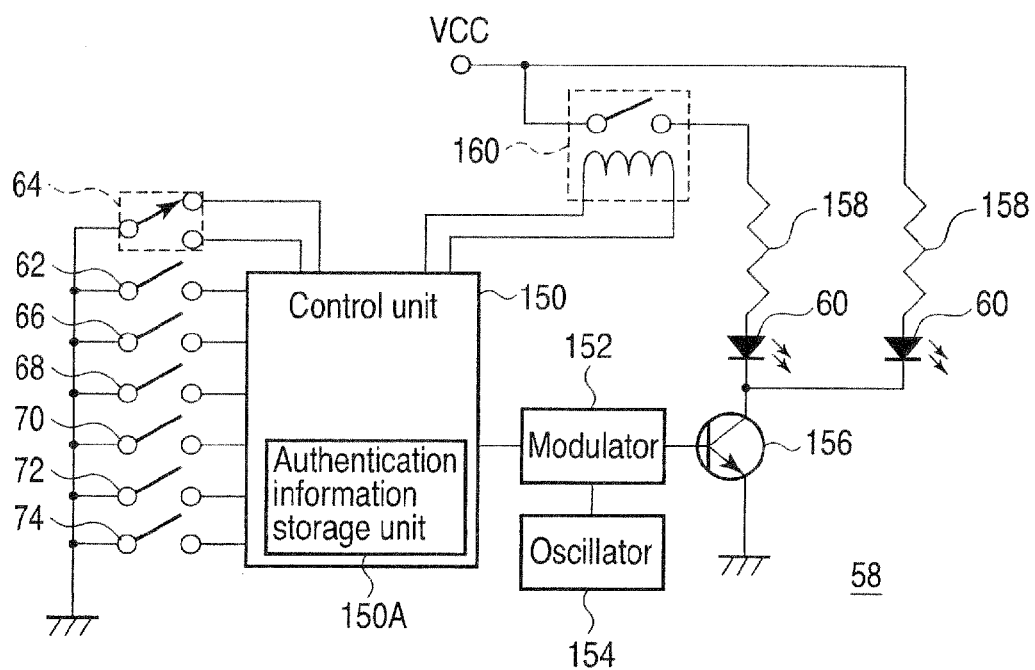
FIG. 14 is a block diagram showing a further example of the electrical configuration of the remote controller of FIG. 1.

Further, the optical remote controller 12 can be configured electrically as shown in FIG. 14. The control unit 150, the buttons 62, 66 to 74, the authentication setting switch 64, the sensitivity switching button 66, the authentication information storage unit 150A, the modulator 152, the oscillator 154, the light-emitting unit 60 and the resistor 158 are similar to the corresponding parts, respectively, of the configuration example shown in FIG. 13. In this configuration example, the signal output of the optical remote controller 12 is switched by providing a plurality of the light-emitting units 60 and switching the number of the light-emitting units 60 turned on. Specifically, as long as the changeover switch 160 is in the on state, a plurality of the light-emitting units 60 are turned on and the output increases. Once the changeover switch 160 is turned off, on the other hand, a smaller number of the light-emitting units 60 in the on state reduces the output. Incidentally, although two light-emitting units 60 and two resistors 158 are used in FIG. 14, three of them each may naturally be used instead. Also, by changing the type of the light-emitting unit 60 and thus changing the wavelength, the output, the light-emission angle and the area of the light-emitting unit 60, the substantive light-emission output or the effective received energy as viewed from the receiving end may be changed.

Incidentally, in the case of the common remote controller with the authentication setting switch 64, the sensitivity switching button 66, the authentication information storage unit 150A, the changeover switch 160, the resistor 158 in series with the changeover switch 160, and the light-emitting unit 60 removed from the optical remote controller 12 having the aforementioned configuration, the general command corresponding to each button is transmitted at normal output from the light-emitting unit 60.

Next, with reference to FIG. 15, an example of the electronic configuration of the optical remote controller 76 will be explained. The control unit 150 reads the state of the authentication setting switch 64 when any of the buttons and switches 62, 66 to 70, 78 to 92 is turned on, and produces a command signal corresponding to the particular state. Also, the control unit 150 has an authentication information storage unit 150A with a nonvolatile memory to record the fixed remote controller identification information as the authentication information for identifying the remote controller with the authentication information corresponding to the image acquisition device. The fixed remote controller identification information is recorded in the authentication information storage unit 150A desirably before factory shipment or distribution. Further, the fixed remote controller identification information is desirably encrypted to prevent illegal use.

The control unit 150 produces the signal as long as a button or switch is kept depressed for a preset length of time. In the case where the carrier frequency of 40 kHz is used, the use of the light-emitting unit 60 configured of a light-emitting diode and the control unit 150 whereby the light-emitting diode can be driven directly by the one-chip microcomputer can generate a high-frequency modulation signal according to a program, and the configuration can be employed without the modulator 152, the oscillator 154 and the transistor 156. As a result, the light-emitting unit 60 connected to the power supply through the current-limiting resistor 158 is connected directly to the control unit 150.

In this configuration, the output signal from the light-emitting unit 60 is switched under the control of the control unit 150. As a method of switching the signal output, the modulation degree of the carrier signal is switched by the control unit 150 thereby to control the signal level reproduced at the receiving end. Specifically, the signal level reproduced at the receiving end is increased by increasing the modulation degree, while the signal level reproduced at the receiving end is decreased by decreasing the modulation degree.

Also, the optical remote controller 76 can be electrically configured as shown in FIG. 16. The control unit 150 and the switches 62, 66 to 70, 78 to 92 are similar to the corresponding parts, respectively, of the configuration example shown in FIG. 15. In this configuration example, the signal output is switched not by controlling the modulation degree but by limiting the current flowing in the light-emitting unit 60 under the control of the control unit 150. This configuration example, therefore, includes a changeover switch 160 and a resistor 162. As long as the changeover switch 160 is in the on state, only the resistor 158 is connected between the light-emitting unit 60 and the power supply VCC, and therefore, the output is increased. In the case where the changeover switch 160 is in the off state, on the other hand, the insertion of the resistor 162 in series with the resistor 158 reduces the current flowing in the light-emitting unit 60 for a lower output.

Further, the optical remote controller 76 described above may be electrically configured as shown in FIG. 17. The control unit 150 and the switches 62, 66 to 70, 78 to 92 are similar to the corresponding parts, respectively, of the configuration example shown in FIG. 15. In this configuration example, a plurality of light-emitting units 60 are provided and the signal output is switched by switching the number of the light-emitting units 60 in the on state under the control of the control unit 150. In the case where a plurality of the light-emitting units 60 are turned on, the output is increased, and vice versa. Incidentally, although two each of the light-emitting units 60 and the resistors 158 are provided in FIG. 17, three each of them may naturally be provided instead. Also, by changing the type of the light-emitting unit 60, i.e. by changing the wavelength, the output, the light emission angle or the area of the light-emitting unit 60, the substantive light emission output or the effective received energy as viewed from the receiving end may be changed.

Next, an example of the electronic configuration of the radio remote controller 94 will be explained with reference to FIG. 18. When anyone of the buttons 62, 66 to 74, 98 to 104 is turned on, the control unit 150 of this radio remote controller 94 produces the command signal corresponding to the function of the particular button. Also, the control unit 150 has an authentication information storage unit 150A with a nonvolatile memory to record the fixed remote controller identification information as the authentication information. The fixed remote controller identification information is recorded in the authentication information storage unit 150A desirably before factory shipment or distribution. Further, the fixed remote controller identification information is desirably encrypted to prevent illegal use.

The control unit 150 continues to produce the signal as long as the button or switches are kept depressed for a preset length of time. In the modulator 152, the carrier wave produced by the oscillator 154 is modulated by the signal from the control unit 150 and, after being amplified by a power amplifier 164, the radio signal is radiated from the antenna 96. The power amplifier 164 includes an output switching unit 164A, so that the output from the power amplifier 164 is switched by an output switching signal 166 under the control of the control unit 150.

Incidentally, in the case where the radio remote controller 94 having the button arrangement as shown in FIG. 7 is implemented as an authentication command remote controller for transmitting all the commands with the authentication information as authentication commands, the output switching unit 164A shown in FIG. 18 is not required. The output from the power amplifier 164, as compared with the case in which the general command is transmitted by other remote controllers, is set at a low output and the distance for communication with the image acquisition device is correspondingly shortened.

Also, in the optical remote controller 106 making up the common remote controller shown in FIG. 8, on the other hand, a configuration with the authentication setting switch 64, the sensitivity switching button 66 and the authentication information storage unit 150A removed from the configuration example shown in FIG. 15, for example, is employed to transmit the general command without the authentication information at normal output from the light-emitting unit 60. The radio remote controller having the button arrangement similar to the optical remote controller 106 employs the configuration example shown in FIG. 16 in the absence of the plus button 72, the minus button 74, the limit button 93, the setting button 100, the prohibit button 102, the permit button 104, the authentication information storage unit 150A, the output switching unit 164A and the output switching signal 153, and in the presence of the cross switch 78, the OK button 80, the menu button 82, the print button 84, the information button 86, the erase button 88, the rotation button 90 and the protection button 92. In this configuration, the general command without the authentication information is transmitted at normal output from the antenna 96.

Next, the signals produced in the optical remote controller 12, 76 or 106 will be explained with reference to FIGS. 19 to 22.

In transmitting the 1-byte data of 8 bits, the transmission data signal, as shown in FIG. 19, is configured of a leader code 166, an 8-bit data portion 168 and a stop code 170. FIG. 20 is a diagram showing the structure of one bit of the data signal. The binary "0" is expressed by one millisecond (ms) as the sum of the on and off states each equal to the signal unit time T of 500 microseconds (μs), and the binary "1" by 2 ms as the sum of the on state of 1 T and the off state of 3 T. The data signal shown in FIG. 19 includes the leader code 166 of 6 ms as the sum 12 T of the on state of 8 T and the off state of 4 T, the 8-bit data ("01010011") having four binary 0s of 4 ms and four binary 1s of 8 ms for the total of 12 ms, and the stop code 170 having 60 T of 30 ms. Thus, the data signal has a total of 48 ms.

In sending n bytes of data, as shown in FIG. 21, the leader code 166 is followed by n-byte data portion 168 and then the stop code 170.

The output waveform as shown in anyone of FIGS. 12 to 14 is produced by the modulator 152 of the optical remote controller 12 shown in FIG. 22. FIG. 22 shows the waveform of binary "0" obtained by modulating the carrier from the oscillator 152 with the data signal from the control unit 150 to drive the transistor 156. In the case of the carrier frequency of 40 kHz, 20 carrier wave pulses are inserted in 1 T of 500 μs thereby to blink the light-emitting unit 60.

This is also the case with the output waveform transmitted to the light-emitting unit 60 from the control unit 150 of the optical remote controller 76 (and 106) shown in FIG. 15.

The light from the light-emitting unit 60 is reproduced by the photodetector 20 of the camera proper 14 in the form approximate to the modulated waveform substantially as shown in FIG. 22 which carries various forms of noise and the DC component. After removing the noise through the bandpass filter 120B of the carrier frequency 40 kHz, the signal waveform shown in FIG. 21 is reproduced by the detector 120C, the integrator 120D and the waveform shaper 120E, followed by being converted into the data by the decoder unit 120F.

Next, the data format of the command of the optical remote controller 12, 76 or 106 will be explained.

Figure 23A:
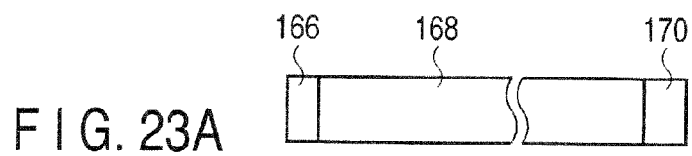
FIG. 23A is a diagram showing an example of the data format of the general command.
Figure 23B:
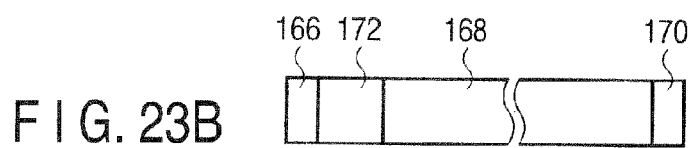
FIG. 23B is a diagram showing another example of the data format of the general command.
Figure 23C:
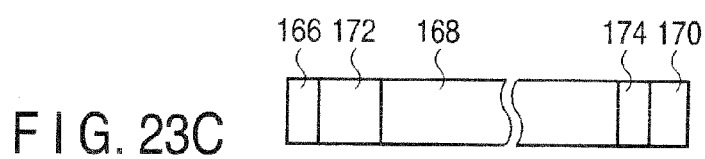
FIG. 23C is a diagram showing a further example of the data format of the general command.

The general command, as shown in FIG. 23A, is basically formed in such a manner that the data portion 166 indicating the content of the command is held between the leader code 166 and the stop code 170, and may be either fixed or variable in length. FIG. 23A corresponds to FIG. 21. Also, in the general command, as shown in FIG. 23B, a header 172 may be attached before the data portion 168 to add the data format and the type of the remote controller in a fixed form. Further, as shown in FIG. 23C, the data for error detection or the P-byte data for error correction (ECC 174) may be added after the data portion 168. As an alternative, the data bit pattern such as used in the commercially available remote controller for the home electronic appliances may be sent in an inverted form immediately following the data to detect the presence or absence of an error by coincidence or incoincidence between the two signals.

Figure 24A:
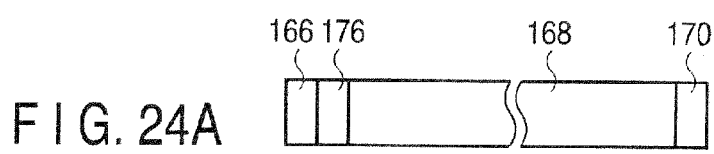
FIG. 24A is a diagram showing an example of the data format of the authentication command.
Figure 24B:
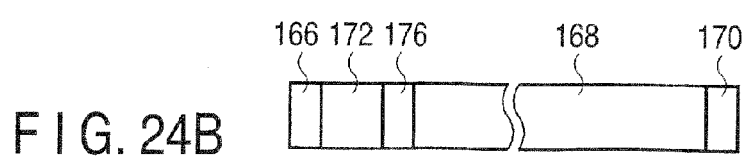
FIG. 24B is a diagram showing another example of the data format of the authentication command.

Also, in the authentication command, the fixed remote controller identification information is added further as the authentication information. Specifically, in this case, as shown in FIGS. 24A to 24C, an independent fixed remote controller identification information 176 is added and transmitted. As an alternative, the fixed remote controller identification information 176 may be transmitted as a part contained in the data portion 168 or the header 172 as authentication information (in this case, the data format is as shown in FIGS. 23A to 23C).

This fixed remote controller identification information 176 is the same as the fixed remote controller identification information stored in the authentication information recognition unit 118A of the main control unit 118 of the digital camera 10 described in FIG. 9 and used to determine whether the command is transmitted from the right remote controller or not. As explained with reference to FIGS. 12 and 13, the same fixed remote controller identification information 176 is written in the authentication information storage unit 150A of the control unit 150 of the remote controllers 12, 76 paired with the digital camera 10. As a result, in the case where the remote controller 12 or 76 or the digital camera 10, whichever is broken or lost, is repurchased, therefore, the purchaser using the ID certificate or the like, can prove to the maker or the distributor that he/she is a legal owner and the article is not the stolen one, and thus can have the fixed remote controller identification information rewritten.

Next, the signal produced by the radio remote controller 94 will be explained. The data signal supplied from the control unit 150 to the modulator 152 shown in FIG. 18 is similar to the signals shown in FIGS. 19 to 21. In Japan, the carrier frequency of 315 MHz is used which is lower than 322 MHz above which the restriction of the weak radio signal is stricter and for which a short antenna can be used. This carrier frequency is supplied to the modulator 152 from the oscillator 154 and modulated with the data signal. Then, the signal waveform as shown in FIG. 25 (the waveform of binary "0" is shown) can be obtained. The data signal 1 T of 500 μs contains about 157 cycles of the 315 MHz carrier wave having the period of 3.17 μs. A predetermined output is produced from the power amplifier 164 and radiated from the antenna 96.

As explained with reference to FIG. 11, the radio signal received by the antenna 36 of the camera proper 14 is amplified together with noise and other radio signals in the amplifier 116A, and after the noise and the like are removed by the bandpass filter 116B having the carrier frequency of 315 MHz, the signal waveform shown in FIG. 21 is reproduced by the detector 116C, the integrator 116D and the waveform shaper 116E and converted into the data by the decoder unit 116F.

The radio remote controller 94 also employs the data format shown in FIGS. 23A to 24C and uses it in a similar manner to the optical remote controller described above.

Next, the authentication mode of the camera proper 14 will be explained. As shown in FIG. 26, the authentication mode includes four types, i.e., "prohibit mode", "limit mode", "setting mode" and "permit mode".

The "prohibit mode" is the mode in which the use by other than the remote controller with the authentication information is prohibited. The camera proper 14 cannot be operated without the authentication command from the remote controller with the authentication information. Therefore, the remote controller with the authentication information is carried or held separately from the camera proper 14, and the camera proper 14 is set in prohibit, mode. Assume that the camera proper 14 is set in prohibit mode in this way. Then, should the camera proper 14 alone be lost and acquired by a third party, the third party cannot use the camera proper 14. The camera proper 14, if lost while the remote controller is held or carried, cannot be used on the one hand, and the leakage of the images in the camera proper 14 is prevented at the same time. Incidentally, even in the prohibit mode, the holder of the remote controller with the authentication information can operate the camera proper 14 using the remote controller with the authentication information.

The "limit mode" is one in which only the permitted functions as described later with reference to FIG. 28 can be used regardless of the remote controller with the authentication information or the common remote controller without the authentication function. This limit mode is conveniently used in the case where the camera proper 14 is lent temporarily or used by the owner only for image acquisition with the erasure or transfer prohibited.

The "setting mode" is the mode in which the limited function in the limit mode can be set or changed using the authentication command remote controller.

The "permit mode" is the mode in which the camera proper 14 can be freely used, i.e., the camera proper 14 is net locked and suitably used by the owner or his/her family members in a limited place such as a home where the risk of being stolen is low or in the case where the camera proper 14 is lent to others with the images therein erased. In this permit mode, air the functions other than switching the authentication mode can be executed even by the common, remote controller without the authentication function.

Next, the selection for designation and setting of the authentication mode at the time of switching on the power of the camera proper 14 will be explained with reference to FIG. 27. This setting operation can designate either the setting ("prohibit mode") forcing the entrance into prohibit mode regardless of the storage mode of the mode memory 136 using the menu at the time of switching on power, or the setting in the authentication mode ("mode memory storage mode") stored in the mode memory 136 at the time of switching on power. This designation is made in such a manner that the authentication mode setting screen is displayed by menu at the time of switching on power, the plus button 72 and the minus button 74 of the optical remote controller 12 or the radio remote controller 94 as the remote controller with the authentication information or the arrow switch 78 of the optical remote controller 76 as the remote controller with the authentication information is used for selection, and the operation is established by the image acquisition command button 62. The result of this setting can be held in the mode memory 136 or the nonvolatile memory in the main control unit 118.

By making the arrangement to set in "prohibit mode" at the time of switching on power, the camera proper 14 cannot be used alone without issuing a command from the authentication command remote controller or without switching to another authentication mode by the authentication mode switching remote controller. In other words, the camera proper 14 can be locked. In the case where the arrangement is made to set in "mode memory storage mode" at the time of switching on power, on the other hand, the camera proper 14 enters the mode stored in the mode memory 136. Thus, the camera proper 14 can be used freely if in permit mode, or in accordance with the available function setting if in limit mode. In prohibit or setting mode, the remote controller with the authentication information is required. Once switched to permit or limit mode, however, the prohibit timer 148 starts and upon lapse of a set time, the prohibit mode is entered.

Next, the functions available in limit mode will be explained with reference to FIG. 28. Upon depression of a setting switch of the remote controller with the authentication information (the authentication setting switch 64 and the wide-angle button 70 for the optical remote controller 12; the authentication setting switch 64 and the print button 84 for the optical remote controller 76; and the setting button 100 for the radio remote controller 94), the setting mode is entered. In this setting mode, the functions shown in FIG. 28 and the limiting flag are displayed on the monitor 38, and the item can be selected by the plus button 72 and the minus button 74 of the optical remote controller 12 or the radio remote controller 94, or the arrow switch 78 of the optical remote controller 76, as the case may be. Then, the item can be set by the operation using the image acquisition command button 62 to establish whether the operation is possible or impossible. The result of the setting is held in the mode memory 136 or the nonvolatile memory in the main controller 118 as a function limiting table.

In this case, a still image or a dynamic image can be acquired by the display "image acquisition possible".

In the case of the display "play possible", the image in the built-in memory 112 and the removable memory 114 can be reproduced. Further, the functions available in play mode can be set in detail. Specifically, the erasure is possible in "erase possible", the transfer to the personal computer is possible in "transfer possible", the printing on the printer is possible in "print possible", and the image can be edited in "edit possible".

In "menu possible", the image acquisition conditions, etc., can be changed.

Also, as described above, in the case where the switches or buttons of the camera proper 14 are depressed, the CPU of the main control unit 118 of the camera proper 14 is interrupted or reset and the corresponding operation is performed. FIG. 29 is a diagram showing the outline of this operation. Each corresponding operation will be described in detail later. For the present purpose, the corresponding operation is explained taking the digital camera 10 as an example. Depending on the type of the image acquisition device, the corresponding switch or button may be absent or have a different name.

Assuming that the power switch 28 is depressed with the camera proper 14 in power off state, the power is switched on, and the CPU of the main control unit 118 is reset, thereby starting the operation. In the case where the power switch 28 is depressed with power on, on the other hand, the operation is ended and power supply is switched off.

Once the select switch 34 is turned, the present state is ended and transferred to a new state. Upon depression of the shutter switch 26, the "shutter switch operation flag" is set. This flag is read by the program, and the image acquisition operation starts or ends. Upon depression of the menu button 44, the menu is displayed on the monitor 38, and the setting can be changed by the arrow switch 40 and the OK button 42. Upon another depression of the menu button 44 while the menu is being displayed, the menu operation is ended. Upon depression of the zoom switch 46 on the T or W side, the zoom control unit 122 is driven. Upon depression of any part of the arrow switch 40, the corresponding switch flag is set. Upon depression of the OK button 42, the OK button flag is set. Upon depression of the erase button 48, the erase confirmation menu is displayed on the monitor 38, and upon depression of the corresponding confirmation switch, the erasure is executed. Upon depression of the print button 50, the print menu is displayed on the monitor 38, followed by a predetermined print operation.

Further, upon depression of the sensitivity switching button 52, the interrupt signal is generated and the reception sensitivity is switched by the main control unit 118. The state of the reception sensitivity is displayed on the sensitivity display lamp 32. Each time the sensitivity switching button 52 is depressed, the high and low sensitivities are toggled. As an alternative, upon depression of the sensitivity switching button 52, the corresponding switch flag may be set, so that the main control unit 118 detects the state of the particular switch flag at a predetermined timing as described in detail later, and switches the reception sensitivity in the case where the switch flag is set. Incidentally, the initial sensitivity with power on may be set at a low or high level as desired in the design stage. According to this embodiment, however, the initial sensitivity is set at a low level. As another alternative, the sensitivity may be set at a low level at the time of factory shipment and held in the mode memory 136 when the power is off, so that the sensitivity may be set to the particular state at the next time of power on.

The flag set as described above may be cleared either at the time when it is read for an application or after a switch or a button held depressed (during the on state) is turned off.

Next, with reference to FIG. 30, an explanation will be given about the outline of the operation of the camera proper 14 corresponding to the case where a switch or a button of the remote controller is depressed. Depending on the type of remote controller, the corresponding button, etc., may be absent. The camera proper 14, after power is switched on, is kept ready to receive the signal from the remote controller and perform the corresponding operation. Once the signal from the remote controller is caught, the program being executed by interrupt is suspended, and the signal from the remote controller is received, so that as explained with reference to FIGS. 23A to 24C, the receiving data of the data format of the remote controller is stored in a predetermined memory, and the operation is performed in keeping with the intended meaning.

Also, in prohibit mode or setting mode, the legitimacy of the remote controller is determined on the camera proper 14 side by the authentication information recognition unit 118A of the main control unit 116 in which the fixed remote controller identification information recorded in the camera proper 14 is compared with the fixed remote controller identification information 176 acquired from the remote controller.

In the case of the common remote controller without the authentication function such as the optical remote controller 106, the fixed remote controller identification information is not used, and only the functions not limited in permit mode or limit mode are used. Such common remote controller cannot be used by the camera proper 14 in prohibit mode or setting mode.

In the camera proper 14 that has received the command from the remote controller, the CPU of the main controller 118 performs each operation corresponding to the result of decoding the data received from the remote controller, in the manner described below.

Specifically, upon depression of the image acquisition command button 62 of the remote controller 12, 76, 94 or 106, the image acquisition command flag is set. In the image acquisition mode, this flag is read by the program to perform the operation of starting or ending the image acquisition operation. In setting mode, the selection item is determined only for the remote controller with the authentication information upon depression of the telephoto button 68 or the wide-angle button 70 of the remote controller 12, 76, 94 or 106, the zoom control unit 122 is driven. Upon depression of the plus button 72 or the minus button 74 of the remote controller 12 or 94, the corresponding switch flag is set.

Upon depression of any part of the arrow switch 78 of the remote controller 76 or 106, the corresponding switch flag is set. Upon depression of the OK button 80 of the remote controller 76 or 106, the OK button flag is set. Upon depression of the information button 86 of the remote controller 76 or 106, the information of the image being displayed is displayed on the monitor 38, and upon another depression, the display of the particular information is suspended. Upon depression of the print button 84 of the remote controller 76 or 106, the print menu is displayed on the monitor 38, followed by performing a predetermined printing operation. Upon depression of the menu button 82 of the remote controller 76 or 106, the menu is displayed on the monitor 38, and can be set or changed by the arrow switch 76 and the OK button 80. Upon another depression of the menu button 82 while the menu is being displayed, the menu operation is ended. Upon depression of the erase button 88 of the remote controller 76 or 106, the erasure confirmation menu is displayed on the monitor 38. Upon depression of a corresponding confirmation button, the erasure of the image being displayed is executed. Upon depression of the protection button 92 of the remote controller 76 or 106, the protection flag is attached to the image displayed on the monitor 38. In the case where an attempt is made to erase this image with the protection flag by the operation of the erase button 88, an alarm to prevent the erroneous erasure is displayed on the monitor 38, so that the erasure is executed by selecting the erasure execution. Upon depression of the protection button 92 while the image with the protection flag is being displayed, the protection flag is cleared. Upon depression of the rotation button 90 of the remote controller 76 or 106, the image displayed on the monitor 38 is rotated 90 degrees clockwise, and further depression rotates the image 90 degrees counterclockwise regarding to the original image. Still further depression restores the original image.

Upon depression of the limit button (the telephoto button 68 or the information button 86) with the authentication setting switch 64 of the remote controller 12 or 76 at the authentication position 64C or upon depression of the limit button 98 of the remote controller 94, then the limit command is transmitted from the remote controller, and the camera proper 14 is switched to the limit mode. Upon depression of the prohibit button (the plus button 72 or the protection button 92) with the authentication setting switch 64 of the remote controller 12 or 76 at the authentication position 64C or upon depression of the prohibit button 102 of the remote controller 94, then the prohibit command is transmitted from the remote controller and the camera proper 14 is switched to the prohibit mode. Upon depression of the setting button (the wide-angle button 70 or the print button 84) with the authentication setting switch 64 of the remote controller 12 or 76 at the authentication position 64C or upon depression of the setting button 100 of the remote controller 94, the setting command is transmitted from the remote controller and the camera proper 14 is switched to the setting mode. Upon depression of the permit button (the minus button 74 or the rotation button 90) with the authentication setting switch 64 of the remote controller 12 or 76 at the authentication position 64C or upon depression of the permit button 104 of the remote controller 94, then the permit command is transmitted from the remote controller and the camera proper 14 is switched to the permit mode.

Also, upon depression of the sensitivity switching button 66 of the remote controller 12, 76 or 94, the sensitivity switching command is transmitted as an authentication command from the remote controller 12, 76 or 94, respectively, and the reception sensitivity of the camera proper 14 is switched. This state is reflected in the sensitivity display lamp 32. Incidentally, upon reception of the sensitivity switching command from the remote controller 12, 76 or 94 or upon depression of the sensitivity switching button 52 of the camera proper 14, the sensitivity is switched.

According to this embodiment, the command reception sensitivity of the camera proper 14 is switched either by depression of the sensitivity switching button 52 of the camera proper 14 or in response to the sensitivity switching command from the remote controller 12, 76 or 94. Nevertheless, only one of these means may be used. In the case where only the button on the camera proper 14 is used, the sensitivity switching button 52 of the camera proper 14 may be replaced by a two-point slide switch adapted to switch between high sensitivity (H) and low sensitivity (L), so that the switch position may double as the sensitivity indication. In the case where the sensitivity switching command from the remote controller 12, 76 or 94 is relied upon, on the other hand, the switching operation in response to the remote controller command and the sensitivity display lamp 32 are suitably combined with each other.

Next, the transition of the authentication mode will be explained with reference to FIG. 31. In the case where the power switch 28 is turned on (step S12) with the power off (step S10), the authentication mode setting designation and the mode memory storage mode are read at the time of power on as explained in FIG. 27 thereby to determine whether the prohibit mode is in effect or not (step S14). On determining that the prohibit mode is in effect, the prohibit mode M1 is set.

On determining in step S14 that other than the prohibit mode is in effect, on the other hand, determination is made as to whether the permit mode is in effect or not (step S16). On determining that the permit mode is in effect, the permit mode M4 is entered.

On determining in step S16 that the permit mode is not in effect, determination is made whether the limit mode is in effect or not (step S18). On determining that the limit mode is in effect, the limit mode M2 is set. On determining that neither the limit mode is in effect, on the other hand, the setting mode M3 is set.

The transition between the modes can be switched also by the authentication mode switching command with the authentication information from the remote controller 12, 76 or 94 with the authentication information, and the transition is made as shown by the prohibit command, the limit command, the permit command and the setting command in the drawing. In transmitting/receiving the authentication mode switching command, the reception range of the authentication mode switching command is defined by switching the command from the remote controller 12, 76 or 94 to low output, by switching the reception sensitivity of the camera proper 14 to the low level, or with a low output and a low sensitivity.

Further, in the case where the camera proper 14 is switched to the limit, mode M2 or the permit mode M4 in which the camera proper 14 can be used for some purpose, the prohibit timer 148 in the camera proper 14 begins to count from that particular time point (step S20). Upon lapse of a preset time, the camera proper 14 is automatically switched to the prohibit mode M1 and cannon subsequently be used without the remote controller with the authentication information. In order to cancel the prohibit mode M1, the remote controller with the authentication information is required. Even after the power of the camera proper 14 is switched off, the prohibit timer 148 continues to count, and upon lapse of a predetermined time, the prohibit mode M1 is automatically entered. Therefore, the camera proper 14, even if lost in permit mode M4 or limit mode M2, cannot be used upon lapse of the preset time. The set time can be designated on menu by the user, and may be 10 minutes, one hour, one day or one week. By setting the prohibit timer 148 to a short time, the owner can use the camera proper 14 freely in permit mode M4 without taking the trouble of operating the remote controller with the authentication information each time. Also, should the camera be stolen, the fact that the prohibit mode M1 is entered in a short time can secure comparative safety.

In the case where the power switch 28 is depressed again (step S22) and the power is switched off, the authentication mode in effect is held in the mode memory 136 (step S24). Then, the power-off state is obtained (step S10).

Figure 32A:
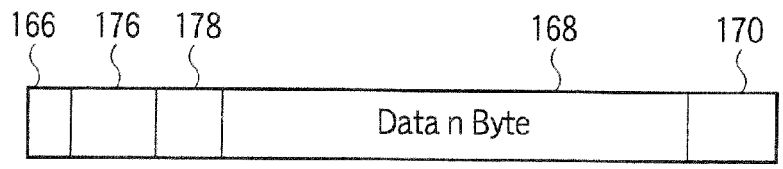
FIG. 32A is a diagram showing an example of the data format of the sensitivity switching command.
Figure 32B:
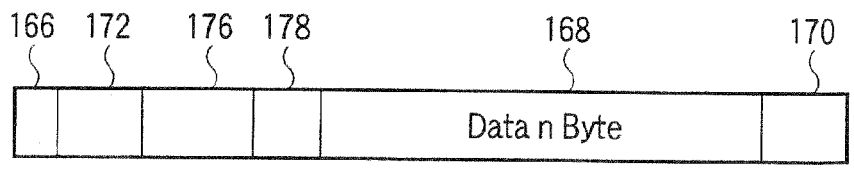
FIG. 32B is a diagram showing another example of the data format of the sensitivity switching command.
Figure 32C:
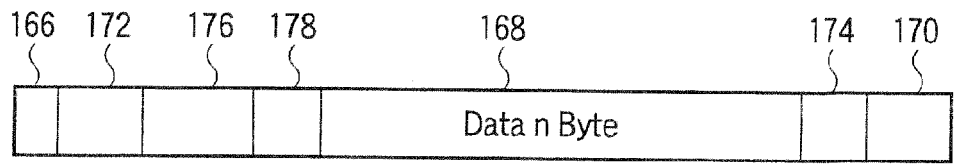
FIG. 32C is a diagram showing a further example of the data format of the sensitivity switching command.

Next, the data format of the sensitivity switching command for switching the reception sensitivity of the camera proper 14 will be explained. The sensitivity switching command, as shown in FIGS. 32A to 32C, has the data format of the authentication command shown in FIGS. 24A to 24C with a sensitivity switching information 178 added thereto. The camera proper 14, upon reception of the sensitivity switching command of this data format, switches the command reception sensitivity to the low or high level in accordance with the sensitivity switching information 178 contained in the particular sensitivity switching command.

As an alternative, the data format of the sensitivity switching command may be the one shown in FIGS. 39A to 39C, FIGS. 44A to 44C or FIGS. 47A to 47E with the sensitivity switching information 178 added thereto.

Figure 33:
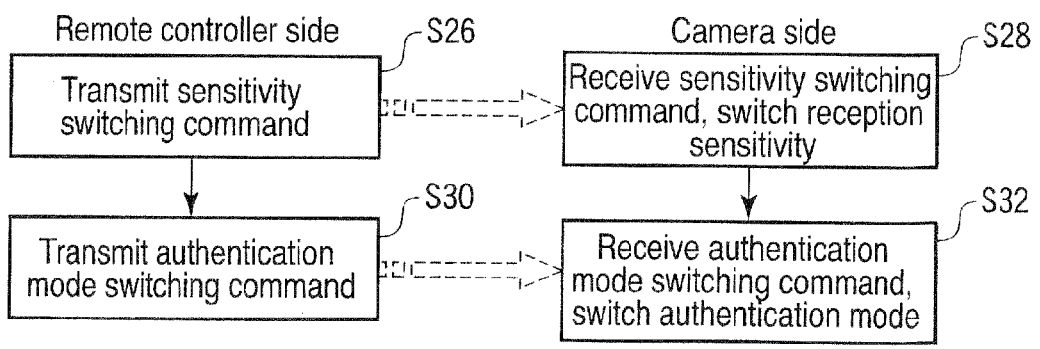
FIG. 33 is a diagram for explaining the operation of the camera proper in the case where the sensitivity switching command is transmitted from the remote controller with authentication information as an authentication command.

FIG. 33 is a diagram for explaining the operation of the camera proper 14 with the sensitivity switching command transmitted as an authentication command from the remote controller 12, 76 or 94 with the authentication information. Specifically, prior to transmission of the authentication mode switching command, the sensitivity switching command is transmitted from the remote controller 12, 76 or 94 (step S26). Upon reception of this sensitivity switching command by the camera proper 14, the main control unit 118 of the camera proper 14 switches the reception sensitivity (step S28). Then, the authentication mode switching command is transmitted from the remote controller 12, 76 or 94 (step S30). Upon reception of the authentication mode switching command by the camera proper 14, the main control unit 118 of the camera proper 14 switches the authentication mode (step S32).

The setting of the command transmission/reception abilities are combined as shown in FIG. 34, for example. Based on the combination between the output level of the remote controller 12, 76 or 94 making up a commanding device and the level of the reception sensitivity of the digital camera 10 or the digital movie camera 56 making up an image acquisition device, the overall transmission/reception ability is set to the high, middle or low level.

Also, the command type and the command transmission/reception ability are combined, for example, as shown in FIG. 35. The command transmission/reception ability is set to the low level for the authentication mode switching command, the most important of the authentication commands, to the middle level for other authentication commands, and to the high level for the general command. Alternatively, the authentication commands may naturally be of two types, i.e. the low level for the authentication command and the high level for the general command. Also, only the authentication mode switching command may be set to low ability.

Especially, in prohibit mode, the commands are transmitted/received by switching the command of the remote controller 12, 76 or 94 to low output, by switching the reception sensitivity of the camera proper 14 to the low level, or by setting the remote controller 12, 76 or 94 to low output with low sensitivity of the camera proper 14. By doing so, an application is made possible with a limited command reception range. As another alternative, a configuration is possible in which the transmission/reception ability is switched for all the commands, or reduced for only the authentication mode switching command and the important commands such as for reproduction or rewriting of the limit table, while the output or the reception sensitivity of the remote controller are not reduced for other image acquisition commands.

Next, the state transition and the process in the image acquisition device will be explained with reference to FIGS. 36A to 36G. Although the case in which the image acquisition device is the digital camera 10 is explained as an example, the digital movie camera 56 can be also handled in similar manner except for the switch operation, etc.

Figure 36A:
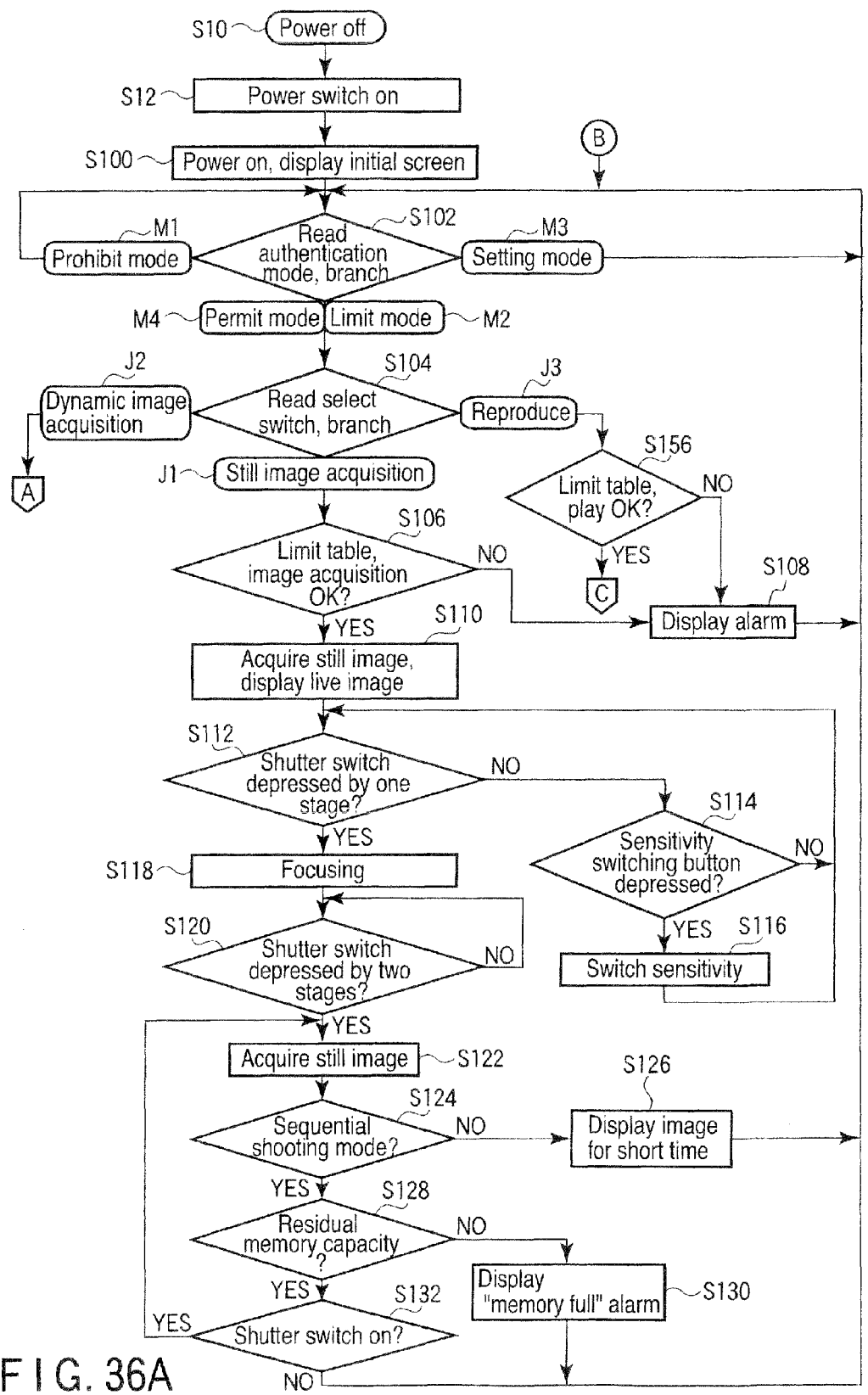
FIG. 36A is a diagram showing a first part of a series of flowcharts for explaining the process and the status transition in the image acquisition device.

First, the image acquisition mode will be mainly explained. Upon depression of the power switch 28 (step S12) with the power off (step S10) as shown in FIG. 36A, the power of the camera proper 14 is switched on, and the initial screen is displayed on the monitor 38 (step S100). A mark, etc., indicating the residual capacity of the battery is displayed on this initial screen. After that, as explained with reference to FIG. 31, the authentication mode setting designation with power on and the storage mode of the mode memory 136 are read, and the operation branches in accordance with the mode (step S102).

On determining that the permit mode M4 or the limit mode M2 is in effect, the state of the select switch 34 is read, and the operation branches to the still image acquisition mode J1, the dynamic image acquisition mode J2 or the play mode J3 (step S104).

In the case where the still image acquisition mode J1 is selected by the select switch 34 in limit mode, the function limit table held in the mode memory 136 or the nonvolatile memory in the main control unit 118 is read to determine whether the image acquisition operation is permitted or not (step S106). On determining that the image acquisition operation is not permitted, an alarm is displayed on the monitor 38 (step S108), and after waiting for a preset, time, the process is returned to step S102. In this case, unless the camera proper 14 is switched to the setting mode by the authentication command remote controller and the limit table is rewritten, the process goes around the loop including steps S102, S104, S106, S108, S102, and so on, in that order. In such a case, the alarm display in step S108 may be limited to the first one or controlled to, for example, once every predetermined number of times.

On determining that the image acquisition operation is permitted by the function limit table in limit mode or the permit mode is in effect, on the other hand, the live image is displayed on the monitor 38 while at the same time displaying the current number of the image acquisition pixels consumed and the remaining number of available image frames (step S110). Then, whether the first stage of the shutter switch 26 is turned on or not is determined (step S112). In the case where this stage is not turned on, whether the sensitivity switching button 52 is depressed or not is determined by the switch flag (step S114), and in the case where the sensitivity switching button 52 is not depressed, the process returns to step S112. Once the sensitivity switching button 52 is depressed, on the other hand, the reception sensitivity is switched while at the same time displaying the switched reception sensitivity state on the sensitivity display lamp 32 (step S116), followed by returning to step S112. Incidentally, the explanation has been made above that whether the sensitivity switching button 52 is depressed or not is determined by the flag sense operation and in accordance with the result thereof, whether the sensitivity is to be switched or not is determined. Nevertheless, as described above, the interrupt may of course be used without switching the sensitivity according to the flag sense operation (this is also the case with steps S212, S214 described later). Also, though not specifically illustrated, in the case where other switches or buttons such as the zoom switch 46 are operated during the loop execution of steps S112 and S114, an interrupt corresponding to the particular operation naturally occurs and the corresponding operation is performed.

In the case where it is determined in step S112 that the first stage of the shutter switch 26 turns on, the focusing operation is performed (step S118) and the process stands by until the second stage of the shutter switch 26 turns on (step S120). Once the second stage of the shutter switch 26 turns on, the still image is acquired (step S122). After that, whether the sequential shooting mode is set or not is checked (step S124). In the case where the sequential shooting mode is not in effect, the acquired image is displayed on the monitor 38 for a short time (step S126), after which the process returns to step S102.

In the case where the sequential shooting mode is set, on the other hand, checking whether the residual capacity of the built-in memory 112 and/or the removable memory 114 is not less than a predetermined amount (step S128), and in the case where the residual capacity is less than the predetermined amount, a "memory full" alarm is displayed on the monitor 38 (step S130), after which the process returns to step S102. In the case where the residual memory capacity is not less than the predetermined amount, on the other hand, checking whether the shutter switch 26 is kept on or not (step S132) and in the case where it is off, the process returns to step S102. In the case where the shutter switch 26 is on, on the other hand, the process returns to step S122, and the next still image is acquired.

Figure 36B:
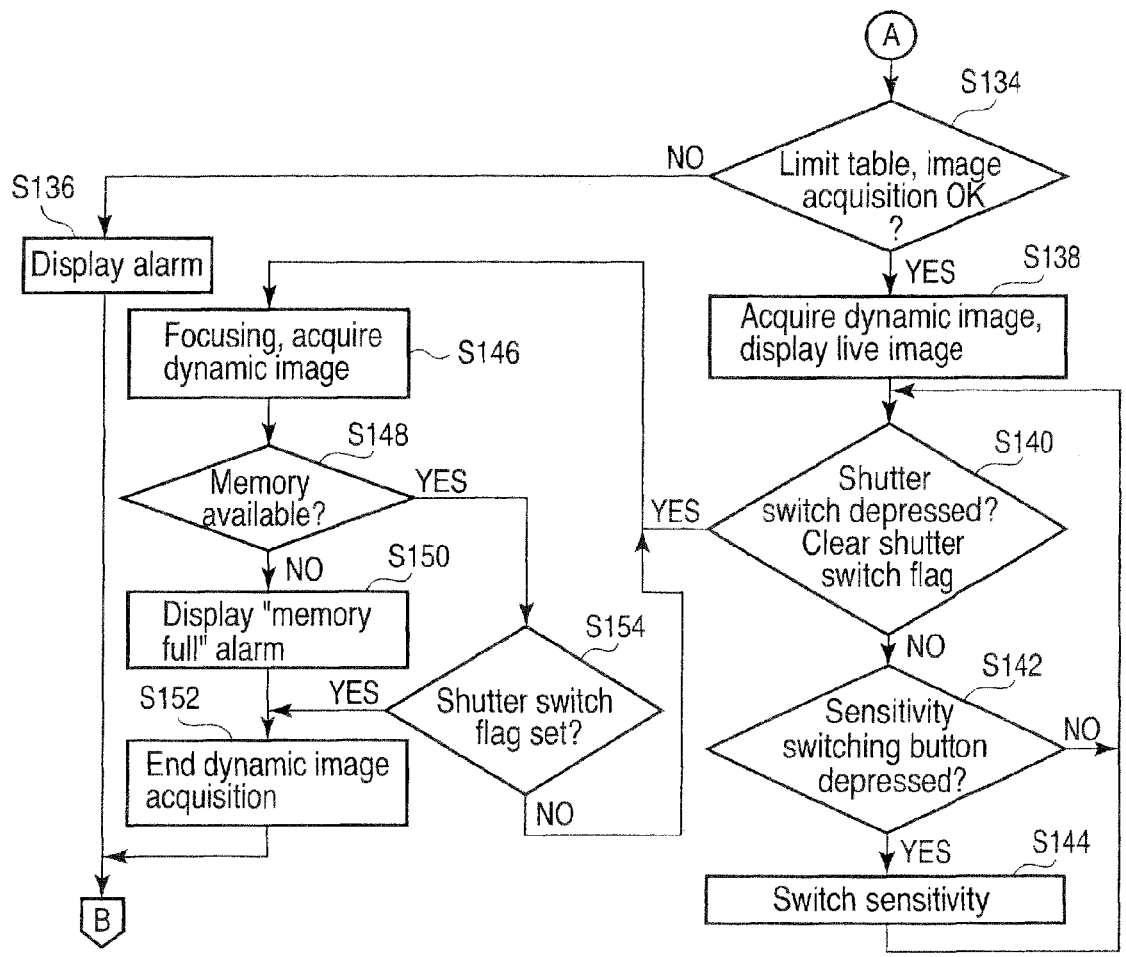
FIG. 36B is a diagram showing a second part of a series of flowcharts for explaining the process and the status transition in the image acquisition device.
Figure 36C:
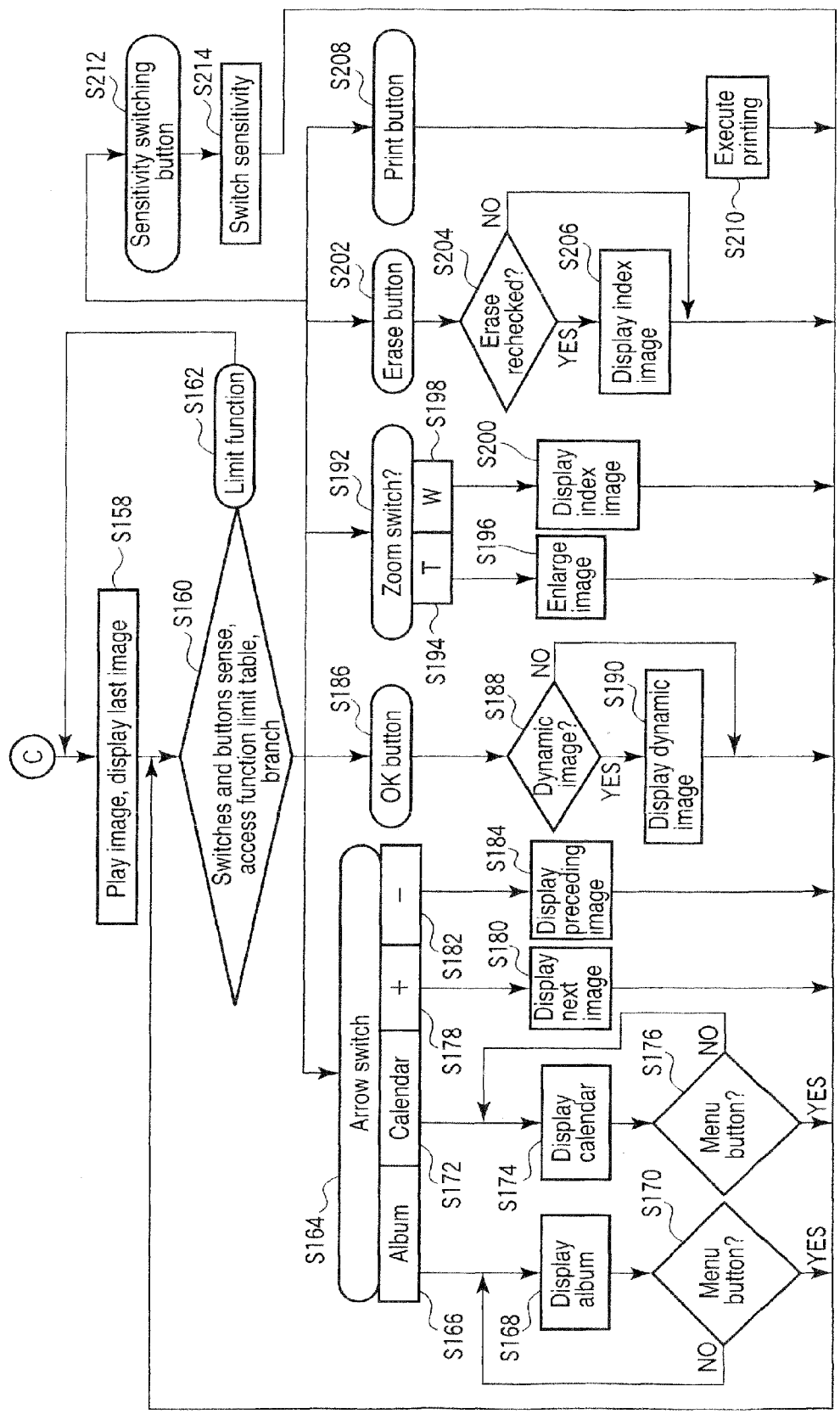
FIG. 36C is a diagram showing a third part of a series of flowcharts for explaining the process and the status transition in the image acquisition device.

In the case where the dynamic image acquisition mode J2 is selected by the select switch 34 in step S104 in limit mode, on the other hand, the function limit table held in the mode memory 136 or the nonvolatile memory in the main control unit 118 is read to determine whether the image acquisition operation is permitted or not (step S134), as shown in FIG. 36B. On determining that the image acquisition operation is not permitted, an alarm is displayed on the monitor 38 (step S136) and after waiting until a preset time arrives, the process returns to step S102. In this case, unless the camera proper 14 is switched to the setting mode by the authentication command remote controller and the limit table is rewritten, the process goes around the loop including steps S102, S104, S134, S136, S102, and so on, in that order. In such a case, the alarm display in step S136 may be limited to the first one or controlled to, for example, once every predetermined number of times.

On determining that the image acquisition operation is permitted according to the function limit table in limit mode or in the case where the permit mode is in effect, on the other hand, the live image is displayed on the monitor 38 together with the available image acquisition time with the current number of image acquisition pixels consumed (step S138). By determining whether the shutter switch 26 is turned on or not, by the shutter switch flag which is set upon depression of the shutter switch 26 (step S140). On determining that the shutter switch flag is not turned on, whether the sensitivity switching button 52 is depressed or not is determined (step S142). In the case where the sensitivity switching button 52 is not depressed either, the process returns to step S140 to continue the display of the live image. Upon depression of the sensitivity switching button 52, on the other hand, the reception sensitivity is switched and the reception sensitivity state thus switched is displayed by the sensitivity display lamp 32 (step S144), followed by returning to step S140. Incidentally, though not specifically illustrated, in the case where other switches or buttons such as the zoom switch 46 are operated during the loop execution of steps S140 and S142, the corresponding operation is naturally performed.

Once the shutter switch flag is set, the particular shutter switch flag is cleared, after which the focusing operation is performed and the dynamic image begins to be acquired (step S146). While the dynamic image is being acquired, the residual capacity of the built-in memory 112 and/or the removable memory 114 is checked (step S148). In the case where the residual memory capacity is less than a predetermined amount, the "memory full" alarm is displayed on the monitor 38 (step S150), after which the dynamic image ceases to be acquired (step S152), and the process returns to step S102. In the case where the residual memory capacity is not less than the predetermined amount, on the other hand, whether the shutter switch flag is set or not is confirmed (step S154), and in the case where it is clear, the process returns to step S146 and the dynamic image continues to be acquired. Once the shutter switch flag is set, the process advances to step S152 to end the dynamic image acquisition, after which the process returns to step S102. In this way, the dynamic image continues to be acquired after the depression of the shutter switch 26 until it is depressed again.

In the case where the play mode J3 is selected by the select switch 34 in step S104 in limit mode, on the other hand, the function limit table held in the mode memory 136 or the nonvolatile memory in the main control unit 118 is read to determine whether the reproduction is permitted or not (step S156), as shown in FIG. 36A. On determining that the reproduction is not permitted, the process proceeds to step S108 to display an alarm on the monitor 38, after which the process returns to step S102 at a preset time. In this case, unless the camera proper 14 is switched to the setting mode by the authentication command remote controller and the limit table is rewritten, the process goes around the loop including steps S102, S104, S156, S108, S102, and so on, in that order. In such a case, the alarm display in step S108 may be limited to the first one or controlled to, for example, once every predetermined number of times.

In the case where the reproduction is permitted in limit mode or in the case where the permit mode, is in effect, the play mode is entered as shown in FIG. 36O. Specifically, the last one of the images recorded in the built-in memory 112 and the removable memory 114 is displayed on the monitor 38 (step S158). Next, whether any of the switches or buttons is depressed or not is checked, and in the case where it is depressed in limit mode M2, whether the limit function is involved or not is checked based on the function limit table (step S160). On determining that the limit function is involved (step S162), the process returns 10 step S158 ignoring the depression of the switches or buttons.

In the case where the switch or button involves no limit function or the permit mode is in effect, on the other hand, the corresponding operation described below is performed.

Specifically, assume that the arrow switch 40 of the camera proper 14 is depressed (step S164). In the case where the lower part (album) of the arrow switch 40 is depressed (step S166), the image recorded in the album (step S168) is displayed on the monitor 38. Upon depression of the menu button 44 while the particular image is being displayed (step S170), the album display function is ended and the process returns to step S160. Incidentally, the album is defined as a function in which the access point to each one of a group of images relating to a given event is written in the index information held separately from the image group so that upon designation of the album name, a series of the images about the event can be collectively displayed or otherwise collectively handled.

Upon depression of the upper part (calendar) of the arrow switch 40 (step S172), on the other hand, the images recorded for the current month are displayed in calendar form on the monitor 38 (step S174). Further, the arrow switch 40 makes it possible to display the images for the previous months or an image acquired on a selected day. Upon depression of the menu button 44 while this image is being displayed (step S176), the calendar display function is ended, and the process returns to step S160.

Also, upon depression of the right part (+) of the arrow switch 40 (step S178), the next image is displayed (step S180) and then the process returns to seep S160. In the case where the current image is the last one, the first image is displayed. Also, upon depression of the left part (−) of the arrow switch 40 (step S182), on the other hand, the previous image is displayed (step S184), after which the process returns to step S160. Incidentally, in the case where the current image is the first one, the last image is di splayed.

In the case where the OK button 42 is depressed (step S186), whether the current image is a dynamic one or not is confirmed (step S188), and in the case where it is not a dynamic image, the depression of the OK button 42 is ignored, and the process returns to step S160. In the case where the current image is a dynamic one, on the other hand, the dynamic image is displayed (step S190), and the process returns to step S160.

Upon depression of the zoom switch 46 (step S192) in the case where the T button is involved (step S194), the image being displayed is enlarged (step S196), and the process returns to step S160. Upon depression of the W button while the image is displayed in enlarged form, the display of one-frame image is restored. In the case where the W button is involved (step S198), the image being displayed is reduced as an index display (step S200) and the process returns to step S160. Each time the W button is depressed, a list of four, nine, sixteen and twenty five frames is displayed in that order. Each time the T button is depressed while the reduced list is being displayed, on the other hand, the display returns to the descendant order of 25, 16, 9, 4 and 1 frame.

Upon depression of the erase button 48 (step S202), the confirmation as to whether the image is really erased or not is displayed on the monitor 38 (step S204), and in the case where the erase suspension is selected, the process returns to step S160 without erasure. In the case where the execution of the erase operation is selected, on the other hand, the particular frame is erased and the immediately preceding image is displayed (step S206), followed by returning to step S160. Incidentally, in the case where the image to be erased is protected, an alarm indicating that the image being displayed is to be protected is displayed on the monitor 38, and the selection to execute the erasure is ignored.

Upon depression of the print button 50 (step S208), the required printing operation such as the transmission of the image to the printer is performed (step S210), and the process returns to step S160.

Also, in the case where the sensitivity switching button 52 is depressed (step S212), the reception sensitivity is switched and the reception sensitivity state thus switched is displayed by the sensitivity display lamp 32 (step S214), and the process returns to step S160.

In the case where it is determined in step S102 that the prohibit mode M1 or the setting mode M3 is in effect, as shown in FIG. 36A, on the other hand, the main control unit 118 operates only by the authentication command from the remote controller with the authentication information. On determining that the prohibit mode M1 or the setting mode M3 is in effect, therefore, only the determination of step S102 is repeated.

Figure 36D:
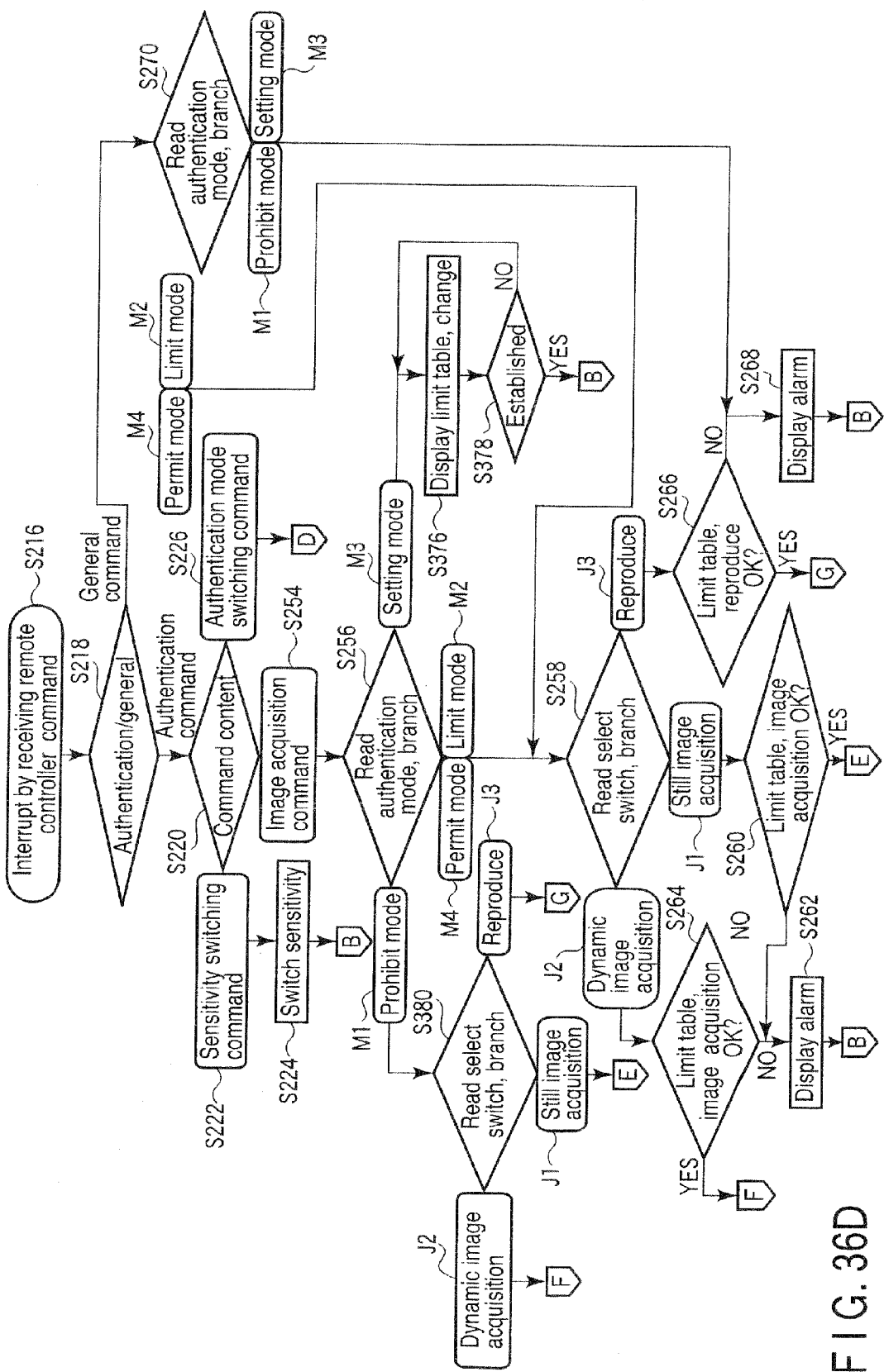
FIG. 36D is a diagram showing a fourth part of a series of flowcharts for explaining the process and the status transition in the image acquisition device.

Upon reception of a command from the remote controller having the authentication information or the common remote controller not having the authentication information, as shown in FIG. 36D, the CPU of the main control unit 118 is interrupted (step S216), followed first, by determination as to whether the command received from the remote controller is the authentication command or the general command (step S218).

On determining that the authentication command is received from the remote controller with the authentication information, the content of the particular authentication command is determined (step S220). On determining that the sensitivity switching command is received (step S222), the reception sensitivity is switched, and the reception sensitivity state thus switched is displayed by the sensitivity display lamp 32 (step S224), and the process returns to step S102.

Figure 36E:
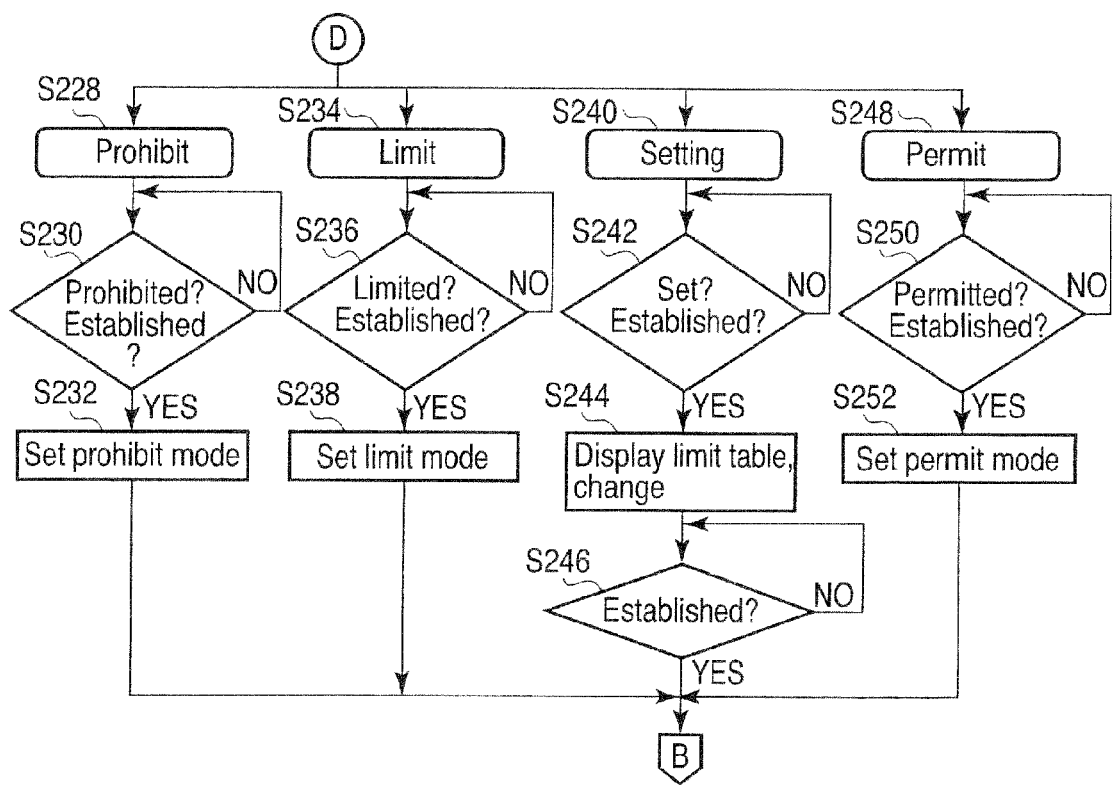
FIG. 36E is a diagram showing a fifth part of a series of flowcharts for explaining the process and the status transition in the image acquisition device.

On determining that the authentication mode switching command is received (step S226), as shown in FIG. 36E, the main control unit 118 selectively executes the operation in accordance with the content of the particular command. Incidentally, this operation in accordance with the authentication mode switching command is executed in all the authentication modes as well as in the prohibit mode.

Specifically, in the case where the authentication mode switching command is the prohibit command (step S228), the confirmation of the prohibit mode setting is displayed on the monitor 38, and in the case where the image acquisition execution command is sent as an authentication command or a general command from the remote controller with the authentication information accordingly, the prohibit mode is finally determined (step S230). Then, the storage mode of the mode memory 136 is set to the prohibit mode M1 (step S232), and the process is returned to step S102. Since the prohibit mode M1 is set in this way, only the determination of step S102 is repeated when the process returns to step S102, and the operation of the switches or buttons of the camera proper 14 is not accepted and only the operation of the remote controller with the authentication information is accepted. Incidentally, the confirmation screen in step S230, though inserted as it is an important function to prevent the erroneous touch on the remote controller buttons and switch to the authentication mode, may be done without.

Also, in the case where the authentication mode switching command is the limit command (step S234), the confirmation that the limit mode is set is displayed on the monitor 38, and in the case where the image acquisition execution command arrives from the remote controller with the authentication information as the authentication command or the general command correspondingly, then the limit mode is finally determined (step S236). Then, the storage mode of the mode memory 136 is set to the limit mode M2 (step S238), followed by returning to step S102. By setting the storage mode to the limit mode M2 in this way, only the operation permitted in the limit table can be performed in accordance with the operation of the switches or buttons on the camera proper 14 or the authentication command or the general command from the remote controller after the process returns to step S102. Incidentally, the confirmation screen in step S236, though inserted as it is an important function to prevent the erroneous touch on the remote controller buttons and switch to the authentication mode, may be done without.

In the case where the authentication mode switching command is the setting command (step S240), on the other hand, the confirmation that the setting mode is set is displayed on the monitor 38, and in the case where the image acquisition execution command arrives as the authentication command from the authentication command remote controller, the setting mode is finally determined (step S242). Then, the storage mode of the mode memory 136 is set to the setting mode M3, followed by executing the process of changing or displaying the limit table on the monitor 38 (step S244). Incidentally, the confirmation screen in step S242, though inserted as it is an important function to prevent the erroneous touch on the remote controller buttons and switch to the authentication mode, may be done without. Also, in the process of displaying or changing the limit table in step S244 described above, the function of the function limit table shown in FIG. 17 and the state of the limit flag are displayed on the monitor 38. Then, by using the plus and minus buttons 72, 74, the telephoto button and wide-angle buttons 98, 70 or the arrow switch 78 and the OK button 80, etc., of the remote controller, the circuit selection of the limit function is carried out while at the same time setting and changing the set/clear state of the flag. Incidentally, this limit function can be set or changed only by the authentication command remote controller, of all the remote controllers with the authentication information. Once the setting change is completed, the image acquisition command button 62 is depressed and the image acquisition execution command transmitted as an authentication command. Therefore, in the case where the image acquisition execution command as the authentication command arrives, the main control unit 113 finally determines the content thereof and holds the content in the mode memory 136 or the nonvolatile memory in the main control unit 118 (step S246), followed by returning to step S102. By setting the storage mode to the setting mode M3 in this way, only the determination process of step S102 is repeated, and only the operation of the remote controller with the authentication information is accepted but not the operation of the switches or buttons on the camera proper 14 after the process returns to step S102.

In the case where the authentication mode switching command is the permit command (step S248), the confirmation that the permit mode is set is displayed on one monitor 38, and in the case where the image acquisition execution command arrives as the authentication command or the general command from the optical remote controller with the authentication information, the permit mode is finally determined (step S250). Then, the storage mode in the mode memory 136 is set to the permit mode M4 (step S252), followed by returning to step S102. By setting the storage mode to the permit mode M4 in this way, the operation of the switches or buttons on the camera proper 14 and all the operations corresponding to the authentication command or the general command from the remote controller 12, 76, 94 or 106 can be performed, after the process returns to step S102. Incidentally, the confirmation screen in step S250, though inserted as it is an important function to prevent the erroneous touch on the remote controller buttons and switch to the authentication mode, may be done without.

Also, on determining in step S220 that the content of the authentication command is the image acquisition command as shown in FIG. 36D (step S254), the storage mode of the mode memory 136 is read and the process branches in accordance with the particular mode (step S256).

On determining that the permit mode M4 or the limit mode M2 is in effect, the state of the select switch 34 of the camera proper 14 is read, and the operation branches to the still image acquisition mode J1, the dynamic image acquisition mode J2 or the play mode J3 (step S258).

In the case where the still image acquisition mode J1 is selected by the select switch 34 in limit mode, the function limit table held in the mode memory 136 or the nonvolatile memory in the main control unit 118 is read to determine whether the image acquisition operation is permitted or not (step S260). On determining that the image acquisition operation is not permitted, an alarm is displayed on the monitor 38 (step S262), and after waiting for a preset time, the process is returned to step S102. In this case, unless the camera proper 14 is switched to the setting mode by the authentication command remote controller and the limit table is rewritten, the process goes around the loop including steps S102, S104, S106, S108, S102, and so on, in that order. In such a case, the alarm display in step S108 may be limited to the first one or controlled to, for example, once every predetermined number of times.

Figure 36F:
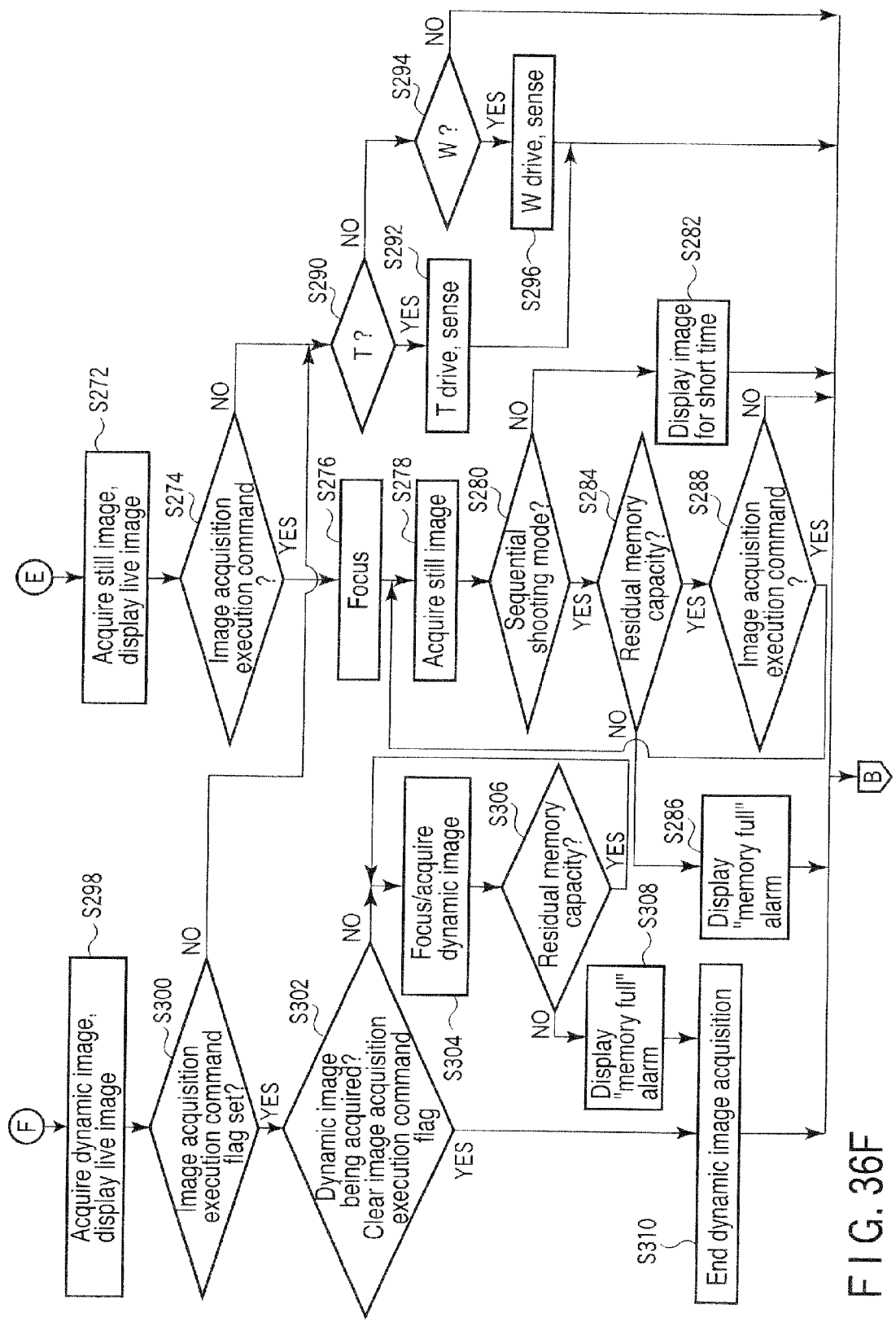
FIG. 36F is a diagram showing a sixth part of a series of flowcharts for explaining the process and the status transition in the image acquisition device.

On determining that the image acquisition operation is permitted by the function limit table in limit mode or in the case where the permit mode is in effect, on the other hand, the operation of a still image acquisition is performed by operating the remote controller as shown in FIG. 36F.

In the case where the dynamic image acquisition mode J2 is selected by the select switch 34 in step S258 in limit mode, on the other hand, the function limit table held in the mode memory 136 or the nonvolatile memory in the main control unit 118 is read to determine whether the image acquisition operation is permitted or not (step S264). On determining that the image acquisition operation is not permitted, on the other hand, the process proceeds to step S262 to display an alarm on the monitor 38, and after standing by for a preset time, returns to step S102. In this case, unless the camera proper 14 is switched to the setting mode by the authentication command remote controller and the limit table is rewritten, the process goes around the loop including steps S102, S104, S134, S136, S102, and so on, in that order. In such a case, the alarm display in step S136 may be limited to the first one or controlled to, for example, once every predetermined number of times.

On determining that the image acquisition operation is permitted by the function limit table in limit mode or in the case where the permit mode is in effect, on the other hand, the operation of a dynamic image acquisition is performed by operating the remote controller as shown in FIG. 36F.

In the case where the play mode J3 is selected by the select switch 34 in step S258 in limit mode, on the other hand, the function limit table held in the mode memory 136 or the nonvolatile memory in the main control unit 118 is read to determine whether the reproduction is permitted or not (step S266). On determining that the reproduction is not permitted, an alarm is displayed on the monitor 38 (step S268), and after standing by for a preset time, the process returns to step S102. In this case, unless the camera proper 14 is switched to the setting mode by the authentication command remote controller and the limit table is rewritten, the process goes around the loop including steps S102, S104, S156, S108, S102, and so on, in that order. In such a case, the alarm display in step S108 may be limited to the first one or controlled to, for example, once every predetermined number of times.

In the case where the reproduction is permitted in limit mode or the permit mode is in effect, on the other hand, the play operation is performed by operating the remote controller as shown in FIG. 36G.

On determining in step S218 that the general command is received from the authentication mode switching remote controller or the common remote controller without the authentication function, the mode stored in the mode memory 136 is read and the process branches in accordance with the particular mode (step S270).

On determining that the permit mode M4 or the limit mode M2 is in effect, the process proceeds to seep S258. On determining that the prohibit mode M1 or the setting mode M3 is in effect, on the other hand, the camera proper 14 cannot be operated by the general command from the common remote controller or the authentication mode switching remote controller, and therefore, the process proceeds to step S262. After a preset time alarm is displayed on the monitor 38, the process returns to step S102. After the process returns to step S102, only the determination process of step S102 is repeated, and the operation of the switches or buttons on the camera proper 14 are not accepted. Thus, in the case where the permit mode M4 or the limit mode M2 is in effect, the operations other than the operation of the camera proper 14 or the common remote controller and the operation of the authentication mode switching remote controller for transmitting the authentication mode switching command are not accepted. In this way, the arrangement can be made in which the image acquisition operation and the play operation can be performed only by the authentication command remote controller.

In the image acquisition operation to acquire a still image by operating the remote controller in permit mode M4 or limit mode M2, as shown in FIG. 36F, the main controller 118 displays the live image on the monitor 38 (step S272), and determines whether the authentication command from the remote controller with the authentication information or the general command from the common remote controller without the authentication function received in step S216 is an image acquisition execution command or not (step S274). On determining that the authentication command or the general command is the image acquisition execution command, the focusing operation is performed (step S276) to acquire the still image (step S278), followed by determination of whether the sequential shooting mode is set or not (step S280). In the case where the sequential shooting mode is not set, an image already acquired is displayed for a short time on the monitor 38 (step S282), after which the process returns to step S102. In this case, the process proceeds in the order of steps S102, S104, 3106, S110 and so on, thereby making it possible to acquire a still image by operating the shutter switch 26 of the camera proper 14. The operation of the next still image acquisition can be performed also by the interruption by the command reception from the common remote controller or the remote controller with the authentication information.

On determining in step; 280 that the sequential shooting mode is set, on the other hand, whether the built-in memory 112 and/or the removable memory 114 has at least a predetermined amount of the residual memory capacity or not (step S284). In the case where the residual memory capacity is less than a predetermined amount, the "memory full" alarm is displayed on the monitor 38 (step S286), and the process returns to step S102. In this case, the process proceeds in the order of steps S102, S104, S106, S110 and so on, as described above, and although the sequential shooting is impossible due to the lack of the remaining memory capacity, the next operation of a still image acquisition is possible by operating the shutter switch 26 of the camera proper 14. The operation to acquire the next still image is also possible by the interruption by the command reception from the common remote controller or the remote controller with the authentication information.

Also, on determining in step S284 that enough memory capacity remains, whether the image acquisition execution command has arrived or not from the common remote controller or the remote controller with the authentication information is confirmed (step S288), and upon arrival of the image acquisition execution command, the process returns to step S278 to acquire the next image. Specifically, the sequential shooting is carried out as long as the image acquisition command button 62 of the common remote controller or the remote controller with the authentication information is kept depressed. In the case where the image acquisition execution command has yet to arrive, on the other hand, the process returns to step S102. In this case, the process proceeds in the order of steps S102, S104, S106, S110 and so on, thereby making it possible to acquire a still image by operating the shutter switch 26 of the camera proper 14. The operation of the next still image acquisition can be performed also by the interruption by the command reception from the common remote controller or the remote controller with the authentication information.

Also, in the case where step S274 determines that the received authentication command or general command is not the image acquisition execution command, whether the authentication command or the general command is the T button command as the result of depression of the telephoto button 68 of the common remote controller or the remote controller with the authentication information or not is determined (step S290). On determining that the T button command is involved, the lens unit 16 is driven to the telephoto side as long as the T button command comes (step S292), and once the T button command stops, the drive is suspended and the process returns to step S102. In this case, the process proceeds in the order of steps S102, S104, S106, S110 and so on, thereby making it possible to acquire a still image by operating the shutter switch 26 of the camera proper 14. The operation of the next still image acquisition can be performed also by the interruption by the command reception from the common remote controller or the remote controller with the authentication information.

On determining in step S290 that the T button command is not received, on the other hand, whether the authentication command or the general command is the W button command due to the depression of the wide-angle button 70 of the common remote controller or the remote controller with the authentication information or not is determined (step S294). On determining that the W button command is involved, the lens unit 16 is driven to the wide-angle side as long as the W button command arrives (step S296), and once the W button command is stopped, the drive is suspended, and the process returns to step S102. On determining in step S294 that the W button command is not involved, the process returns to step S102. In these cases, the process proceeds in the order of steps S102, S104, S106, S110 and so on, thereby making it possible to acquire a still image by operating the shutter switch 26 of the camera proper 14. The operation of the next still image acquisition can be performed also by the interruption by the command reception from the common remote controller or the remote controller with the authentication information.

In a dynamic image acquisition by the operation of the remote controller in permit mode M4 or limit mode M2, as shown in FIG. 36F, the live image is displayed on the monitor 38 (step S298), thereby to determine whether the image acquisition execution command flag is set or not upon reception of the image acquisition execution command upon depression of the image acquisition command button 62 of the common remote controller or the remote controller with the authentication information (step S300). On determining that the image acquisition execution command flag is set, determination is made as to whether the dynamic image is being acquired or not while at the same time clearing the image acquisition execution command flag (step S302). On determining that the dynamic image is not being acquired, on the other hand, the focusing operation is performed and the dynamic image acquisition operation started (step S304). Then, the residual memory capacity of the built-in memory 112 and/or the removable memory 114 is checked (step S306). In the case where the residual memory capacity is less than a predetermined amount, the "memory full" alarm is displayed on the monitor 36 (step S308) thereby to end the dynamic image acquisition operation (step S310), and the process returns to step S102. In this case, the process proceeds from step S102 to steps S104, S134, S138 and S140 in that order, in which steps S138 and S140 are repeated in a loop. In the process, the operator is informed by the alarm display in step S308 that no dynamic image can be acquire any longer, and therefore, switches the select switch 34 of the camera proper 14.

In the case where the residual memory capacity is not less than the predetermined amount, on the other hand, the process returns to step S304 to continue the dynamic image acquisition operation.

Also, in the case where step S302 determines that the dynamic image is being acquired, the process proceeds to step S310 to end the image acquisition operation, followed by returning to step S102. Specifically, the dynamic image is acquired in response to the command from the remote controller during the period from the time of reception of the image acquisition execution command upon depression of the image acquisition command button 62 of the common remote controller or the remote controller with the authentication information to the time of the next reception of the image acquisition execution command by the depression of the image acquisition command button 62. In other words, upon reception of the image acquisition execution command during the loop including steps S304, S306 and S304 in that order, the operation is executed from step S216 by interruption, and step S302 determines that the dynamic image is being acquired, thereby ending the image acquisition operation. The process, once returned to step S102 upon completion of a dynamic image acquisition in this way, proceeds from step S102 to steps S104, S134, S138 and S140 in that order, in which steps S138 and S140 are repeated in a loop. As a result, the next operation of the dynamic image acquisition is made possible by the shutter switch 26 of the camera proper 14. The next operation of the dynamic image acquisition is also made possible by the interruption due to the command reception from the common remote controller or the remote controller with the authentication information.

On determining in step S300 that the image acquisition execution command flag is clear, the process proceeds to step S290 to determine whether the T button command is issued or not. In the case where the T button command is issued, the lens unit 16 is driven to the telephoto side as long as the T button command arrives (step S292), while once the T button command stops, the drive is suspended, and the process returns to step S102. In the case where this T button command is received during the dynamic image acquisition loop of steps S304 and S306, the lens unit 16 is driven by the interruption and the zoom-up image acquisition operation is made possible. The process, once returned to step S102, proceeds from step S102 to steps S104, S134, S138 and S140 in that order, so that the loop of steps S138 and 3140 is repeated. In the process, the dynamic image acquisition loop of steps S304 and S306 is executed continuously, and the dynamic image continues to be acquired until the process proceeds to step S310 due to the interruption by the reception of the image acquisition execution command upon depression of the image acquisition command button 62 of the optical remote controller 12, 76 or 94.

On determining in step S290 that the T button command is not issued, on the other hand, determination is made as to whether the W button command is issued or not (step S294). In the case where the W button command is issued, the lens unit 16 is driven to the wide-angle side as long as the W button command arrives (step S296). Once the W button command ceases to arrive, the drive is suspended, and the process returns to step S102. Also in this case, like in the case of the T button command described above, the zoom-down image acquisition operation is performed if a dynamic image is being acquired, and until the interruption due to the reception of the next image acquisition execution command, the dynamic image continues to be acquired.

Also, on determining in step S294 that the W button command is not in effect either, the process returns to step S102 without doing anything.

As described above, while the dynamic image acquisition operation is going on, the particular dynamic image operation can be ended or the zoom operation can be performed by an interruption due to the receipt of the image acquisition execution command or the T or W button command from the common remote controller or the remote controller with the authentication informal ion.

With regard to the dynamic image, the recording time can be limited to, say, 15 seconds, and in accordance with the memory capacity corresponding to the number of seconds of the particular time, the residual memory capacity is determined in step S306. In this way, the dynamic image acquisition operation can be automatically ended.

In the play operation by the remote controller operation in permit mode M4 or limit mode M2, on the other hand, the last image recorded in the built-in memory 112 or the removable memory 114 is displayed on the monitor 38, thereby to perform the operation corresponding to the switches and buttons of the remote controller with the authentication information or the common remote controller without the authentication function.

Specifically, as shown in FIG. 36G, in the case where the authentication command or the general command received from the remote controller in step S216 is the operation command for the arrow switch 78 of the common remote controller or the remote controller with the authentication information (step S312), and in the case where the operation is the down operation command (album) by down switch operation of the arrow switch 78 (step S314), then the image recorded in the album is displayed on the monitor 38 (step S316). Upon depression of the menu button 82 of the common remote controller or the remote controller with the authentication information while this image is being displayed (step S318), the album display function is ended and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

In the case of the up operation command (calendar) by the up switch operation of the arrow switch 78 (step S320), on the other hand, the images recorded for the current month are displayed in calendar form on the monitor 38 (step S322). Further, the images for the previous months or the images acquired for the selected day can be selected and displayed by the arrow switch 78. Upon depression of the menu button 82 during this display (step S324), the calendar display function is ended and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

Also, in the case of the right operation command by the right switch operation of the arrow switch 78 (step S326), the next image is displayed on the monitor 38 (step S328), and the process returns to step S102. Incidentally, assuming that this right switch is operated in the case where the current image is the last one, the first image is displayed. In this case, the process proceeds from step S102 to steps S104, S156, S153, S160 and so on in that order, thereby making possible the play operation corresponding to the switches and buttons of the camera proper 14. Also, other operations such as the play operation are made possible by the interruption due to the command reception from the common remote controller or the remote controller with the authentication information. After the process is returned to step S102, however, the image updated in step S328 continues to be maintained in step S158.

Also, in the case of the left operation, command due to the left switch operation of the arrow switch 78 (step S330), the previous image is displayed on the monitor 38 (step S332) and the process returns to step S102. Incidentally, in the case where the current image is the first one, the last image is displayed by the left switch operation. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information. After the process is returned to step S102, however, the image updated in step S328 continues to be maintained in step S158.

Also, in the case where the authentication command or the general command received from the remote controller in step S216 is the OK command by the operation of the OK button 80 of the common remote controller or the remote controller with the authentication information (step S334), whether the current image is a dynamic one or not is checked (step S336), and if not a dynamic image, it is ignored and the process returns to step S102. In the case of a dynamic image, on the other hand, the particular dynamic image is displayed (step S338) and the process returns to step S102. In these cases, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information. After the process is returned to step S102, however, the dynamic image displayed in step S338 continues to be maintained in step S158.

In the case where the authentication command or the general command received from the remote controller in step S216 is the T button command issued by the operation of the telephoto button 68 of the common remote controller or the remote controller with the authentication information (step S340), the image displayed on the monitor 38 is enlarged (step S342) and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information. After the process is returned to step S102, however, the image enlarged in step S342 continues to be maintained in step S158.

Also, in the case where the authentication command or the general command received from the remote controller in step S216 is the W button command issued by the operation of the wide-angle button 70 of the common remote controller or the remote controller with the authentication information (step S344), on the other hand, the image displayed on the monitor 38 is reduced and displayed in the form of index (step S346), and the process returns to step S102. In this case, the process proceeds from step S102 to steps S104, S156, S158, S160 and so on in that order, thereby making possible the play operation corresponding to the switches and buttons of the camera roper 14. Also, other operations such as the play operation are made possible by the interruption due to the command reception from the common remote controller or the remote controller with the authentication information. After the process is returned to step S102, however, the display of the reduction list in step S346 continues to be maintained in step S158.

Incidentally, the reduction list is displayed in step S346 in such a manner that each time the wide-angle button 70 is depressed, four frames, nine frames, 16 frames and 25 frames can be displayed sequentially as a list. Also, each time the telephoto button 68 is depressed while the reduction list is on display, the operation is performed to restore the display of 25 frames, 16 frames, nine frames, four frames and one frame in that order in step S342.

Conversely, upon depression of the wide-angle button 70 during the enlarged display of step S342 corresponding to the depression of the telephoto button 68 while the normal image is on display, on the other hand, the operation is performed in step S346 to restore the enlarged display to the original size.

Also, in the case where the authentication command or the general command received from the remote controller in step S216 is the erase command due to the operation of the erase button 88 of the common remote controller or the remote controller with the authentication information (step S348), the confirmation as to whether the image is really erased or not is displayed on the monitor 38 (step S350), and in the case where the erase suspension is selected, the process returns to step S102 without erasure. In this case, the process proceeds from, step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

On determining in step S350 that the erasure execution is selected, on the other hand, the particular frame is erased, and the immediately preceding image is displayed (step S352), followed by returning the process to step S102. Incidentally, in the case where the image to be erased is protected, the fact that the image is protected is displayed as an alarm on the monitor 38, and the erasure execution is ignored. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

Also, in the case where the authentication command or the general command received from the remote controller in step S216 is the print command due to the operation of the print button 84 of the common remote controller or the remote controller with the authentication information (step S354), the required print operation such as the image transmission to the printer is carried cut (step S356), and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

Also, in the case where the authentication command or the general command received from the remote controller in step S216 is the information display command due to the operation of the information button 86 of the common remote controller or the remote controller with the authentication information (step 3358), the information on the image displayed on the monitor 38 is displayed (step S360), and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from, the common remote controller or the remote controller with the authentication information. After the process returns to step S102, however, the image information display in step S360 continues to be maintained in step S158.

Also, in the case where the authentication command or the general command received from the remote controller in step S216 is the protection command due to the operation of the protection button 92 of the common remote controller or the remote controller with the authentication information (step S362), the protection flag is attached to the image displayed on the monitor 38 (step S364), and the process returns to step) S102. In this case, the process proceeds from step S102 to steps S104, S156, S158, S160 and so on in that, order, thereby making possible the play operation corresponding to the switches and buttons of the camera proper 14. Also, other operations such as the play operation are made possible by the interruption due to the command reception from the common remote controller or the remote controller with the authentication information.

Also, in the case where the authentication command or the general command received from the remote controller in step S216 is the rotation command due to the operation of the rotation button 90 of the common remote controller or the remote controller with the authentication information (step S366), the image displayed on the monitor 38 is rotated 90 degrees clockwise (step S368) and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information. After the process returns to step S102, however, the rotated image display in step S368 is continues to be maintained in step S158. Incidentally, upon another depression of the rotation button 90, the image rotated by 90 degrees counterclockwise from the original image is displayed in step S368, and a further depression restores the original image.

Also, in the case where the authentication command or the general command received from the remote controller in step S216 is the menu command due to the operation of the menu button 82 of the common remote controller or the remote controller with the authentication information (step S370), the menu can be displayed and set. A multiplicity of menu functions are available. In the menu setting process, details can be set hierarchically from the top menu. The display contents of the top menu are varied depending on the position of the select switch 34. Therefore, the positron of the select switch 34 is read and the corresponding menu is displayed on the monitor 38 (step S372).

In still image acquisition mode J1, the voice recording, the macro image acquisition, the scene selection and the mode menu are displayed. In dynamic image acquisition mode J2, on the other hand, the voice recording, the macro image acquisition, the auto stabilization and the mode menu are displayed. In play mode J3, the menu displayed is varied depending on the content reproduced. Specifically, at the time of still image reproduction, storage play, information display, slide show and the mode menu are displayed. At the time of dynamic image reproduction, on the other hand, the storage play, information display, dynamic image play end and the mode menu are displayed. At the time of voice reproduction, the storage play, information display, voice play end and the mode menu are displayed. At the time of the calendar play, the calendar play end, information display, slide show, and the mode menu are displayed. At the time of the album play, the album selection, information display, album play end and the mode menu are displayed. Although the detailed explanation of the operation and the display of the low-order menu is omitted for each case, a common mode menu will be explained.

Specifically, the display content of the mode menu is also varied with the position of the select switch 34. In still image acquisition mode J1, an image quality mode switching, a sequential shoot setting, an exposure correction, a digital zoom setting, a white balance setting and a memory selection setting for recording images are possible. In dynamic image acquisition mode J2, on the other hand, the image quality mode switching, the exposure correction, the digital zoom setting, the white balance setting, a full-time auto focus setting and the memory selection setting for recording images are possible. In play mode J3, rotation display, voice recording, image editing, image correction and image synthesis are possible.

For ending the menu operation, the menu button 82 is depressed again (step S374) and the process returns to step S102. In this case, the process proceeds from step S102 to steps S104, S156, S158, S160 and so on in that order, thereby making possible the play operation corresponding to the switches and buttons of the camera proper 14. Also, other operations such as the play operation are made possible by the interruption due to the command reception from the common remote controller or the remote controller with the authentication information.

In the case where step S256 determines that the setting mode M3 is in effect, on the other hand, as shown in FIG. 36D, the setting mode is entered. Specifically, in the setting mode, the functions of the function limit table shown in FIG. 17 and the state of the limit flag are displayed on the monitor 38, and by using the plus and minus buttons 72, 74 and the telephoto button and wide-angle buttons 68, 70 of the authentication command remote controller or the arrow switch 78 and the OK button 80 of the authentication command remote controller, the circuit selection of the limit function and the flag set/clear setting and change are carried out (step S376). Once the setting or change is over, the image acquisition command button 62 of the authentication command remote controller is depressed. Thus, upon receipt of the image acquisition execution command thereof, the content is established (step S378), and the process returns to step S102. When the process returns to step S102, the setting mode M3 is in effect, and therefore, the determination process of step S102 is simply repeated. Thus, only the operation of the authentication command remote controller is accepted but not the operation of the switches or buttons on the camera proper 14.

On determining in step S256 that the prohibit mode M1 is in effect, the prohibit mode is entered. Specifically, in prohibit mode, the state of the select switch 34 on the camera proper 14 is read (step S380) and the operation is performed in response to the image acquisition command issued as an authentication command from the authentication command remote controller.

Specifically, in the image acquisition operation to acquire a still image by operating the remote controller in prohibit mode M1 with the select switch 34 set in the still image acquisition mode J1, as shown in FIG. 36F, the main controller 118 displays the live image on the monitor 38 (step; S272), and determines whether the authentication command from the authentication command remote controller received in step) S216 is an image acquisition execution command or not (step S274). On determining that the authentication command is the image acquisition execution command, the focusing operation is performed (step S276) to acquire the still image (step S278), followed by determination of whether the sequential shooting mode is set or not (step S280). In the case where the sequential shooting mode is not set, an image already acquired is displayed for a short, time on the monitor 38 (step S282), after which the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

On determining in step 280 that the sequential shooting mode is set, on the other hand, whether the built-in memory 112 and/or the removable memory 114 has at least a predetermined amount of the residual memory capacity or not (step S284). In the case where the residual memory capacity is less than a predetermined amount, the "memory full" alarm is displayed on the monitor 38 (step S286), and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, on determining in step S284 that enough memory capacity remains, whether the image acquisition execution command has arrived or not from the authentication command remote controller is confirmed (step S288), and upon arrival of the image acquisition execution command, the process returns to step S278 to acquire the next image. Specifically, the sequential shooting is carried out as long as the image acquisition command button 62 of the authentication command remote controller is kept depressed. In the case where the image acquisition execution command has yet to arrive, on the other hand, the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where step S274 determines that the received authentication command is not the image acquisition execution command, whether the authentication command is the T button command as the result of depression of the telephoto button 68 of the authentication command remote controller or not is determined (step S290). On determining that the T button command is involved, the lens unit 16 is driven to the telephoto side as long as the T button command comes (step S292), and once the T button command stops, the drive is suspended and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

On determining in step S290 that the T button command is not received, on the other hand, whether the authentication command is the W button command due to the depression of the wide-angle button 70 of the authentication command remote controller or not is determined (step S294). On determining that the W button command is involved, the lens unit 16 is driven to the wide-angle side as long as the W button command arrives (step S296), and once the W button command is stopped, the drive is suspended, and the process returns to step S102. On determining in step S294 that, the W button command is not involved, the process returns to step S102. In these cases, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote, controller and the interruption by receiving the particular command.

In the image acquisition operation to acquire a dynamic image by operating the remote controller in prohibit mode M1 with the select, switch 34 set in dynamic image acquisition mode J2 in step S380, on the other hand, as shown in FIG. 36F, a live image is displayed on the monitor 38 (step S298), thereby to determine whether the image acquisition execution command flag is set or not upon reception of the image acquisition execution command upon depression of the image acquisition command button 62 of the authentication command remote controller or the remote controller with the authentication information (step S300). On determining that the image acquisition execution command flag is set, determination is made as to whether the dynamic image is being acquired or not while at the same time clearing the image acquisition execution command flag (step S302). On determining that the dynamic image is not being acquired, on the other hand, the focusing operation is performed and the dynamic image acquisition operation started (step S304). Then, the residual memory capacity of the built-in memory 112 and/or the removable memory 114 is checked (step S306). In the case where the residual memory capacity is less than a predetermined amount, the "memory full" alarm is displayed on the monitor 38 (step S308) thereby to end the dynamic image acquisition operation (step S310), and the process returns to step S102. In this case, the prohibit mode M1 is in effect, and therefore, the determination process of step S102 is simply repeated but the operation of the switches or buttons on the camera proper 14 is not accepted. In this process, the user is informed by the alarm display in step S308 that the dynamic image cannot be acquired any longer, and therefore, switches the select switch 34 on the camera proper 14. Thus, the next operation of a still image acquisition is made possible only by accepting the operation of the authentication command remote controller and the resulting interruption due to the reception of the particular command.

In the case where the residual memory capacity is not less than the predetermined amount, on the other hand, the process returns to step S304 to continue the dynamic image acquisition operation.

Also, in the case where step S302 determines that the dynamic image is being acquired, the process proceeds to step S310 to end the image acquisition operation, followed by returning to step S102. Specifically, the dynamic image is acquired in response to the command from the remote controller during the period from the time of reception of the image acquisition execution command upon depression of the image acquisition command button 62 of the authentication command remote controller to the time of the next reception of the image acquisition execution command by the depression of the image acquisition command button 62. In other words, upon reception of the image acquisition execution command during the loop including steps S304, S306 and S304 in that order, the operation is executed from step S216 by interruption, and step S302 determines that the dynamic image is being acquired, thereby ending the image acquisition operation. The process, once returned to step S102 upon completion of a dynamic image acquisition in this way, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

On determining in step S300 that the image acquisition execution command flag is clear, the process proceeds to step S290 to determine whether the T button command is issued or not. In the case where the T button command is issued, the lens unit 16 is driven to the telephoto side as long as the T button command arrives (step S292), while once the T button command stops, the drive is suspended, and the process returns to step S102. In the case where this T button command is received during the dynamic image acquisition loop of steps S304 and S306, the lens unit 16 is driven by the interruption and the zoom-up image acquisition operation is made possible. The process, once returned to step S102, the prohibit mode M1 is in effect, and therefore, the determination process of step S102 is simply repeated but the operation of the switches or buttons on the camera proper 14 is not accepted. In the process, the dynamic image acquisition loop of steps S304 and S306 is executed continuously, and the dynamic image continues to be acquired until the process proceeds to step S310 due to the interruption by the reception of the image acquisition execution command upon depression of the image acquisition command button 62 of the authentication command remote controller.

On determining in step S290 that the T button command is not issued, on the other hand, determination is made as to whether the W button command is issued or not (step S294). In the case where the W button command is issued, the lens unit 16 is driven to the wide-angle side as long as the W button command arrives (step S296). Once the W button command ceases to arrive, the drive is suspended, and the process returns to step S102. Also in this case, like in the case of the T button command described above, the zoom-down image acquisition operation is performed if a dynamic image is being acquired, and until the interruption due to the reception of the next image acquisition execution command, the dynamic image continues to be acquired.

Also, on determining in step S294 that the W button command is not in effect either, the process returns to step S102 without doing anything.

As described above, while the dynamic image acquisition operation in prohibit mode M1 is going on, the particular dynamic image operation can be ended or the zoom operation can be performed by an interruption due to the receipt of the image acquisition execution command or the T or W button command from the authentication command remote controller.

With regard to the dynamic image, the recording time can be limited to, say, 15 seconds, and in accordance with the memory capacity corresponding to the number of seconds of the particular time, the residual memory capacity is determined in step S306. In this way, the dynamic image acquisition operation can be automatically ended.

In the play operation by operating the remote controller in prohibit mode M1 with the select switch 34 set in play mode 33, on the other hand, the last image recorded in the built-in memory 112 or the removable memory 114 is displayed on the monitor 38, and the operation corresponding to the switches or buttons of the authentication command remote controller is performed.

Specifically, as shown in FIG. 36G, in the case where the authentication command received from the remote controller in step S216 is the operation command for the arrow switch 78 of the authentication command remote controller (step S312), and in the case where the operation is the down operation command (album) by down switch operation of the arrow switch 78 (step S314), then the image recorded in the album is displayed on the monitor 38 (step S316). Upon depression of the menu button 82 of the authentication command remote controller while this image is being displayed (step S318), the album display function is ended and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

In the case of the up operation command (calendar) by the up switch operation of the arrow switch 78 (step S320), on the other hand, the images recorded for the current month are displayed in calendar form on the monitor 38 (step S322). Further, the images for the previous months or the images acquired for the selected day can be selected and displayed by the arrow switch 78. Upon depression of the menu button 82 during this display (step) 3324), the calendar display function is ended and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case of the right operation command by the right switch operation of the arrow switch 78 (step S326), the next image is displayed on the monitor 38 (step S328), and the process returns to step S102. Incidentally, assuming that this right switch is operated in the case where the current image is the last one, the first image is displayed. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case of the left operation command due to the left switch operation of the arrow switch 78 (step S330), the previous image is displayed on the monitor 38 (step S332) and the process returns to step S102. Incidentally, in the case where the current image is the first one, the last image is displayed by the left switch operation. In this case, the prohibit mode M1 is in effect, and therefore, the determination process of step S102 is simply repeated but the operation of the switches or buttons on the camera proper 14 is net accepted. Specifically, the next operation to acquire a still image is made possible only by accepting the operation of the authentication command remote controller and the interruption by receiving the particular command.

Also, in the case where the authentication command received from the remote controller in step S216 is the OK command by the operation of the OK button 80 of the authentication command remote controller (step S334), whether the current image is a dynamic one or not is checked (step S336), and if not a dynamic image, it is ignored and the process returns to step S102. In the case of a dynamic image, on the other hand, the particular dynamic image is displayed (step S338) and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only lay accepting the operation of the authentication command remote controller and the interruption by receiving the particular command.

In the case where the authentication command received from the remote controller in step S216 is the T button command issued by the operation of the telephoto button 68 of the authentication command remote controller (step S340), the image displayed on the monitor 38 is enlarged (step S342) and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where the authentication command received from the remote controller in step S216 is the W button command issued by the operation of the wide-angle button 70 of the authentication command remote controller (step S344), on the other hand, the image displayed on the monitor 38 is reduced and displayed in the form of index (step S346), and the process returns to step S102. In this case, the prohibit mode M1 is in effect, and therefore, the determination process of step S102 is simply repeated but the operation of the switches or buttons on the camera proper 14 is net accepted. Specifically, the next operation to acquire a still image is made possible only by accepting the operation of the authentication command remote controller and the interruption by receiving the particular command.

Incidentally, the reduction list is displayed in step S346 in such a manner that, each time the wide-angle button 70 is depressed, four frames, nine frames, 16 frames and 25 frames can be displayed sequentially as a list. Also, each time the telephoto button 68 is depressed while the reduction list is on display, the operation is performed to restore the display of 25 frames, 16 frames, nine frames, four frames and one frame in that order in step S342.

Conversely, upon depression of the wide-angle button 70 during the enlarged display of step S342 corresponding to the depression of the telephoto button 68 while the normal image is on display, on the other hand, the operation is performed in step S346 to restore the enlarged display to the original size.

Also, in the case where the authentication command received from the remote controller in step S216 is the erase command due to the operation of the erase button 88 of the authentication command remote controller (step S348), the confirmation as to whether the image is really erased or not is displayed on the monitor 38 (step S350), and in the case where the erase suspension is selected, the process returns to step S102 without erasure. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

On determining in step S350 that the erasure execution is selected, on the other hand, the particular frame is erased, and the immediately preceding image is displayed (step S352), followed by returning the process to step S102. Incidentally, in the case where the image to be erased is protected, the fact that the image is protected is displayed as an alarm on the monitor 38, and the erasure execution is ignored. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where the authentication command received from the remote controller in step S216 is the print command due to the operation of the print button 84 of the authentication command remote controller (step S354), the required print operation such as the image transmission to the printer is carried out (step S356), and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where the authentication command received from the remote controller in step S216 is the information display command due to the operation of the information button 36 of the authentication command remote controller (step S358), the information on the image displayed on the monitor 38 is displayed (step S360), and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where the authentication command received from the remote controller in step S216 is the protection command due to the operation of the protection button 92 of the authentication command remote controller (step S362), the protection flag is attached to the image displayed on the monitor 38 (step S364), and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

Also, in the case where the authentication command received from the remote controller in step S216 is the rotation command due to the operation of the rotation button 90 of the authentication command remote controller (step S366), the image displayed on the monitor 38 is rotated 90 degrees clockwise (step S368) and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command, remote controller and the interruption by receiving the particular command. Incidentally, upon another depression of the rotation button 90, the image rotated by 90 degrees counterclockwise from the original image is displayed in step S366, and a further depression restores the original image.

Also, in the case where the authentication command received from the remote controller in step S216 is the menu command due to the operation of the menu button 82 of the authentication command remote controller (step S370), the menu can be displayed and set. A multiplicity of menu functions are available. In the menu setting process, details can be set hierarchically from the top menu. The display contents of the top menu are varied depending on the position of the select switch 34. Therefore, the position of the select switch 34 is read and the corresponding menu is displayed on the monitor 38 (step S372).

In still image acquisition mode J1, the voice recording, the macro image acquisition, the scene selection and the mode menu are displayed. In dynamic image acquisition mode J2, on the other hand, the voice recording, the macro image acquisition, the auto stabilization and the mode menu are displayed. In play mode 33, the menu displayed is varied depending on the content reproduced. Specifically, at the time of still image reproduction, storage play, information display, slide show and the mode menu are displayed. At the time of dynamic image reproduction, on the other hand, the storage play, information display, dynamic image play end and the mode menu are displayed. At the time of voice reproduction, the storage play, information display, voice play end and the mode menu are displayed. At the time of the calendar play, the calendar play end, information display, slide show, and the mode menu are displayed. At the time of the album play, the album selection, information display, album play end and the mode menu are displayed. Although the detailed explanation of the operation and the display of the low-order menu is omitted for each case, a common mode menu will be explained.

Specifically, the display content of the mode menu is also varied with the position of the select switch 34. In still image acquisition mode J1, an image quality mode switching, a sequential shoot setting, an exposure correction, a digital zoom setting, a white balance setting and a memory selection setting for recording images are possible. In dynamic image acquisition mode J2, on the other hand, the image quality mode switching, the exposure correction, the digital zoom setting, the white balance setting, a full-time auto focus setting and the memory selection setting for recording images are possible. In play node J3, rotation display, voice recording, image editing, image correction and image synthesis are possible.

For ending the menu operation, the menu button 82 of the authentication command remote controller is depressed again (step S374) and the process returns to step S102. In this case, the prohibit mode M1 is in effect, and therefore, the determination process of step S102 is simply repeated but the operation of the switches or buttons on the camera proper 14 is not accepted. Specifically, the next operation to acquire a still image is made possible only by accepting the operation of the authentication command remote controller and the interruption by receiving the particular command.

As described above, according to the first embodiment of the invention, the authentication information is held in the remote controller 12, 76 or 94 separated from the camera proper 14, and the authentication information is set in the camera proper 14. Should, the camera proper 14 is lost, therefore, the predetermined functions such as the reproduction of the acquired images are limited in the absence of the authentication information from the remote controller 12, 76 or 94, thereby making it possible to maintain security.

Also, by using the small remote controller 12, 76 or 94 for dual purpose of image acquisition and authentication, an easy-to-operate security system that can be carried with a small burden is realized.

Also, the functions of the switches and buttons of the remote controller 12 or 76 can be switched by the authentication setting switch 64, so that the number of the switches and buttons can be reduced for a smaller device size.

The common remote controller (such as the optical remote controller 106) having no authentication function can also be used in a limited range of functions, and therefore, can meet various application requirements of the image acquisition device.

Also, by setting the camera proper 14 in prohibit mode M1 at the time of switching on power, the camera proper 14 cannot be used by itself unless a command is issued from the authentication command remote controller or the current authentication mode is switched to another authentication mode by the remote controller with authentication information. In other words, the camera proper 14 can be locked.

As an alternative, the authentication mode set at the time of disconnecting the power supply can be held. In this case, the authentication mode, if stored in a nonvolatile memory, can be kept held. Then, at the time of switching on the camera proper 14, the authentication mode thus stored is read and set. In this way, the camera proper 14 can be activated in the previous authentication mode.

Also, in the case where the arrangement is made so that the authentication mode can be changed only from the remote controller with authentication information, the situation can be prevented in which the authentication mode is changed and the acquired images are reproduced by a third party having none of the remote controller with authentication information.

Also, in view of the fact that the camera proper 14 can be set in prohibit mode M1 by the prohibit timer 148, a comparative security is maintained even in the rare case where the camera proper 14 is stolen. In this case, a configuration, if employed, in which the time continues to be counted even after the power is switched off and the prohibit mode comes to be set in a predetermined time, eliminates the trouble of switching the authentication mode each time the power is switched off. Further, by making such an arrangement that in the case where the battery is consumed up or removed, the prohibit mode M1 is set immediately or after a preset time taking the presence or absence of a backup battery or capacitor into consideration or based on the result of monitoring the voltage, then the situation can be avoided in which the battery 146 is intentionally or accidentally removed or left used up and the life of the backup battery and capacity also expires, with the result that neither the prohibit timer 148 can work to count nor the prohibit mode can be set on the lapse of a preset time, thereby making it impossible to use the digital camera 10.

Also, since the command is transmitted/received optically or by radio signal, the user is not required to carry the cable or the like to connect the camera proper 14 and the remote controller 12, 76, 94 or 106.

Incidentally, a plurality of types of remote controllers 12, 76, 94 and 106 for transmitting commands of different functions are available, and therefore, the user can use any remote controller capable of transmitting the command of the desired function. Further, for executing the function such as the reproduction required to protect the privacy, the remote controller with authentication information such as 12, 76 or 94 capable of transmitting the authentication command including the authentication information is required. The image acquisition operation, which itself requires no privacy protection, however, can be performed using the common remote controller capable of transmitting a command related only to the image acquisition function without the authentication information. For a travel or the like application, for example, the common remote controller having only the limited image acquisition function may be carried while the remote controller with the authentication information can be left in home. Then, the image acquisition operation can be freely carried out, and even if the camera proper 14 and the remote controller are lost or stolen while traveling, the third party thief of the camera proper 14 does not possess the remote controller with the authentication information left by the owner in home, and therefore, the security of the acquired images can be protected.

Also, in transmitting/receiving an important authentication command, the illegal use by wiretapping of the authentication command can be prevented by limiting the ability to transmit/receive the authentication command. Specifically, it is not an easy matter to meet, the two conflicting requirements in which a configuration facilitating the command reception from a broad range is desired for the general command on the one hand, and the authentication command is desirably received from a limited range to prevent the illegal duplication and use by wiretapping at the same time. According to this embodiment, the transmission output for the authentication command is reduced as compared with the transmission output for the general command in the image acquisition operation, etc. to narrow the range in which the authentication command arrives. As an alternative, even though the output of the commanding device is of the same level, the reception sensitivity of the image acquisition device is reduced for the authentication command to narrow the range in which the authentication command can be received. In this way, the authentication commands are transmitted/received more in proximity to each other than the general commands. As a result, the illegal use by wiretapping or the like of the authentication information is prevented and the security of the image acquisition device and the image acquisition system is improved with a simple configuration.

Second Embodiment

Now, a second embodiment of the invention will be explained.

In the case where an acquired image is recorded in a removable memory 114 in a standardized format, assume that the camera proper 14 is set in prohibit mode M1 and cannot be used. Even in that case, the removable memory 114 may be pulled off from the camera proper 14 and the images therein may be reproduced on another device, resulting in the leakage of information. In view of this, according to this embodiment, the image acquired in prohibit mode M1 is recorded only in the built-in memory 112, so that as long as the camera proper 14 remains in prohibit mode M1, the image cannot be reproduced by other than the remote controller with authentication information.

Specifically, unlike in the first embodiment described above, the still image acquired in step S288 is recorded only in the built-in memory 112 and the residual memory capacity is checked in step S294 only for the built-in memory 112. Also, the dynamic image acquired in step S314 is stored only in the built-in memory 112 and the residual memory capacity checked in step S316 only for the built-in memory 112. Further, in the case where the image recorded in the built-in memory 112 is copied or transferred to the removable memory 114 using the menu function (step S374), the particular image is encrypted by the encryption/decryption circuit 130 or by the main control unit 118 using a program. At the time of returning the image recorded in encrypted form in the removable memory 114 to the built-in memory 112 or reproducing it in the camera proper 14, the particular image is decrypted by the encryption/decryption circuit 130 or the main control unit 118 with the program.

Also, the owner may be desirous of hiding some image acquired in limit mode M2 or permit mode M4. In such a case, the owner of the camera proper 14 can prevent the loss of an image which otherwise might be caused by the removal of the removable memory 114, in such a manner that the prohibit timer 148 is set for a short rime and the image acquired in limit mode M2 or permit mode M4 is recorded only in the built-in memory 112 but not in the removable memory 114 to prevent the image reproduction without the remote controller with authentication information after entering the prohibit mode M1.

Specifically, the menu designating the place of recording the image is included as one of the set items of the menu, i.e., the built-in memory 112 only or the removable memory 114 only, or both the built-in memory 112 and the removable memory 114 with the priority given to one of them to record the image whenever the other is filled up.

Incidentally, to assure safe recording, the record selection menu may be so configured as to be capable of being set only with the menu (step S374) during the reproduction in prohibit mode M1.

As described above, according to the second embodiment of the invention, the image acquired by the camera proper 14 in prohibit mode M1 is stored in the built-in memory 112, and therefore, cannot be read by other devices. Also, as long as the camera proper 14 remains in prohibit mode M1, the image cannot be reproduced, copied, transferred or printed without the remote controller with authentication information. Further, the image in the built-in memory 112, if transferred to the removable memory 114, is stored in encrypted form, thereby making it also possible to maintain the security of the images in the built-in memory 112. Also, the user can select whether the acquired image is to be recorded either in the built-in memory 112 or in the removable memory 114.

Third Embodiment

Next, a third embodiment of the invention will be explained.

This embodiment uses, as the authentication information, the variable remote controller identification information in addition to the fixed remote controller identification information.

As shown in FIG. 37, according to this embodiment, a random number generator 180 or a data table 182 as a means to generate the variable remote controller identification information is included in the control unit 150 of the remote controller 12, 76, or 94 which is remote controller with authentication information.

The random number generator 180 may be of such a type that the random number is generated by the random number generation program such as the mixed congruential method or the linear congruential method using the CPU of the control unit 150, or of such a type that a pseudo-random number may be generated by a logic circuit such as a combination of a shift register and an exclusive-OR gate.

FIG. 38 is a diagram showing an example of the data table 182 as a random number table of 100 two-digit numerical values.

As described above, the use of the variable remote controller identification information in addition to the fixed remote controller identification information can improve the security against the duplication of the remote controller by the wiretapping of the past command from the remote controller.

This variable remote controller identification information may be used with or without the fixed remote controller identification information.

Figure 39B:
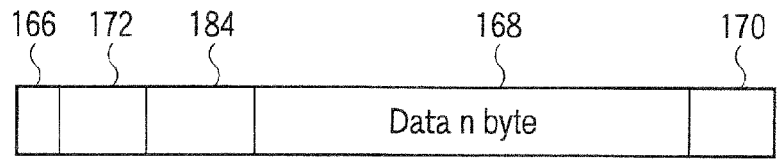
FIG. 39B is a diagram showing another example of the data format of the transmission data signal from the remote controller with the variable remote controller identification information.
Figure 39C:
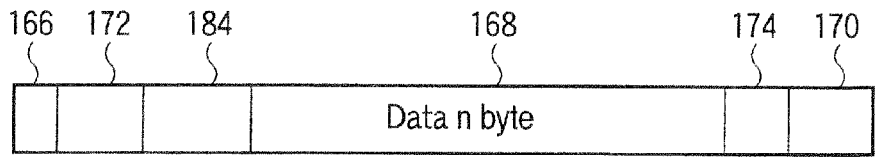
FIG. 39C is a diagram showing a further example of the data format of the transmission data signal from the remote controller with the variable remote controller identification information.
Figure 40:
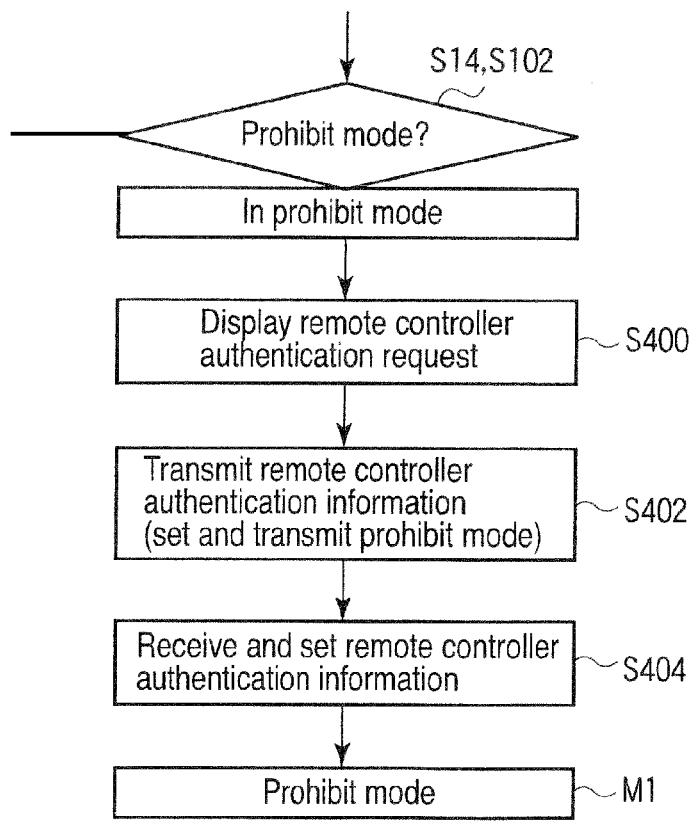
FIG. 40 is a diagram showing the flowchart for explaining the variable remote controller identification information request and the setting at the time of switching on the power of the camera proper.

FIGS. 39A to 39C, for example, are diagrams showing the data format of the transmission data signal from the remote controller 12, 76 or 94 in the case where an independent variable remote controller identification information 184 is attached in place of the fixed remote controller identification information 176 shown in FIGS. 24A to 24C. As shown in these diagrams, the random number generated in the remote controller control unit 150 or the value selected from the data table 182 may be added as the variable remote controller identification information 184 and transmitted. This independent variable remote controller identification information 184 can of course be transmitted in the form not as an addition but contained in a part of the data portion 163 or the header 172 (in the latter case, the data format shown in FIGS. 23A to 23C is used).

Next, how to use the variable remote controller identification information 184 will be explained. The camera proper 14, once set in prohibit mode M1, can be operated only in accordance with the command from the remote controller 12, 76 or 94. In order to improve the security of this command from the remote controller, the variable remote controller identification information 184 is added to the command from the remote controller 12, 76 or 94, so that only the command of the remote controller 12, 76 or 94 having the coincident information is accepted. The prohibit command is transmitted, if any, from the remote controller 12, 76 or 94 together with the random number generated by the random number generator 180 or the value selected from the data table 182. The camera proper 14 stores this random number or the numerical value, as the case may be, at the time of transfer to the prohibit mode M1. This random number or the numerical value is attached to the command other than the prohibit command which may be subsequently sent to the camera proper 14 from the remote controller 12, 76 or 94. On the part of the camera proper 14, this random number or the value is checked with the stored value for coincidence, and only in the case where they are coincident with each other, the particular command is executed. The stored value is erased with the arrival of a command to set the mode other than the prohibit mode M1, i.e., a command to switch to the permit mode M4, the limit mode M2 or the setting mode M3 (the permit command, the limit command or the setting command) from the remote controller 12, 76 or 94.

In the case where the remote controller 12, 76 or 94 transmit a prohibit command anew, the random number next to the one newly generated by the random number generator 180 or the next value selected from the data table 182 is attached to the prohibit command transmitted. This next random number or this next value is stored in the camera proper 14, after which the command is executed upon confirmation of coincidence.

Next, the request and setting of the variable remote controller identification information at the time of switching on the power of the camera proper 14 will be explained with reference to FIG. 10.

When the power of the camera is switched on, the authentication mode is designated for setting as shown in FIG. 27 and set to the mode stored in the mode memory 136. In this case, the camera proper 14, if set to the prohibit mode M1, cannot obtain the variable remote controller identification information 184 of the remote controller 12, 76 or 94. In the case where the camera proper 14 is switched to the prohibit mode M1 at the time of switching on power, i.e., in the case where the prohibit mode M1 is set in step S12 or S102, therefore, the request to transmit the variable remote controller identification information is displayed on the monitor 38 of the camera proper 14 (step S400). The operator, viewing this display, sends the prohibit command from the remote controller 12, 76 or 94 and thus transmits the variable remote controller identification information to the camera proper 14 (step S402). The camera proper 14 stores this variable remote controller identification information 184 (step S404).

In the subsequent case where the command other than the prohibit command is sent from the remote controller 12, 76 or 94 to the camera proper 14, the command is accompanied by the variable remote controller identification information 184. The camera proper 14 checks the coincidence between the variable remote controller identification information 184 and the value stored in step S404, and only when they are coincident with each other, executes the command.

After that, the stored value is erased with the arrival, if any, of the command (the permit command, the limit command, the setting command) to switch to the mode other than the prohibit mode M1, i.e., the permit mode M4, the limit mode M2 or the setting mode M3 from the remote controller 12, 76 or 94. In the case where the remote controller 12, 76 or 94 transmit a prohibit command anew, new variable remote controller identification information 184 is transmitted and stored in the camera proper 14, after which the command is executed upon confirmation of coincidence.

As described above, according to the third embodiment of this invention, the variable authentication information is generated using the random number generated in the random number generator 180 or the value selected from the data table 182. In this way, the security can be improved against the duplication of the commanding device by wiretapping of the past commanding device information from the commanding device.

Fourth Embodiment

Next, a fourth embodiment of the invention will be explained.

Figure 41:
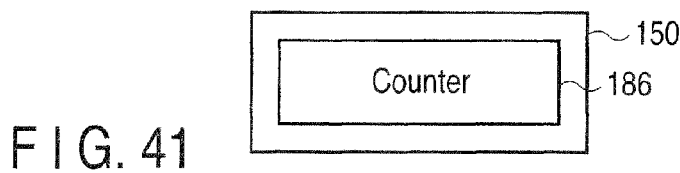
FIG. 41 is a diagram showing the configuration of the control unit of the remote controller according to a fourth embodiment of the invention.
Figure 42:
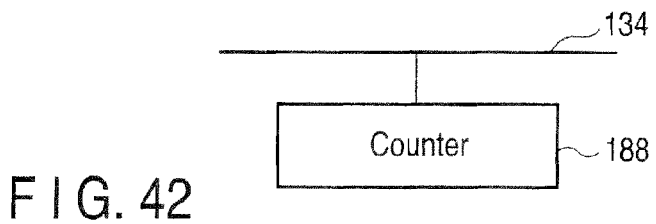
FIG. 42 is a diagram showing the configuration of the camera proper according to the fourth embodiment.

According to this embodiment, the control unit 150 of the remote controller 12, 76 or 94 as the remote controller with the authentication information includes a counter 186 therein as shown in FIG. 41. Also, the camera proper 14 includes a counter 188 connected to the bus 134, as shown in FIG. 42. According to this embodiment, the reliability of the command from the remote controllers is improved using the counters 186, 188.

Figure 43:
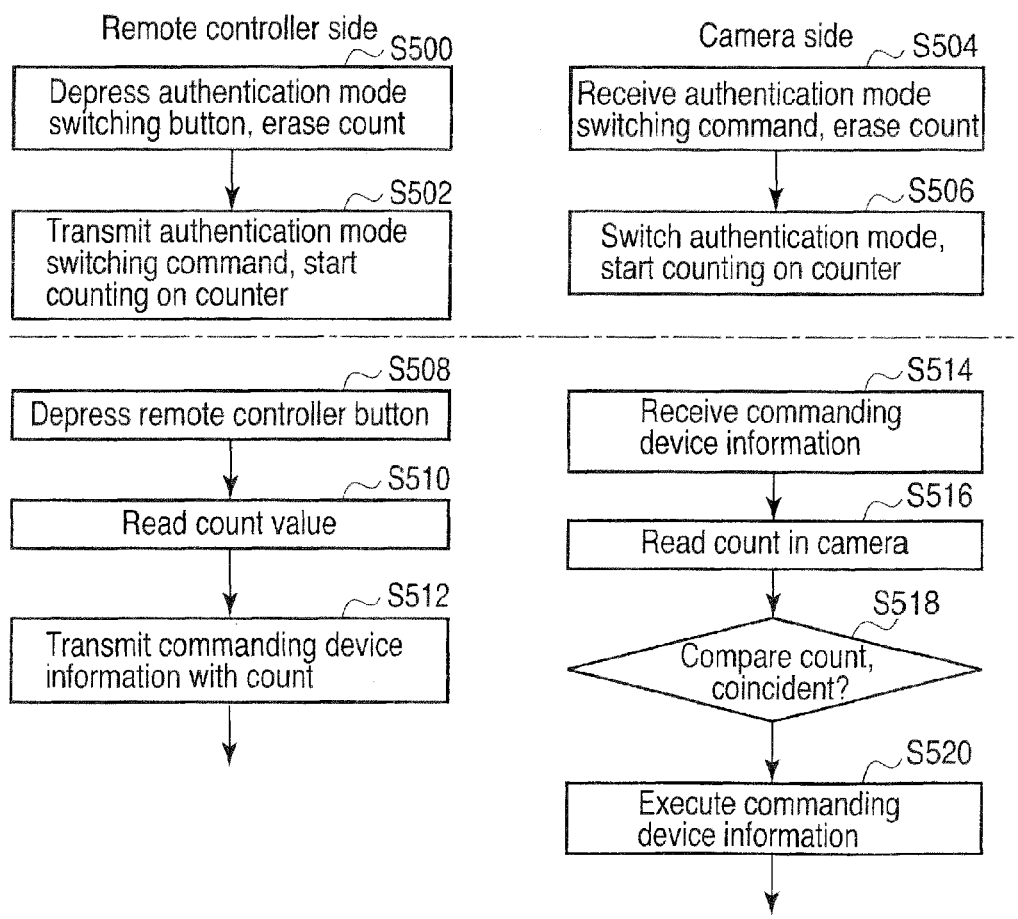
FIG. 43 is a diagram showing the flowchart for explaining the operation of the fourth embodiment.

Specifically, as shown in FIG. 43, in the case where the operation is performed to switch the authentication mode by executing the steps on the remote controller 12, 76 or 94 as explained above in the first embodiment, the first process is to erase the count on the counter 186 in the remote controller (step S500). At the time of transmitting the authentication mode switching command, the counting operation is started on the counter 186 (step S502). On the part of the camera proper 14, on the other hand, upon receipt of the authentication mode switching command from the remote controller 12, 76 or 94, the count on the counter 188 is erased (step S504) and the authentication mode is switched to the mode designated in the command while at the same time starting the counting operation on the counter 188 (step S506).

Upon subsequent depression of any button on the remote controller 12, 76 or 94 (step S508), the count on the counter unit 186 is read (step S510), and a command corresponding to the button thus depressed is transmitted as an authentication command with a count value (step S512). The camera proper 14, upon receipt of the authentication command (step S514), reads the count on the counter 188 in the camera proper 14 (step S516) and compares it with the count from the remote controller 12, 76 or 94. In the case where the two counts are equal to each other within the tolerance taking the count error between them into consideration (step S518), the operation corresponding to the particular command is carried out (step S520).

Figure 44A:
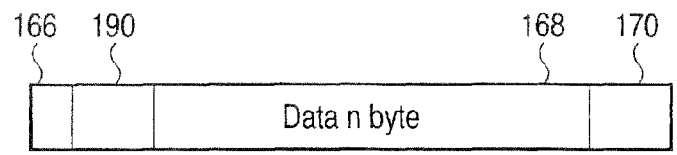
FIG. 44A is a diagram showing an example of the data format of the transmission data signal from the remote controller.
Figure 44B:
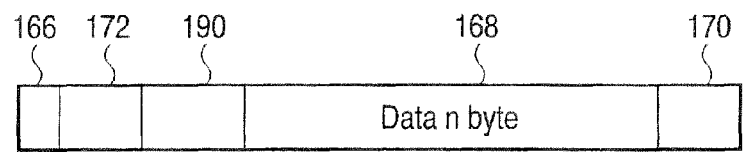
FIG. 44B is a diagram showing another example of the data format of the transmission data signal from the remote controller.
Figure 44C:
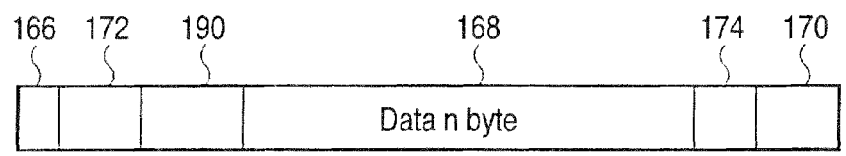
FIG. 44C is a diagram showing a further example of the data format of the transmission data signal from the remote controller.

FIGS. 44A to 44C are diagrams showing the data format of the transmission data signal from the remote controller 12, 76 or 94, which takes the form with the count 190 on the counter 186 added to the data format shown in FIGS. 23A to 23C. Incidentally, the fixed remote controller identification information 176, if added, can be transmitted in the form contained in the data portion 163 or the header 172 as shown in FIGS. 24A to 24C.

As described above, by starting the counting on the remote controller 12, 76 or 94 and the camera proper 14 with the switching of the authentication mode as a starting point and checking for the coincidence, only the command from the remote controller having the coincident count can be accepted.

The counting method includes the one in which the command is counted as 1, 2, 3, . . . each time it is issued or counted as 1, 2, 3, . . . each time the signal received is checked for coincidence, or the one in which the time is counted on the timer. Even in the case where there are a plurality of remote controllers of the same type, the command from other remote controllers is not accepted as long as the authentication information changes and the count fails to coincide. As compared with the case in which only the fixed remote controller identification information is used for determination, therefore, the security can be further improved with a simple mechanism.

As described above, according to the fourth embodiment of the invention, the remote controller 12, 76 or 94 and the camera proper 14 each start the counting operation with the switching of the authentication mode as a starting point, and after the coincidence is checked, the camera proper 14 can accept only the command with a coincident count.

Fifth Embodiment

Next, a fifth embodiment of the invention will be explained.

In order to improve the confidentiality of the image already acquired, according to this embodiment, the operation is performed also with the image acquisition execution command without, the authentication information or with the command of the telephoto button 68 and the wide-angle button 70 having the zoom function in the image acquisition modes J1, J2. In play mode J3, on the other hand, the operation is performed only with the authentication command from the remote controller with the authentication information.

Figure 45:
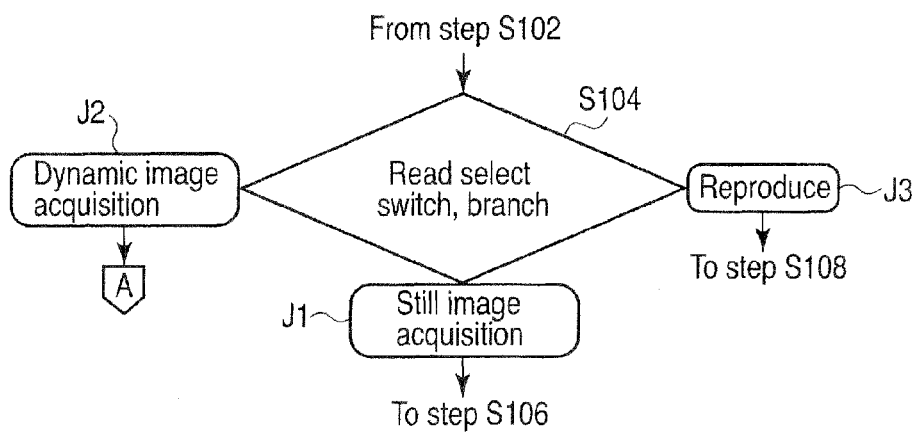
FIG. 45 is a diagram showing the flowchart for explaining the operation of the camera proper according to a fifth embodiment.

In the case where the select switch 34 is read and the process branches to play mode J3 in step S104, according to the first embodiment described above, step S156 is entered to determine whether the reproduction is permitted or not. According to the present embodiment, on the other hand, as shown in FIG. 45, the process proceeds to step S108 to display an alarm on the monitor 38 to the effect that the operation can be performed only by the authentication command remote controller.

Figure 46:
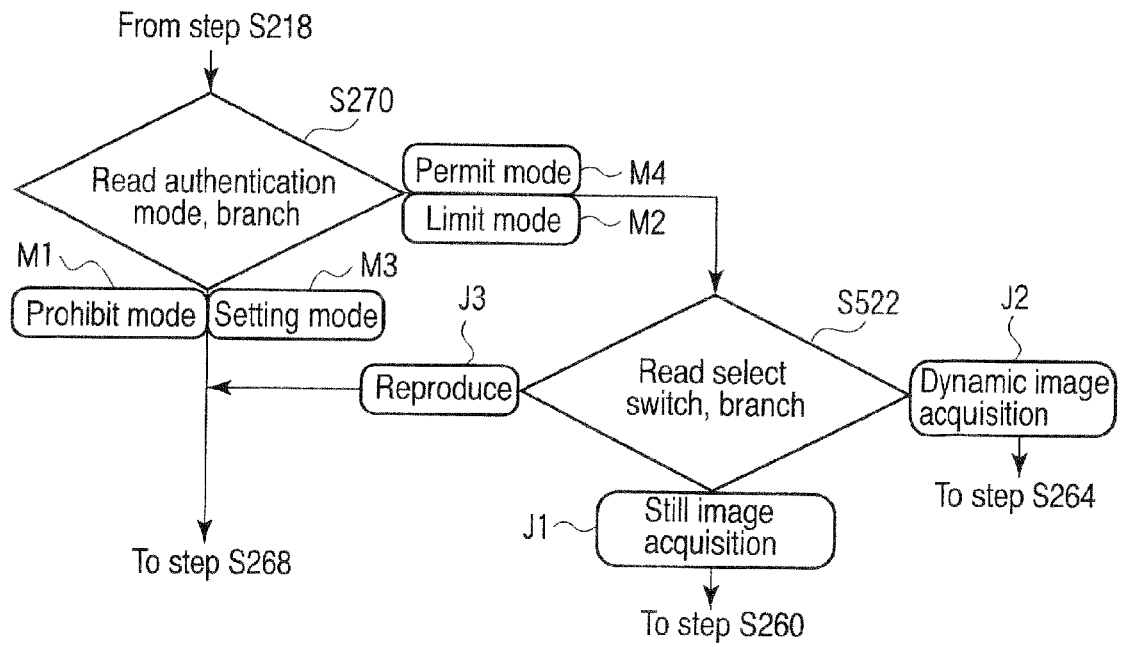
FIG. 46 is a diagram showing the flowchart for explaining the operation of the camera proper according to the fifth embodiment.

Also, on determining in step S270 that the permit mode M4 or the limit mode M2 is in effect at the time of receiving the general command, according to the first embodiment described above, the process branches from step S258 to step S266 to determine whether the reproduction is permitted or not. According to the present embodiment, on the other hand, as shown in FIG. 46, the state of the select switch 34 on the camera proper 14 is read so that the process branches to an appropriate step depending on whether the still image acquisition mode J1, the dynamic image acquisition mode J2 or the play mode J3 is in effect (step S522). On determining that the play mode J3 is in effect, the process proceeds to step S268 for displaying an alarm on the monitor 38 indicating that the operation cannot be performed except by the authentication command remote controller. On determining that the still image acquisition mode J1 is in effect in step S522, on the other hand, the process proceeds to step S260, while on determining that the dynamic image acquisition mode J2 is in effect in step S522, the process proceeds to step S264.

Figure 47A:
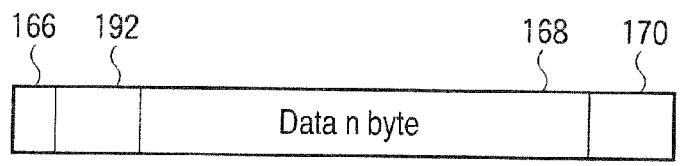
FIG. 47A is a diagram showing an example of the data format of the transmission data signal from the remote controller.

FIGS. 47A to 47D are diagrams showing examples of other formats of the transmission data signal of the command including a function range designation information 192, or especially, the authentication mode switching command from the remote controller 12, 76 or 94 as the remote controller with the authentication information, and FIG. 47E a diagram showing another format of the transmission data signal of the command including an ID information 194 and the function range designation information 192. The function range designation information 192 and the ID information 194, though explained below in the form added to the data format of the transmission data signal from the remote controller 12, 76 or 94, may alternatively be contained, together with the command, in the n bytes of the data portion 168. Also, the fixed remote controller identification information 176 can be transmitted in the form contained in the data portion 168 in FIG. 47A; in the header 172 or the data portion 168 in FIGS. 47B and 47C; in the header 172, the count 190 or the data portion 168 in FIG. 47D; and in the header 172, the ID information 194 or the data portion 168 in FIG. 47E.

Figure 47B:
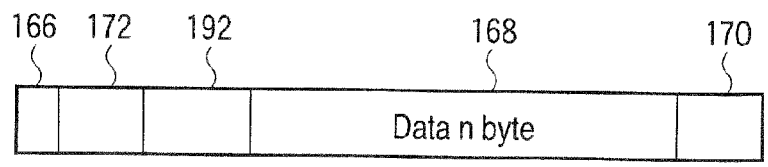
FIG. 47B is a diagram showing another example of the data format of the transmission data signal from the remote controller.

FIG. 47A is a diagram showing a case in which the function range designation information 192 for designating the range of the available functions is contained in the command, or especially, in the authentication mode switching command. As this function range designation information 192, the limit flag of the function limit table shown in FIG. 28 may be used in correspondence in units of bits or bytes. FIG. 47B shows a case in which the header 172 and the function range designation information 192 are contained, FIG. 47C a case in which the header 172, the function range designation information 192 and the ECC 174 are contained, FIG. 47D a case in which the header 172, the count 190, the function range designation information 192 and the ECC 174 are contained, and FIG. 47E a case in which the header 172, ID information 194 unique to the device such as the serial number, the function range designation information 192 and the ECC 174 are contained. The ID information 194 shown in FIG. 47E may be any data by which the device can be recognized, such as the serial numbers of both the remote controller 12, 76 or 94 and the camera proper 14, the serial number or the date or place of manufacture, the model name, the random character string, etc.

As described above, according to the fifth embodiment of the invention, the image acquisition operation can be performed at any time by any person for an improved operability on the one hand, and the security of the other functions such as reproduction and copying is maintained on the other hand.

Also, by containing the function range designation information 192 in the command, or especially, in the authentication mode switching command, the user can arbitrarily designate the range of the available functions.

Also, since the authentication information contains the ID information unique to the camera proper 14, no malfunction occurs even in the case where there are a plurality of cameras proper 14 of the same configuration.

Incidentally, each commands for the image acquisition device contains the authentication information described above, and therefore, can be positively identified and executed.

This invention, though explained above with reference to embodiments, is not limited to the embodiments described above, and of course modifiable and applicable variously without departing from the spirit of the invention.

For example, the authentication information may have a dead line, or the authentication information may be changed synchronously between the remote controller 12, 76 or 94 and the camera proper 14 to prevent the illegal use of the authentication information by wiretapping or the like.

The authentication information, though transmitted together with the command from the remote controller making up a commanding device according to the embodiments described above, may of course be transmitted separately from the command with equal effect.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image acquisition system comprising:
   an image acquisition device having an image acquisition unit;
   a commanding device configured as a member separate from the image acquisition device to transmit a command for controlling the image acquisition device to the image acquisition device so that the image acquisition device can perform an operation corresponding to the command; and an ability switching unit configured to switch an ability to transmit/receive the command between the commanding device and the image acquisition device;

wherein the command includes one of a general command not containing authentication information and an authentication command containing the authentication information, the authentication information enabling the image acquisition device to authenticate the commanding device;

wherein the ability switching unit includes a command transmission/reception ability switching unit configured to reduce the command transmission/reception ability for the authentication command as compared with the command transmission/reception ability for the general command;

wherein the image acquisition device includes:
a command reception unit configured to receive the command transmitted from the commanding device;
an authentication information recognition unit configured to recognize the authentication information contained in the authentication command received by the command reception unit; and
a function limiting unit configured to limit a predetermined function of the image acquisition device based on the authentication information recognized by the authentication information recognition unit;

wherein the authentication information recognition unit of the image acquisition device further includes a command determination unit configured to determine a content of the authentication command received by the command reception unit;

wherein the image acquisition device further includes a mode setting unit configured to, in a case in which the content of the authentication command received by the command reception unit is an authentication mode switching command for limiting the function of the image acquisition device, set an authentication mode of the image acquisition device in accordance with the authentication mode switching command, and wherein the function limiting unit of the image acquisition device limits the function of the image acquisition device in accordance with the authentication mode set by the mode setting unit.

2. The image acquisition system according to claim 1, wherein:
the mode setting unit of the image acquisition device further sets a prohibit mode as the authentication mode at a time of switching on power for the image acquisition device, and
the function limiting unit of the image acquisition device prohibits the image acquisition device from execution of the functions thereof by other than the commanding device in a case in which the prohibit mode is set by the mode setting unit.

3. The image acquisition system according to claim 1, wherein the mode setting unit of the image acquisition device has a memory configured to store a currently set authentication mode at a time of switching off the power of the image acquisition device.

4. The image acquisition system according to claim 3, wherein the memory of the mode setting unit of the image acquisition device is a nonvolatile memory capable of holding contents of storage even in a case in which the power is switched off.

5. The image acquisition system according to claim 3, wherein the mode setting unit of the image acquisition device further reads the authentication mode stored in the memory and sets said authentication mode at a time of switching on the power for the image acquisition device.

6. The image acquisition system according to claim 1, wherein the mode setting unit of the image acquisition device sets the authentication mode only in response to the authentication mode switching command from the commanding device.

7. The image acquisition system according to claim 1, wherein:
the image acquisition device further includes a time measuring unit configured to count time,
the mode setting unit of the image acquisition device further sets a prohibit mode as the authentication mode based on the time counted by the time measuring unit, and
the function limiting unit of the image acquisition device prohibits the image acquisition device from execution of the functions thereof by other than the commanding device in a case in which the prohibit mode is set by the mode setting unit.

8. The image acquisition system according to claim 7, wherein:
the time measuring unit of the image acquisition device continues to count the time even after power of the image acquisition device is switched off, and
the mode setting unit of the image acquisition device sets the prohibit mode upon counting of a predetermined time by the time measuring unit.

9. The image acquisition system according to claim 2, wherein the mode setting unit of the image acquisition device sets the prohibit mode as the authentication mode one of (i) upon lapse of a preset time after a battery is one of consumed up and removed, (ii) immediately after the battery is one of consumed up and removed, and (iii) as a result of monitoring a voltage.

10. The image acquisition system according to claim 1, wherein the command is transmitted one of optically and by radio.

11. The image acquisition system according to claim 1, wherein the image acquisition system includes a first commanding device having a transmission unit for transmitting the authentication command, and a second commanding device which does not have the authentication information and being which is capable of transmitting at least the general command.

12. The image acquisition system, according to claim 1, wherein the image acquisition device further includes a built-in memory, and the function limiting unit of the image acquisition device causes an acquired image to be stored only in the built-in memory in a case in which a prohibit mode prohibiting the execution of the function of the image acquisition device by other than the commanding device is set as the authentication mode by the mode setting unit and in a case in which an image acquisition operation is performed by the image acquisition unit based on the command from the commanding device identified by the command determination unit.

13. The image acquisition system according to claim 12, wherein the function limiting unit of the image acquisition device limits any of operations of reading, displaying, copying, transferring, and printing the image stored in the built-in memory in such a manner as to be performed only in accordance with an image acquisition command from the commanding device authenticated by the authentication information recognized by the authentication information recognition unit.

14. The image acquisition system according to claim 12, wherein the image acquisition device further comprises a removable memory, and the image stored in the built-in memory, if one of copied and transferred to the removable memory, is encrypted and stored.

15. The image acquisition system according to claim 14, wherein the commanding device further includes a selecting unit configured to select whether the image acquired by the image acquisition unit is recorded in the built-in memory or in the removable memory.

16. The image acquisition system according to claim 1, wherein the commanding device further includes:
    a command transmission unit configured to transmit the command;
    a first counting unit configured to start a counting operation at a starting time point when the authentication mode switching command is transmitted by the command transmission unit; and
    a transmitting unit configured to transmit the command containing a count value of the first counting unit from the command transmission unit after transmitting the authentication mode switching command,
  wherein the image acquisition device further includes:
    a second counting unit configured to start a counting operation at a time of setting the authentication mode by the mode setting unit based on the authentication mode switching command from the commanding device; and
    a comparator unit configured to compare a count value of the second counting unit with the count value of the first counting unit contained in the command which may be received from the commanding device by the command reception unit, and
    wherein the function limiting unit of the image acquisition device sets the limit of the function based on the result of comparison by the comparator unit.

17. The image acquisition system according to claim 1, wherein the commanding device includes a command transmission unit configured to transmit the authentication command containing the authentication information, and
wherein the function limiting unit of the image acquisition device does not limit the function of an image acquisition operation in the image acquisition unit regardless of a result of recognition of the authentication information by the authentication information recognition unit and limits other functions based on the authentication information attached to the command, received by the command reception unit and recognized by the authentication information recognition unit.

18. The image acquisition system according to claim 17, wherein the command transmission unit of the commanding device transmits the command further with function range information designating a limited range of the function, and the function limiting unit of the image acquisition device limits the function in accordance with the function range information added to the command received by the command receiving unit.

19. The image acquisition system according to claim 1, wherein the commanding device further includes a command transmission unit configured to transmit the authentication command containing the authentication information, and the image acquisition device operates in accordance with the authentication command received by the command reception unit.

20. The image acquisition system according to claim 1, wherein the ability switching unit switches the ability for command transmission/reception between the commanding device and the image acquisition device to the ability corresponding to the type of the command transmitted by the commanding device.

21. An image acquisition device authenticating method for carrying out authentication between an image acquisition device having an image acquisition unit and a commanding device configured as a member separate from the image acquisition device to transmit a command for controlling the image acquisition device to the image acquisition device so that the image acquisition device can perform an operation corresponding to the command, the method comprising:
    switching an ability for command transmission/reception between the commanding device and the image acquisition device;
    wherein the command includes one of a general command not containing authentication information and an authentication command containing the authentication information, the authentication information enabling the image acquisition device to authenticate the commanding device;
    wherein the switching comprises reducing the command transmission/reception ability for the authentication command as compared with the command transmission/reception ability for the general command;
    wherein in the image acquisition device, the method further comprises:
        receiving the command transmitted from the commanding device;
        recognizing the authentication information contained in the received authentication command;
        limiting a predetermined function of the image acquisition device based on the recognized authentication information;
        wherein the recognizing further comprises determining a content of the authentication command received by the command reception unit;
        wherein in a case in which the content of the received authentication command is an authentication mode switching command for limiting the function of the image acquisition device, the method further comprises setting an authentication mode of the image acquisition device in accordance with the authentication mode switching command, and
        wherein the limiting comprises limiting the function of the image acquisition device in accordance with the set authentication mode.

22. The image acquisition system according to claim 1, wherein the ability switching unit is included in at least one of the commanding device and the image acquisition device.

23. The image acquisition system according to claim 1, wherein:
    the commanding device includes a command transmission unit configured to transmit the command, and
    the ability switching unit includes a command transmission output switching unit, which is included in the commanding device, and which is configured to switch a command transmission output of the command transmission unit of the commanding device.

24. The image acquisition system according to claim 1, wherein the ability switching unit includes a reception sensitivity switching unit, which is included in the image acquisition device, and which configured to switch reception sensitivity of the command reception unit of the image acquisition device.

25. The image acquisition system according to claim 24, wherein the reception sensitivity switching unit of the image acquisition device switches the reception sensitivity of the command reception unit in accordance with a sensitivity switching command transmitted from the commanding device.

26. The image acquisition system according to claim 24, wherein:
the image acquisition device further includes a sensitivity select operation unit configured to accept an operation of selecting the reception sensitivity of the command reception unit of the image acquisition device, and
the reception sensitivity switching unit of the image acquisition device switches the reception sensitivity of the command reception unit in accordance with the select operation of the sensitivity select operation unit.

27. The image acquisition system according to claim 1, wherein:
the image acquisition device further includes an image reproduction unit configured to reproduce an image acquired by the image acquisition unit, and
the function limiting unit of the image acquisition device limits a function of the image reproduction unit.

28. The image acquisition system according to claim 1, wherein the commanding device includes a command transmission unit configured to transmit the authentication command and the general command to the image acquisition device.

29. The image acquisition system according to claim 1, wherein the commanding device further includes an authentication command transmission unit configured to transmit an image acquisition command for the image acquisition operation of the image acquisition device and the authentication mode switching command, as the authentication command.

30. The image acquisition system according to claim 28, wherein the commanding device further includes a switching unit configured to switch the general command and the authentication command to be transmitted by the command transmission unit.

31. The image acquisition system according to claim 1, wherein the commanding device further includes a command transmission unit configured to transmit an image acquisition command of an image acquisition operation of the image acquisition device as the general command, and the authentication mode switching command as the authentication command.

32. The image acquisition system according to claim 31, wherein the commanding device further includes a switching unit configured to switch the general command and the authentication mode switching command to be transmitted by the command transmission unit.

33. The image acquisition system according to claim 1, wherein the function limiting unit of the image acquisition device limits the function of the image acquisition device in accordance with the content of the authentication command determined by the command determination unit.

34. The image acquisition system according to claim 28, wherein the commanding device further includes an authentication information generating unit configured to generate authentication information containing a random number generated by a random number generating unit as the authentication information.

35. The image acquisition system according to claim 28, wherein the commanding device further includes an authentication information generating unit configured to generate authentication information containing data selected from a table stored in advance, as the authentication information.

36. The image acquisition system according to claim 28, wherein the authentication information contains ID information unique to the image acquisition device.

* * * * *